US012321467B2

(12) United States Patent
Sultana et al.

(10) Patent No.: US 12,321,467 B2
(45) Date of Patent: Jun. 3, 2025

(54) CRYPTOGRAPHIC COMPUTING ISOLATION FOR MULTI-TENANCY AND SECURE SOFTWARE COMPONENTS

(71) Applicant: Intel Corporation, Santa Clara, CA (US)

(72) Inventors: Salmin Sultana, Hillsboro, OR (US); David M. Durham, Beaverton, OR (US); Michael LeMay, Hillsboro, OR (US); Karanvir S. Grewal, Hillsboro, OR (US); Sergej Deutsch, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 17/854,814

(22) Filed: Jun. 30, 2022

(65) Prior Publication Data

US 2022/0335140 A1  Oct. 20, 2022

(51) Int. Cl.
*G06F 21/60* (2013.01)
*G06F 9/30* (2018.01)
(Continued)

(52) U.S. Cl.
CPC ........ *G06F 21/602* (2013.01); *G06F 9/30043* (2013.01); *G06F 9/30101* (2013.01);
(Continued)

(58) Field of Classification Search
CPC ... H04L 63/083; H04L 9/3234; G06F 21/602; G06F 11/1458; G06F 11/07; G06F 21/335
See application file for complete search history.

(56) References Cited

U.S. PATENT DOCUMENTS 6,570,989 B1  5/2003  Ohmori et al.
6,961,852 B2  11/2005  Craft
(Continued)

FOREIGN PATENT DOCUMENTS

DE  102018125786 A1  5/2019
EP  2073430 A1  6/2009
(Continued)

OTHER PUBLICATIONS

U.S. Appl. No. 17/855,261, filed Jun. 30, 2022.
(Continued)

*Primary Examiner* — Barbara B Anyan
(74) *Attorney, Agent, or Firm* — Alliance IP, LLC

(57) ABSTRACT

Techniques for cryptographic computing isolation are described. A processor includes circuitry to be coupled to memory configured to store one or more instructions. The circuitry is to execute the one or more instructions to instantiate a first process based on an application. To instantiate the first process is to include creating a context table to be used by the first process, identifying a software component to be invoked during the first process, encrypting the software component using a first cryptographic key, and creating a first entry in the context table. The first entry is to include first context information identifying the encrypted software component and second context information representing the first cryptographic key. In more specific embodiments, third context information representing a first load address of the encrypted software component is stored in the first entry of the context table.

23 Claims, 17 Drawing Sheets

(51) Int. Cl.
*G06F 21/31* (2013.01)
*G06F 21/33* (2013.01)
*G06F 21/80* (2013.01)

(52) U.S. Cl.
CPC ............ *G06F 21/31* (2013.01); *G06F 21/335* (2013.01); *G06F 21/805* (2013.01)

(56) References Cited

U.S. PATENT DOCUMENTS

| | | | |
|---|---|---|---|
| 7,043,016 B2 | 5/2006 | Roelse | |
| 7,254,718 B2 | 8/2007 | Kaminaga et al. | |
| 7,907,723 B2 | 3/2011 | Rubin | |
| 8,085,934 B1 | 12/2011 | Bhooma | |
| 8,675,868 B1 | 3/2014 | Yearsley et al. | |
| 8,798,263 B2 | 8/2014 | Pasini et al. | |
| 9,015,824 B1 | 4/2015 | Drewry et al. | |
| 9,135,450 B2 | 9/2015 | Grobman et al. | |
| 9,213,653 B2 | 12/2015 | Durham et al. | |
| 9,350,534 B1 | 5/2016 | Poo et al. | |
| 9,390,268 B1 | 7/2016 | Martini et al. | |
| 9,436,847 B2 | 9/2016 | Durham et al. | |
| 9,514,285 B2 | 12/2016 | Durham et al. | |
| 9,753,754 B2 | 9/2017 | Howell et al. | |
| 9,811,661 B1 | 11/2017 | Golovkin et al. | |
| 9,830,162 B2 | 11/2017 | LeMay | |
| 9,954,950 B2 | 4/2018 | LeMay et al. | |
| 9,990,249 B2 | 6/2018 | Durham et al. | |
| 10,084,603 B2 * | 9/2018 | Rogers | H04L 9/3234 |
| 10,216,522 B2 | 2/2019 | LeMay | |
| 10,326,744 B1 | 6/2019 | Nossik et al. | |
| 10,387,305 B2 | 8/2019 | Durham et al. | |
| 10,536,266 B2 | 1/2020 | Courtney | |
| 10,585,809 B2 | 3/2020 | Durham et al. | |
| 10,706,164 B2 | 7/2020 | LeMay et al. | |
| 10,769,272 B2 | 9/2020 | Durham et al. | |
| 10,785,028 B2 | 9/2020 | Girkar et al. | |
| 10,860,709 B2 | 12/2020 | LeMay et al. | |
| 11,216,366 B2 | 1/2022 | Durham et al. | |
| 11,250,165 B2 | 2/2022 | LeMay et al. | |
| 11,288,188 B1 | 3/2022 | Tummala et al. | |
| 11,308,225 B2 | 4/2022 | Kounavis et al. | |
| 11,321,469 B2 | 5/2022 | Kounavis et al. | |
| 11,354,423 B2 | 6/2022 | Kounavis et al. | |
| 11,403,234 B2 | 8/2022 | Durham et al. | |
| 11,416,624 B2 | 8/2022 | Durham et al. | |
| 11,575,504 B2 | 2/2023 | Durham et al. | |
| 11,580,035 B2 | 2/2023 | Durham et al. | |
| 11,580,234 B2 | 2/2023 | Kounavis et al. | |
| 11,620,391 B2 | 4/2023 | LeMay et al. | |
| 11,662,928 B1 * | 5/2023 | Kumar | G06F 11/1458 713/150 |
| 11,669,625 B2 | 6/2023 | Durham et al. | |
| 11,809,735 B1 * | 11/2023 | Kumar | G06F 11/07 |
| 11,838,418 B2 | 12/2023 | Girkar et al. | |
| 12,050,701 B2 | 7/2024 | Kounavis et al. | |
| 2002/0065993 A1 | 5/2002 | Chauvel | |
| 2002/0094081 A1 | 7/2002 | Medvinsky | |
| 2003/0091185 A1 | 5/2003 | Swindlehurst et al. | |
| 2003/0101362 A1 | 5/2003 | Dia | |
| 2003/0126349 A1 | 7/2003 | Nalawadi et al. | |
| 2003/0149869 A1 | 8/2003 | Gleichauf | |
| 2004/0034769 A1 * | 2/2004 | Bacha | H04L 63/083 713/153 |
| 2004/0123288 A1 | 6/2004 | Bennett et al. | |
| 2004/0215895 A1 | 10/2004 | Cypher | |
| 2004/0268057 A1 | 12/2004 | Landin et al. | |
| 2005/0010804 A1 | 1/2005 | Bruening et al. | |
| 2005/0100163 A1 | 5/2005 | Buer | |
| 2006/0080553 A1 | 4/2006 | Hall | |
| 2007/0152854 A1 | 7/2007 | Copley | |
| 2007/0192592 A1 | 8/2007 | Goettfert et al. | |
| 2007/0201691 A1 | 8/2007 | Kumagaya | |
| 2007/0220500 A1 | 9/2007 | Saunier | |
| 2008/0080708 A1 | 4/2008 | McAlister et al. | |
| 2008/0130895 A1 | 6/2008 | Jueneman et al. | |
| 2008/0140968 A1 | 6/2008 | Doshi et al. | |
| 2008/0205651 A1 | 8/2008 | Goto et al. | |
| 2008/0229425 A1 | 9/2008 | Perrin et al. | |
| 2008/0263117 A1 | 10/2008 | Rose et al. | |
| 2008/0288785 A1 | 11/2008 | Rao et al. | |
| 2008/0320601 A1 | 12/2008 | Linsley | |
| 2009/0172393 A1 | 7/2009 | Tanik et al. | |
| 2009/0220071 A1 | 9/2009 | Gueron et al. | |
| 2009/0249064 A1 | 10/2009 | Atley et al. | |
| 2009/0254774 A1 | 10/2009 | Chamdani et al. | |
| 2009/0282393 A1 | 11/2009 | Costa et al. | |
| 2009/0285390 A1 | 11/2009 | Scherer et al. | |
| 2010/0023707 A1 | 1/2010 | Hohmuth et al. | |
| 2010/0122088 A1 | 5/2010 | Oxford | |
| 2010/0281273 A1 | 11/2010 | Lee et al. | |
| 2011/0099429 A1 | 4/2011 | Varma et al. | |
| 2011/0161680 A1 | 6/2011 | Grube et al. | |
| 2011/0296202 A1 | 12/2011 | Henry et al. | |
| 2012/0163453 A1 | 6/2012 | Horowitz | |
| 2012/0284461 A1 | 11/2012 | Larin et al. | |
| 2013/0191649 A1 | 7/2013 | Muff et al. | |
| 2013/0232507 A1 | 9/2013 | Farrugia et al. | |
| 2013/0275766 A1 | 10/2013 | Plainecassagne et al. | |
| 2013/0283396 A1 | 10/2013 | Langer et al. | |
| 2014/0020092 A1 | 1/2014 | Davidov | |
| 2014/0025944 A1 | 1/2014 | Maletsky et al. | |
| 2014/0149730 A1 | 5/2014 | Joshi et al. | |
| 2014/0173293 A1 | 6/2014 | Kaplan | |
| 2014/0270159 A1 | 9/2014 | Youn et al. | |
| 2015/0032996 A1 | 1/2015 | Koeberl et al. | |
| 2015/0234728 A1 | 8/2015 | Coleman et al. | |
| 2015/0244518 A1 | 8/2015 | Koo et al. | |
| 2015/0371063 A1 | 12/2015 | Van Antwerpen et al. | |
| 2015/0378941 A1 | 12/2015 | Rozas et al. | |
| 2015/0381358 A1 | 12/2015 | Grobman et al. | |
| 2016/0056954 A1 | 2/2016 | Lee et al. | |
| 2016/0092702 A1 | 3/2016 | Durham et al. | |
| 2016/0094552 A1 | 3/2016 | Durham et al. | |
| 2016/0104009 A1 | 4/2016 | Henry et al. | |
| 2016/0154963 A1 | 6/2016 | Kumar et al. | |
| 2016/0188889 A1 | 6/2016 | Trivedi et al. | |
| 2016/0192194 A1 * | 6/2016 | Yang | H04W 12/082 713/171 |
| 2016/0285892 A1 | 9/2016 | Kishinevsky et al. | |
| 2016/0292422 A1 | 10/2016 | Hayashi et al. | |
| 2016/0335187 A1 | 11/2016 | Greenspan et al. | |
| 2016/0364341 A1 | 12/2016 | Banginwar et al. | |
| 2016/0364707 A1 | 12/2016 | Varma | |
| 2016/0371496 A1 | 12/2016 | Sell | |
| 2016/0380772 A1 | 12/2016 | Gopal et al. | |
| 2017/0026171 A1 | 1/2017 | Lal et al. | |
| 2017/0063532 A1 | 3/2017 | Bhattacharyya et al. | |
| 2017/0063547 A1 | 3/2017 | Brandt et al. | |
| 2017/0093567 A1 | 3/2017 | Gopal et al. | |
| 2017/0171185 A1 * | 6/2017 | Camenisch | G06F 21/335 |
| 2017/0177368 A1 | 6/2017 | DeHon et al. | |
| 2017/0235957 A1 | 8/2017 | Maletsky | |
| 2017/0237560 A1 | 8/2017 | Mueller et al. | |
| 2017/0249260 A1 | 8/2017 | Sahita et al. | |
| 2017/0285976 A1 | 10/2017 | Durham et al. | |
| 2017/0300425 A1 | 10/2017 | Meredith et al. | |
| 2017/0308297 A1 | 10/2017 | Roberts et al. | |
| 2017/0344297 A1 | 11/2017 | Woolman et al. | |
| 2017/0364704 A1 | 12/2017 | Wright et al. | |
| 2018/0046576 A1 | 2/2018 | Lesartre et al. | |
| 2018/0046823 A1 | 2/2018 | Durham et al. | |
| 2018/0082057 A1 | 3/2018 | LeMay et al. | |
| 2018/0095812 A1 | 4/2018 | Deutsch et al. | |
| 2018/0095899 A1 | 4/2018 | Durham et al. | |
| 2018/0095906 A1 | 4/2018 | Doshi et al. | |
| 2018/0109508 A1 | 4/2018 | Wall et al. | |
| 2018/0247082 A1 | 8/2018 | Durham et al. | |
| 2018/0268170 A1 | 9/2018 | Li et al. | |
| 2018/0287785 A1 | 10/2018 | Pfannenschmidt et al. | |
| 2018/0365069 A1 | 12/2018 | Nemiroff et al. | |
| 2019/0026236 A1 | 1/2019 | Barnes | |
| 2019/0042369 A1 | 2/2019 | Deutsch et al. | |
| 2019/0042481 A1 | 2/2019 | Feghali et al. | |

(56) References Cited

U.S. PATENT DOCUMENTS

| | | |
|---|---|---|
| 2019/0042734 A1 | 2/2019 | Kounavis et al. |
| 2019/0042766 A1 | 2/2019 | Pappachan et al. |
| 2019/0042796 A1 | 2/2019 | Bokern et al. |
| 2019/0042799 A1 | 2/2019 | Durham et al. |
| 2019/0044927 A1 | 2/2019 | Sood et al. |
| 2019/0044954 A1 | 2/2019 | Kounavis et al. |
| 2019/0045016 A1 | 2/2019 | Dewan et al. |
| 2019/0050558 A1 | 2/2019 | LeMay et al. |
| 2019/0087354 A1 | 3/2019 | Chhabra et al. |
| 2019/0095350 A1 | 3/2019 | Durham et al. |
| 2019/0097794 A1 | 3/2019 | Nix |
| 2019/0102322 A1 | 4/2019 | Chhabra et al. |
| 2019/0102567 A1 | 4/2019 | LeMay et al. |
| 2019/0102577 A1 | 4/2019 | Gueron et al. |
| 2019/0147192 A1 | 5/2019 | Khosravi et al. |
| 2019/0220625 A1 | 7/2019 | Durham et al. |
| 2019/0227951 A1 | 7/2019 | Durham et al. |
| 2019/0319781 A1 | 10/2019 | Chhabra et al. |
| 2019/0339978 A1 | 11/2019 | Wallach |
| 2019/0347445 A1 | 11/2019 | Chen |
| 2019/0354726 A1 | 11/2019 | Critelli et al. |
| 2019/0377574 A1 | 12/2019 | Weimer |
| 2020/0004953 A1 | 1/2020 | LeMay et al. |
| 2020/0007332 A1 | 1/2020 | Girkar et al. |
| 2020/0050553 A1 | 2/2020 | Hajj et al. |
| 2020/0076585 A1 | 3/2020 | Sheppard et al. |
| 2020/0089430 A1 | 3/2020 | Kanno |
| 2020/0117810 A1 | 4/2020 | Kounavis et al. |
| 2020/0125501 A1 | 4/2020 | Durham et al. |
| 2020/0125502 A1 | 4/2020 | Durham et al. |
| 2020/0125742 A1 | 4/2020 | Kounavis et al. |
| 2020/0125769 A1 | 4/2020 | Kounavis et al. |
| 2020/0125770 A1 | 4/2020 | LeMay et al. |
| 2020/0134234 A1 | 4/2020 | LeMay et al. |
| 2020/0145187 A1 | 5/2020 | Kounavis et al. |
| 2020/0145199 A1 | 5/2020 | Kounavis et al. |
| 2020/0159676 A1 | 5/2020 | Durham et al. |
| 2020/0169383 A1 | 5/2020 | Durham et al. |
| 2020/0201789 A1 | 6/2020 | Durham et al. |
| 2020/0241775 A1 | 7/2020 | Breslow |
| 2020/0249995 A1 | 8/2020 | Wong et al. |
| 2020/0257827 A1 | 8/2020 | Kounavis et al. |
| 2020/0379902 A1 | 12/2020 | Durham et al. |
| 2020/0380140 A1 | 12/2020 | Medwed et al. |
| 2020/0382289 A1 | 12/2020 | Xue et al. |
| 2020/0382303 A1 | 12/2020 | Girkar et al. |
| 2021/0004470 A1 | 1/2021 | Babic et al. |
| 2021/0058379 A1 | 2/2021 | Bursell et al. |
| 2021/0117340 A1 | 4/2021 | Trikalinou et al. |
| 2021/0117342 A1 | 4/2021 | Durham |
| 2021/0149825 A1 | 5/2021 | Durham et al. |
| 2021/0150040 A1 | 5/2021 | Durham et al. |
| 2021/0200673 A1 | 7/2021 | Gupta et al. |
| 2021/0218547 A1 | 7/2021 | Weiler et al. |
| 2021/0240638 A1 | 8/2021 | Deutsch et al. |
| 2021/0405896 A1 | 12/2021 | Durham et al. |
| 2022/0012188 A1 | 1/2022 | Durham et al. |
| 2022/0019698 A1 | 1/2022 | Durham et al. |
| 2022/0138329 A1 | 5/2022 | Kounavis et al. |
| 2022/0156180 A1 | 5/2022 | Durham et al. |
| 2022/0197638 A1 | 6/2022 | LeMay |
| 2022/0206958 A1 | 6/2022 | LeMay et al. |
| 2022/0300626 A1 | 9/2022 | Kounavis et al. |
| 2022/0382885 A1 | 12/2022 | Durham et al. |
| 2023/0027329 A1* | 1/2023 | Durham .............. G06F 21/602 |
| 2024/0104027 A1 | 3/2024 | Ghosh et al. |

FOREIGN PATENT DOCUMENTS

| | | | |
|---|---|---|---|
| EP | 3326102 | A1 | 5/2018 |
| EP | 3745273 | A1 | 12/2020 |
| JP | 2009139899 | A | 6/2009 |
| JP | 2011522469 | A | 7/2011 |
| JP | 2013541783 | A | 11/2013 |
| JP | 2019091430 | A | 6/2019 |
| KR | 101754518 | B1 | 7/2017 |
| WO | 2013147794 | A1 | 10/2013 |
| WO | 2014059438 | A2 | 4/2014 |
| WO | 2017014885 | A1 | 1/2017 |
| WO | WO-2021162792 | A1 * | 8/2021 ......... G06F 12/1466 |
| WO | 2022139850 | | 6/2022 |

OTHER PUBLICATIONS

U.S. Appl. No. 17/791,000, filed Jul. 6, 2022.

"Armv8.5-A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.

Ainsworth, Sam et al., "MarkUs: Drop-in use-after-free prevention for low-level languages," 2020 IEEE Symposium on Security and Privacy, Cambridge, UK (14 pages).

Andreatos et al., "A comparison of random number sequences for image encryption", Mathematical Methods in Science and Engineering, 2014, pp. 146-151 (Year: 2014) (7 pages).

Avanzi, Roberto, "The QARMA Block Ciper Family, Almost MDS Matrices Over Rings With Zero Divisors, Nearly Symmetric Even-Mansour Constructions With Non-Involutory Central Rounds, and Search Heuristics for Low-Latency S-Boxes," Qualcomm Product Security, Munich Germany, IACR Transactions on Symmetric Cryptology, 2017 (1) (40 pages).

Beaulieu, Ray et al., "Simon and Spec: Block Ciphers for the Internet of Things," National Security Agency, Jul. 2015 (15 pages).

Bernstein, Daniel J., "Gimli," Sep. 27, 2019, retrieved from https://csrc.nist.gov/CSRC/media/Projects/lightweight-cryptography/documents/round2/spec-doc-rnd2/gimli-spec-round2.pdf, (48 pages).

BiiN, "CPU Architecture Reference Manual", accessed at http://bitsavers.informatik.uni-stuttgart.de/pdf/biin/BiIN_CPU_Architecture_Reference_Man_Jul88. pdf, Jul. 1988, 401 pages.

Boivie, Rick, IBM Research Report, SecureBlue++: CPU Support for Secure Execution, May 23, 2012, available online at https://domino.research.ibm.com/library/cyberdig.nsf/papers/E605BDC5439097F085257A13004D25CA/$File/rc25287.pdf, (10 pages).

Borghoff, Julia et al., "Prince—A Low-Latancy Block Ciper for Pervasive Computing Applications," Advances in Cryptology—Asiacrypt 2012—18th International Conference on the Theory and Application of Cryptology and Information Security, Beijing, China, Dec. 2-6, 2012. Proceedings (pp. 208-225).

Carlini, Nicholas, et al.; "Control-Flow Bending: On the Effectiveness of Control-Flow Integrity," Proceedings of the 24th USENIX Security Symposium; Washington, D.C.; Aug. 2015; 16 pages.

Carr, Scott A. et al., "DataShield: Configurable Data Confidentiality and Integrity," Purdue University, Asia CCS, '17, Apr. 2-6, 2017, Abu Dhabi, United Arab Emirates (12 pages).

Chen, Tony et al., "Pointer Tagging for Memory Safety." Microsoft. Retrieved from https://www.microsoft.com/en-us/research/uploads/prod/2019/07/Pointer-Tagging-for-Memory-Safety.pdf, 23 pages.

Durham, David M. et al; U.S. Appl. No. 17/539,933, filed Dec. 1, 2021.

Dutch Office Action received in Application No. 2029792, dated Mar. 22, 2023, with Statement of Relevance, 15 pages.

Dworkin, Morris, "Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).

EPO Communication Pursuant to Article 94(3) EPC in EP Application Serial No. 20181907.5-1218 mailed on Mar. 27, 2023 (6 pages).

EPO European Extended Search Report in EP Application Serial No. 20918345.8 mailed on Mar. 14, 2024, 7 pages.

EPO; Extended European Search Report issued in EP Patent Application No. 20163534.9, dated Sep. 24, 2020; 8 pages.

EPO; Extended European Search Report issued in EP Patent Application No. 20163546.3, dated Sep. 28, 2020; 8 pages.

EPO; Extended European Search Report issued in EP Patent Application No. 20163670.1, dated Sep. 29, 2020; 8 pages.

(56) References Cited

OTHER PUBLICATIONS

EPO; Extended European Search Report issued in EP Patent Application No. 20163907.7, dated Oct. 6, 2020; 9 pages.
EPO; Extended European Search Report issued in EP Patent Application No. 20164326.9, dated Oct. 2, 2020; 9 pages.
EPO; Extended European Search Report issued in EP Patent Application No. 20164636.1, dated Oct. 6, 2020; 8 pages.
EPO; Extended European Search Report issued in EP Patent Application No. 20168972.6, dated Jul. 3, 2020; 9 pages.
EPO; Extended European Search Report issued in EP Patent Application No. 20181907.5, dated Nov. 2, 2020; 9 pages.
EPO; Extended European Search Report issued in EP Patent Application No. 20193625.9, dated Feb. 22, 2021; 7 pages.
EPO; Extended European Search Report issued in EP Patent Application No. 20210029.3, dated May 20, 2021; 8 pages.
EPO; Extended European Search Report issued in EP Patent Application No. 21195529.9, dated Mar. 1, 2022; 6 pages.
EPO; Extended European Search Report issued in EP Patent Application No. 21196104.0, dated Feb. 15, 2022; 10 pages.
EPO; Extended European Search Report issued in EP Patent Application No. 22153425.8, dated Jul. 18, 2022; 8 pages.
EPO; Extended European Search Report issued in European Patent Application No. EP 20163095.1, dated Aug. 10, 2020; 9 pages.
EPO; Extended European Search Report issued in Patent Application No. EP 20163518.2, dated Aug. 19, 2020; 10 pages.
EPO; Extended European Search Report issued in Patent Application No. EP 20163661.0, dated Aug. 17, 2020; 9 pages.
EPO; Office Action issued in EP Patent Application No. 20210029.3, dated Mar. 16, 2022; 4 pages.
Filardo, Nathaniel Wesley et al., "Cornucopia: Temporal Safety for CHERI Heaps;" Cambridge, UK. (18 pages).
France Intellectual Property Office; Office Action issued in FR2114288, dated Nov. 28, 2023; 4 pages with English translation.
France Intellectual Property Office; Search Report issued in FR2114288, dated Jan. 12, 2023; 24 pages with English translation.
French Office Action received in Application No. 2114288, dated Apr. 3, 2024, with English translation, 6 pages.
Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).
Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).
GitHub.com; "V8 Garbage Collector," Oct. 23, 2018 (13 pages).
Haraken@, et al.,; "MTECheckedPtr" Last updated Jul. 9, 2020; Accessed Jul. 19, 2022; Retrieved from https://docs.google.com/document/d/1ph7iOorkGqTuETFZp-xvHV4L2rYootuz1ThzAAoGe30/edit#heading=h.b57m9s7iv7yr; 9 pages.
Haraken@; "CheckedPtr2 and CheckedPtr3," retrieved from the Internet at https://docs.google.com/document/d/14TsvTgswPUOQuQol9TmkFQnuSaFD8ZLHRvzapNwl5vs; published Apr. 4, 2020; 8 pages.
Hong, H. et al., "Data-Oriented Programming: On the Expressiveness of Non-Control Data Attacks," IEEE S&P, 18 pages, 2016.
Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).
Intel; "Intel 64 and IA-32 Architectures Software Developer's Manual," vol. 1: Basic Architecture, Chapter 3: Basic Execution Environment; Oct. 2019; 57 pages.
Intel; "Intel 64 and IA-32 Architectures Software Developer's Manual," vol. 1: Basic Architecture, Chapter 6: Procedure Calls, Interrupts, and Exceptions; Oct. 2019; 48 pages.
Intel; "Intel 64 and IA-32 Architectures Software Developer's Manual," vol. 3: System Programming Guide, Chapter 6; Oct. 2019; 110 pages.
Intel® 64 and IA-32 Architectures Software Developer's Manual, vol. 2B: Instruction Set Reference, M-U, Sep. 2016, retrieved from https://www.intel.com/content/dam/www/public/US/en/documents/manuals/64-ia-32-architectures-software-developer-vol-2b-manual.pdf, (706 pages).
Intel® 64 and IA-32 Architectures Software Developer's Manual, vol. 3D: System Programming Guide, Part 4, Sep. 2016, 224 pages, retrieved from https://www.intel.com/content/dam/www/public/US/en/documents/manuals/64-ia-32-architectures-software-developer-vol-3d-part-4-manual.pdf, (224 pages).
Non-Final Office Action received in U.S. Appl. No. 16/998,913, dated Jan. 25, 2023, 13 pages.
Non-Final Office Action received in U.S. Appl. No. 17/472,272, dated Jul. 7, 2023, 11 pages.
Notice of Allowance, U.S. Appl. No. 16/024,259, May 20, 2020, 20 pages.
Notice of Allowance, U.S. Appl. No. 16/728,928, Feb. 22, 2021, 10 pages.
Notice of Allowance, U.S. Appl. No. 17/321,087, Apr. 13, 2022, 13 pages.
Notice of Allowance, U.S. Appl. No. 17/321,087, May 4, 2022, 9 pages.
U.S. Appl. No. 17/953,186; filed Sep. 26, 2022 .
USPTO Final Office Action for U.S. Appl. No. 17/481,405 received on Aug. 30, 2023, entitled, Cryptographic Computing Including Enhanced Cryptographic Addresses (21 pages).
USPTO Final Office Action for U.S. Appl. No. 17/485,213 received on Aug. 8, 2023, entitled, Object and Cacheline Granularity Cryptographic Memory Integrity (19 pages).
USPTO Final Office Action in U.S. Appl. No. 16/724,059 mailed on Sep. 2, 2022 (34 pages).
USPTO Final Office Action in U.S. Appl. No. 17/576,533 mailed on May 30, 2023 (9 pages).
USPTO Final Office Action in U.S. Appl. No. 17/833,515 mailed on Sep. 25, 2023 (24 pages).
USPTO Non-Final Office Action for U.S. Appl. No. 17/481,405 received on Feb. 16, 2023, entitled, Cryptographic Computing Including Enhanced Cryptographic Addresses (19 pages).
USPTO Non-Final Office Action for U.S. Appl. No. 17/485,213 received on Feb. 14, 2023, entitled, Object and Cacheline Granularity Cryptographic Memory Integrity (19 pages).
USPTO Non-Final Office Action for U.S. Appl. No. 17/539,933, filed Dec. 1, 2021 entitled, Security Check Systems and Methods for Memory Allocations (5 pages).
USPTO Non-Final Office Action in U.S. Appl. No. 16/709,612 mailed on Feb. 17, 2022 (17 pages).
USPTO Non-Final Office Action in U.S. Appl. No. 16/720,059 mailed on Jan. 21, 2022 (20 pages).
USPTO Non-Final Office Action in U.S. Appl. No. 16/722,342 mailed on Aug. 29, 2022 (14 pages).
USPTO Non-Final Office Action in U.S. Appl. No. 16/723,871 mailed on Nov. 10, 2022 (11 pages).
USPTO Non-Final Office Action in U.S. Appl. No. 16/723,927 dated Jun. 8, 2021 (32 pages).
USPTO Non-Final Office Action in U.S. Appl. No. 16/723,977 mailed on Aug. 3, 2021 (37 pages).
USPTO Non-Final Office Action in U.S. Appl. No. 16/724,105 mailed on Jul. 13, 2021 (10 page).
USPTO Non-Final Office Action in U.S. Appl. No. 16/740,359 mailed on Sep. 27, 2021 (8 pages).
USPTO Non-Final Office Action in U.S. Appl. No. 16/862,022 mailed on Jun. 20, 2023 (12 pages).
USPTO Non-Final Office Action in U.S. Appl. No. 17/134,405 mailed on Aug. 1, 2022 (15 pages).
USPTO Non-Final Office Action in U.S. Appl. No. 17/134,406 mailed on Jan. 21, 2022 (11 pages).
USPTO Non-Final Office Action in U.S. Appl. No. 17/576,533 mailed on Feb. 7, 2023 (8 pages).
USPTO Non-Final Office Action in U.S. Appl. No. 17/833,515 mailed on Apr. 14 (23 pages).

(56) References Cited

OTHER PUBLICATIONS

USPTO Notice of Allowance for U.S. Appl. No. 16/998,913 received Aug. 7, 2023 (13 pages).
USPTO Notice of Allowance for U.S. Appl. No. 17/485,213 received Dec. 14, 2023 (6 pages).
USPTO Notice of Allowance for U.S. Appl. No. 17/539,933 received Jun. 16, 2023 entitled, Security Check Systems and Methods for Memory Allocations (7 pages).
USPTO Notice of Allowance in U.S. Appl. No. 16/709,612 mailed on Aug. 23, 2022 (18 pages).
USPTO Notice of Allowance in U.S. Appl. No. 16/709,612 mailed on Nov. 25, 2022 (14 pages).
USPTO Notice of Allowance in U.S. Appl. No. 16/722,342 mailed on Apr. 24, 2023 (4 pages).
USPTO Notice of Allowance in U.S. Appl. No. 16/722,342 mailed on Feb. 23, 2023 (7 pages).
USPTO Notice of Allowance in U.S. Appl. No. 16/722,342 mailed on Jul. 13, 2023 (7 pages).
USPTO Notice of Allowance in U.S. Appl. No. 16/722,707 mailed on Mar. 28, 2022 (10 pages).
USPTO Notice of Allowance in U.S. Appl. No. 16/723,468 mailed on Oct. 18, 2021 (10 pages).
USPTO Notice of Allowance in U.S. Appl. No. 16/723,871 mailed on May 26, 2023 (7 pages).
USPTO Notice of Allowance in U.S. Appl. No. 16/723,927 dated Dec. 24, 2021 (13 pages).
USPTO Notice of Allowance in U.S. Appl. No. 16/723,977 mailed on Feb. 3, 2022 (13 pages).
USPTO Notice of Allowance in U.S. Appl. No. 16/724,026 mailed on Aug. 10, 2022 (9 pages).
USPTO Notice of Allowance in U.S. Appl. No. 16/724,026 mailed on Dec. 7, 2022 (14 pages).
USPTO Notice of Allowance in U.S. Appl. No. 16/724,105 dated Nov. 16, 2021 (9 pages).
USPTO Notice of Allowance in U.S. Appl. No. 16/724,105 mailed on Mar. 31, 2022 (8 pages).
USPTO Notice of Allowance in U.S. Appl. No. 16/740,359 mailed on Mar. 22, 2022 (9 pages).
USPTO Notice of Allowance in U.S. Appl. No. 16/776,467 mailed on Jul. 18, 2022 (10 pages).
USPTO Notice of Allowance in U.S. Appl. No. 16/776,467 mailed on Nov. 9, 2022 (8 pages).
USPTO Notice of Allowance in U.S. Appl. No. 17/134,405 mailed on Jan. 31, 2023 (8 pages).
USPTO Notice of Allowance in U.S. Appl. No. 17/134,406 mailed on Oct. 5, 2022 (10 pages).
International Preliminary Report on Patentability for International Patent Application No. PCT/US2020/067076, mailed Jul. 6, 2023; 7 pages.
Japanese Office Action received in Application No. 2022-540601, dated Sep. 3, 2024, with English translation, 6 pages.
Kim, Yonghae, et al.; "Hardware-based Always-On Heap Memory Safety," 2020 53rd Annual IEEE/ACM International Symposium on Microarchitecture (MICRO); Athens, Greece; 14 pages.
Kroes et al., Fast and Generic Metadata Management with Mid-Fat Pointers, 2017, ACM, 6 pages (Year: 2017).
Kwon, Albert et al., "Low-Fat Pointers: Compact Encoding and Efficient Gate-Level Implementation of Fat Pointers for Spatial Safety and Capability-based Security," CCS' 13: Proceedings of the 2013 ACM SIGSAC Conference on Computer & Communications Security, Nov. 4-8, 2013, Berlin Germany (12 pages).
L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008, doi: 10.1109/TC.2008.69; 14 pages.
L. Muscariello et al., "Hybrid Information-Centric Networking draft-muscariello-intarea-hicn-00," Cisco Systems, Inc., Jun. 7, 2018 (21 pages).

Liljestrand, Hans et al. "PACStack: an Authenticated Call Stack," Sep. 3, 2019, retrieved from https://arxiv.org/pdf/1905.10242.pdf, (20 pages).
Liljestrand, Hans, et al., "PAC it up: Towards Pointer Integrity using ARM Pointer Authentication", accessed at https://arxiv.org/pdf/1811.09189.pdf, last updated May 24, 2019, 21 pages.
Mohamed et al., "A scheme for implementing address translation storage buffers," Proceedings of the 2002 IEEE Canadian Conference on Electrical and Computer Engineering, 2002, pp. 626-632.
Myoung Jin Nam, Periklis Akritidis, and David J Greaves. 2019. Framer: a tagged-pointer capability system with memory safety applications. In Proceedings of the 35th Annual Computer Security Applications Conference (ACSAC '19), Association for Computing Machinery, New York, NY, USA, 612-626, https://doi.org/10.1145/3359789.3359799.
Nasahl, Pascal et al., "CrypTag: Thwarting Physical and Logical Memory Vulnerabilities using Cryptographically Colored Memory", https://doi .org/10.48550/arXiv.2012.06761, ARXIV ID: 2012.06761, Dec. 12, 2020. (13 pages).
Neagu, Madalin, et al.; "Increasing Memory Security Through Data Scrambling and Information Entropy Models," 2014 IEEE 15th International Symposium on Computational Intelligence and Informatics; Nov. 2014; 5 pages.
PCT International Preliminary Report on Patentability issued in PCT/US2020/067072, dated Aug. 25, 2022; 8 pages.
PCT International Search Report and Written Opinion issued in PCT/US2020/067072, dated May 26, 2021; 13 pages.
PCT International Search Report and Written Opinion issued in PCT/US2020/067076, dated Sep. 9, 2021; 11 pages.
Pyo, Changwoo, "Encoding Function Pointers and Memory Arrangement Checking against Buffer Overflow Attack," In Proceedings of the 4th International Conference on Information and Communications Security (ICICS 2002) (12 pages).
Qualcomm Technologies, Inc., "Pointer Authentication on ARMv8.3, Design and Analysis of the New Software Security Instructions," Jan. 2017, retrieved from https://www.qualcomm.com/media/documents/files/whitepaper-pointer-authentication-on-armv8-3.pdf, (12 pages).
Savry, Olivier, et al., "Intrinsec, an Intrinsically Secure Processor", Risc V Workshop, Dec. 6, 2019, accessed at: http://riscv.org/wp-content/uploads/2019/06/16.15-CEA-RISC-V-Workshop-Zurich.pdf, (15 pages.).
Serebryany, Kostya, "ARM Memory Tagging Extension and How it Improves C/C++ Memory Safety," Summer 2019, (5 pages).
The Electronics Resurgence Initiative, "SSITH: TA1 (Hardware) Performers," Dec. 22, 2018, available online at https://eri-summit.darpa.mil/docs/ERIPoster_Applications_SSITH_DARPA.pdf, (1 page).
Tuck, Nathan et al., "Hardware and Binary Modification Support for Code Pointer Protection From Buffer Overflow," 37th International Symposium on Microarchitecture (MICRO-37'04), 2004, pp. 209-220 (12 pages).
USPTO Notice of Allowance in U.S. Appl. No. 17/833,515 mailed on Apr. 2, 2024 (9 pages).
USPTO Restriction Requirement in U.S. Appl. No. 16/862,022 mailed on Feb. 2, 2023 (6 pages).
USPTO Supplemental Notice of Allowance in U.S. Appl. No. 16/722,707 mailed on Apr. 8, 2022 (5 pages).
USPTO; Notice of Allowance issued in U.S. Appl. No. 17/472,272, dated Jan. 9, 2024, 9 pages
Watson et al., Capability Hardware Enhanced RISC Instructions (CHERI): Notes on the Meltdown and Spectre Attacks, University of Campbridge Computer Laboratory, Feb. 2018, 16 pages.
Watson, Robert N.M., et al., "An Introduction to CHERI", Technical Report UCAM-CL-TR-941, University of Cambridge Computer Labratory, Cambridge, United Kingdom, Sep. 2019, 43 pages.
Watson, Robert N.M., et al., "Capability Hardware Enhanced RISC Instructions: CHERI Instruction-Set Architecture (Version 8)," University of Cambridge Computer Laboratory Technical Report No. 951, Cambridge, UK; Oct. 2020 (590 pages).
Watson, Robert N.M., et al., "Cheri: A Hybrid Capability-System Architecture for Scalable Software Compartmentalization", 2015

(56) References Cited

OTHER PUBLICATIONS

IEEE Symposium on Security and Privacy, May 2015, accessed at https://discovery.ucl.ac.uk/id/eprint/1470067/1/oakland15cheri.pdf, 18 pages.

Whelihan, David et al., "A Key-Centric Processor Architecture for Secure Computing," 2016 IEEE International Symposium on Hardware Oriented Security and Trust (HOST), 2016, pp. 173-178. (6 pages).

Xia, Hongyan et al., "CHERIvoke: Characterising Pointer Revocation using CHERI Capabilities for Temporal Memory Safety, " MICRO-52, Oct. 2019, Columbus, OH, US (13 pages).

Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).

Yan, Z., et al., "Hardware translation coherence for virtualized systems," 2017 3 ACM/IEEE 44th Annual International Symposium on Computer Architecture (ISCA), 2017, pp. 430-443, doi: 10.1145/3079856.3080211. {Year: 2017}.

Yang, Jun et al., "Improving Memory Encryption Performance in Secure Processors," IEEE Transactions on Computers, vol. 54, No. 5, May 2005 (11 pages).

Zhu, Ge et al., "Protection against indirect overflow attacks on pointers," Second IEEE International Information Assurance Workshop, 2004. Proceedings., 2004, pp. 97-106. (10 pages).

USPTO Notice of Allowance in U.S. Appl. No. 17/855,261 mailed on Oct. 29, 2024 (10 pages).

USPTO Notice of Allowance in U.S. Appl. No. 17/878,322 mailed on Dec. 18, 2024 (10 pages).

USPTO Notice of Allowance in U.S. Appl. No. 17/855,261, dated Jan. 16, 2025; 9 pages.

USPTO Notice of Allowance in U.S. Appl. No. 18/499,133 mailed on Feb. 26, 2025; 7 pages.

\* cited by examiner

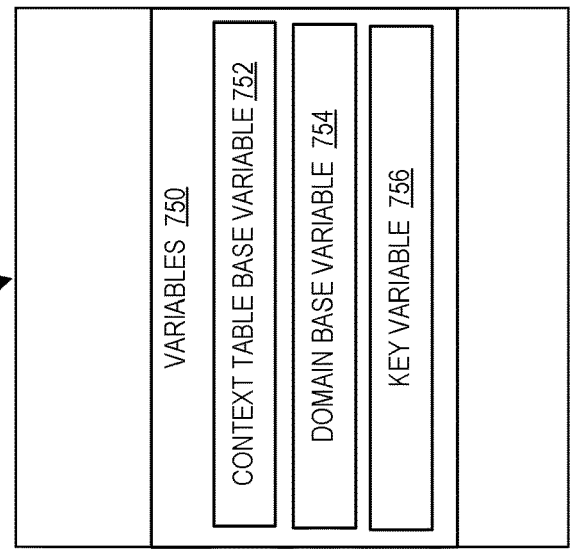
FIG. 7C
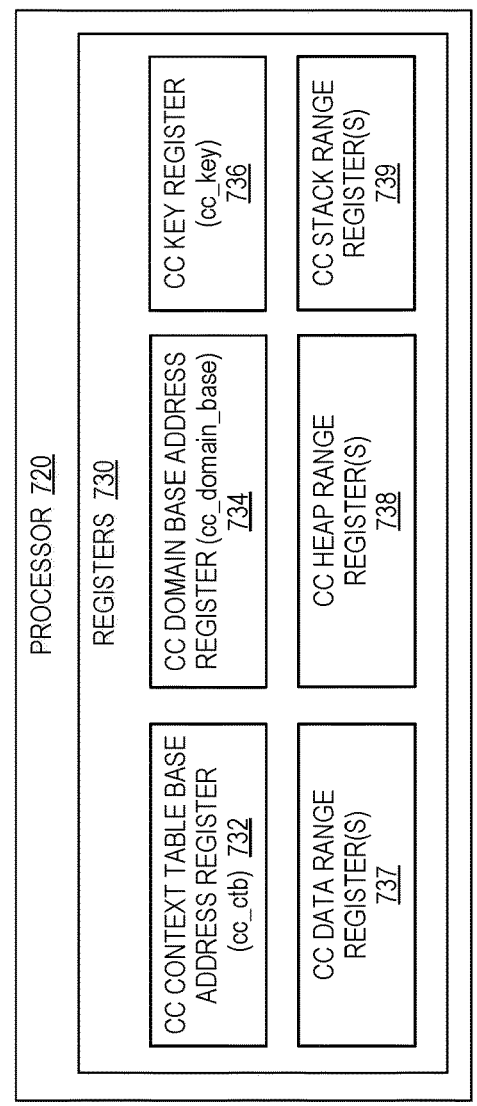
FIG. 7A
FIG. 7B

ENCODED RETURN ADDRESS ON SHARED LIBRARY FUNCTION CALLS 900

| DOMAIN SWITCH VALUE 902 | DOMAIN ID 904 | UNUSED BITS 906 | RETURN ADDRESS (RA) / OFFSET 908 |
|---|---|---|---|

FIG. 9

```
dl_runtime_resolve(index,...) {                      ~801
    target = .got[index]                             ~802
    if (target == 0)
        target = lookup_symbol()                     }~804 dest = lookup_domain(target)                     ~806
    source = lookup_domain(RA)                       ~808
    encoded RA = domain_switch_value                 ~810
                 || source || RA[0:47]

cc_key_reg =
      context_table[dest].key_handle                 }
    cc_domain_base_reg =                               ~812
      context_table[dest].load_addr jmp target                                       ~814
}
```
800

FIG. 8

```
ret                                                  ~1001
================
If (RA.domain_switch_value==0x2e)                    ~1002
    id = RA.domainID                                 ~1004
    ctb = context table base from cc_ctb_reg         ~1006
    cc_key_reg = ctb[id].key_handle                  ~1008
    cc_domain_base_reg = ctb[id].load_addr           ~1010
```
1000

FIG. 10

CRYPTOGRAPHIC COMPUTING ISOLATION FOR MULTI-TENANCY AND SECURE SOFTWARE COMPONENTS

TECHNICAL FIELD

The present disclosure relates in general to the field of computer systems, and more specifically, cryptographic computing isolation for multi-tenancy and secure software components.

BACKGROUND

Today's software programs typically rely on several software primitives that are provided by operating system vendors (OSVs) and independent software vendors (ISVs). Generally, a software primitive can include a segment of code that can be used to enhance or build a more complex software program. OSVs may provide software primitives that can be utilized by software applications running on the OSVs' particular operating systems. ISVs provide software that runs on one or more computer hardware or operating system platforms. Cloud computing platforms are often used as a vehicle for offering software from ISVs and OSVs that can be used by different applications or different tenants in a multi-tenant environment. For example, web browsers are applications that rely on dozens of third-party libraries to render audio, video, images, and other content. Although software developers depend on these primitives, often no assurances are given that the libraries providing these primitives are reliable and not malicious.

BRIEF DESCRIPTION OF THE DRAWINGS

FIG. 7A is a block diagram illustrating a processor including a context table and registers according to at least one embodiment.

FIG. 7B is a block diagram illustrating a processor including example cryptographic computing registers according to at least one embodiment.

FIG. 7C is a block diagram illustrating a selected portion of an example processor control block according to at least one embodiment.

FIG. 8 is example pseudocode of runtime module in a dynamic linker loader to enable cryptographic isolation of software components according to at least one embodiment.

FIG. 9 is a block diagram illustrating an example encoded return address for a shared library function call according to at least one embodiment.

FIG. 10 is example pseudocode of a return instruction for returning control to a software component that called a currently executing software component according to at least one embodiment.

DETAILED DESCRIPTION

Figure 1:
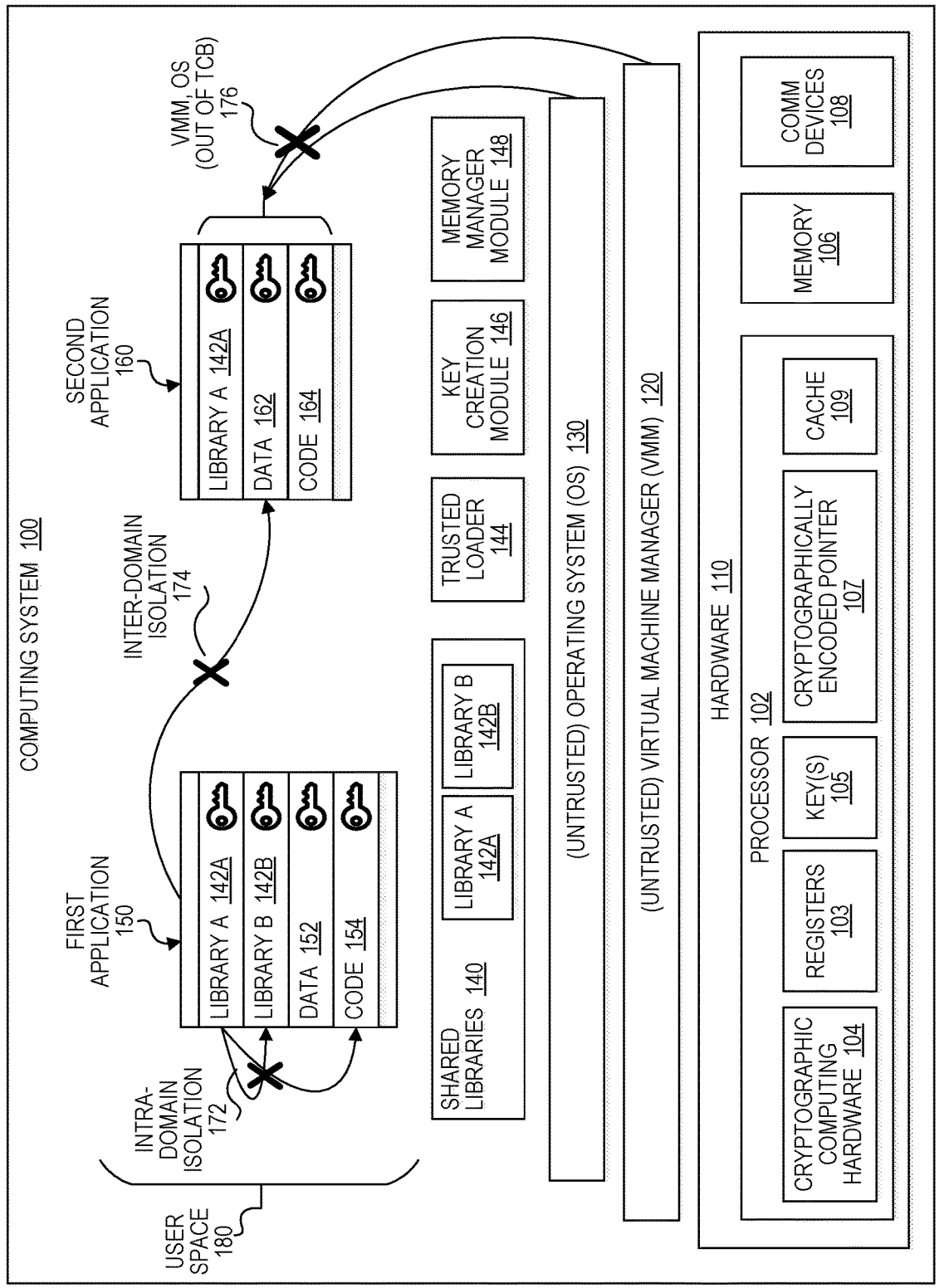
FIG. 1 is a block diagram illustrating an example computing system providing cryptographic computing isolation for multi-tenancy and secure software components according to at least one embodiment.

The present disclosure provides various possible embodiments, or examples, of systems, methods, apparatuses, architectures, and machine readable media for cryptographic computing isolation for multi-tenancy and secure software components. In particular, embodiments disclosed herein provide a low-latency and fine-grained domain isolation mechanism for untrusted software components within applications of a multi-tenant environment, or even applications outside of a multi-tenant environment, such as single tenant applications. In one or more embodiments, each domain (e.g., software component) is assigned a separate cryptographic key or keys which are used to encrypt the domain's code and/or data. As the execution transitions from one domain to another, the corresponding cryptographic key (also referred to herein as 'domain-specific key' and 'key') is loaded and used to decrypt data and code. The operating system (OS) and any virtual machine managers (VMMs) are prevented from accessing the trusted computing base (TCB) such that legacy compatibility is maintained.

As used herein, a 'software component' (also referred to as a 'software primitive') is intended to mean a file containing program code (e.g., an object file, a library, an executable, a dynamically loadable module, a statically loadable module) that can be linked with one or more other files containing program code to form one application. Additionally, a software component includes position-independent code (PIC), which may be loaded and executed by multiple applications running in separate application containers or tenants. Some software components may be independently executable and capable of running in their own containers. At least some software components, like libraries, can be executable in the context of something else and, therefore, are invoked as part of some larger application. Examples of software components include, but are not necessarily limited to, functions (e.g., user-defined functions, shared libraries, FaaS functions, etc.), microservices, and browser components. Browser components could include a library for processing images, video, and/or audio, a tab within the browser, another site outside the browser, or any other executable browser component.

For purposes of illustrating the several embodiments of a computing system providing cryptographic computing isolation for multi-tenancy and secure software components, it is important to first understand the operations and activities associated with cryptographic computing involving pointer based encryption, in addition to multi-tenant environments and the use of untrusted software components by multiple tenants or other software applications. Accordingly, the following foundational information may be viewed as a basis from which the present disclosure may be properly explained.

Cryptographic computing (CC) is a stateless memory safety technique that does not require storing any metadata or memory layout changes. Cryptographic computing replaces inefficient metadata memory accesses with efficient cryptography by assigning a unique and distinct cryptographically isolated space for each allocation. More specifically, cryptographic computing can be used to protect code and data in memory by using cryptography and software allocated memory addresses (linear/virtual address space, also referred to as 'pointers' or 'object pointers') mapped to physical memory addresses of memory locations where the code and data are stored. In cryptographic computing, an object pointer that stores a linear address of data or code can be encoded with metadata. In some implementations, cryptographic computing leverages the concept of a cryptographic addressing layer where the processor encrypts a portion (also referred to herein as a 'slice') of the linear address in the pointer based on implicit and/or explicit metadata and/or at least a portion of the linear address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and a cryptographic key. A tweak comprises one or more bits that represent a value. In one or more embodiments, a tweak may compose all or part of an initialization vector (IV) for a block cipher. A resulting cryptographically encoded pointer can comprise an encrypted portion (or slice) of the memory address and some bits of encoded metadata.

Encryption of a portion of the encoded pointer can prevent forgery by an attacker. When decryption of an address is performed, if the information used to create the tweak (e.g., implicit metadata, explicit metadata, plaintext address slice of the memory address, etc.) corresponds to the original allocation of the linear address by a memory allocator (e.g., software allocation method), then the processor can correctly decrypt the address. Otherwise, a random address result will cause a fault and get caught by the processor.

These cryptographically encoded pointers (or portions thereof) may be used by the processor to derive a tweak to a code/data encryption cipher used to encrypt/decrypt code and data referenced by the cryptographically encoded pointers. Thus, a cryptographic binding can be created between the cryptographic addressing layer and data/code encryption and decryption. This implicitly enforces bounds since a pointer that strays beyond the end of an object is likely to use incorrect metadata (e.g., domain identifier) for that adjacent object. Thus, the data or code of an object can only be decrypted correctly if access is performed using its cryptographically encoded pointer, which is effectively unforgeable.

In some embodiments, the cryptographically encoded pointer may be decrypted and decoded to obtain the linear address. Alternatively, in some embodiments, the memory address may not be encrypted but the pointer may still be encoded with some metadata representing a unique value among pointers. It should be noted that a tweak that is used as input to a block cipher to encrypt/decrypt code or data is also referred to herein as a 'code/data tweak.' Similarly, a tweak that is used as input to a block cipher to encrypt/decrypt a memory address is also referred to herein as an 'address tweak.'

Cryptography continues to become faster and lighter. For instance, the Advanced Encryption Standard (AES) has been the mainstay for data encryption for decades, using a 128-bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64-bit, 48-bit, 32-bit, 16-bit, etc. using Simon, Speck, PRINCE or any other block cipher).

Lightweight ciphers suitable for pointer encryption have emerged recently. The PRINCE cipher, for example, can be implemented in 3 clocks requiring as little as 799 μm$^2$ of area in the 10 nm process, providing half the latency of AES in a tenth the Silicon area. Cryptographic computing may utilize these new ciphers, as well as others, introducing novel computer architecture concepts related to, but not limited to: (i) cryptographic addressing, i.e., the encryption of data and code pointers at the processor using, as tweaks, contextual information about the referenced data (e.g., metadata embedded in the pointer and/or external metadata), a slice of the address itself, or any suitable combination thereof; and (ii) encryption of the data and code itself at the core, using cryptographically encoded pointers or portions thereof, non-cryptographically encoded pointers or portion (s) thereof, contextual information about the referenced data (e.g., context information stored in designated cryptographic computing registers), or any suitable combination thereof as tweaks for the data or code encryption. A variety of encryption modes that are tweakable can be used for this purpose of including metadata (e.g. counter mode (CTR) and XOR-encrypt-XOR (XEX)-based tweaked-codebook mode with ciphertext stealing (XTS)). In addition to encryption providing data and code confidentiality, its implicit integrity may allow the processor to determine if the data or code is being properly decrypted using the correct keystream and tweak. In some block cipher encryption modes, the block cipher creates a keystream, which is then combined (e.g., using XOR operation) with an input block to produce the encrypted or decrypted block. In some block ciphers, the keystream is fed into the next block cipher to perform encryption or decryption.

Multi-tenancy environments have become ubiquitous in recent years as cloud computing environments have grown to be a mainstream approach for handling the computing needs of an entity. In a multi-tenancy environment, multiple entities can use a cloud computing platform provided by a cloud vendor and share computing resources, including compute, memory, and/or networking resources. A cloud computing platform can include remote servers in one or more data centers, and the remote servers host applications and data. Applications and data hosted in a particular cloud computing platform may be accessed by authorized entities (e.g., owners/tenants of the applications and data) over the Internet or network. In addition to sharing computing resources, multiple applications in a cloud computing platform may share one or more software components. Moreover, any given application may rely on several software components provided by multiple third party vendors.

Libraries that offer software components often do not provide guarantees that the software components are reliable and uncompromised (e.g., malware-free). Bugs and/or exploits in one library may compromise an entire application and/or system. For example, a web browser can rely on numerous third-party shared libraries to render audio, video, images, and other content. Recent attacks haven show that memory safety bugs in a library can exploit the web browser application, leading to privilege escalation. Similar security risks exist in microservices, functions-as-a-services, etc., where multiple tenants share the infrastructure. Furthermore, as artificial intelligence (AI) and machine learning (ML) applications become more prevalent, the ML models and data may have several constituent parts, where isolating the intellectual property (IP) and the data are both required from a privacy perspective, such as private AI.

Isolation mechanisms such as Trusted Execution Environments (TEES), reliance on operating system page tables using ring separation, physical protection of assets, and other proprietary solutions often come with a cost and reliance on trusting on the service providers and owners of the infrastructure. Some of these solutions also require software developers to rebuild their applications, including recompiling, to enforce bindings between different offerings in different environments.

A computing system providing cryptographic computing isolation for multi-tenancy and secure software components, as disclosed herein, can resolve many of the aforementioned issues (and more). In one or more embodiments, cryptographic computing is used to protect in-memory code and data within and across domains for multi-tenant applications via object-granular cryptographic isolation. Each software component is considered a different domain that includes its own code and data. Embodiments provide efficient cryptography by assigning a unique and distinct cryptographically isolated space for each allocation. Accordingly, a cryptographic computing system as disclosed herein can provide intra-process isolation among multiple domains and inter-process isolation among multiple processes. In a more specific example, mutually untrusted software components (e.g., applications, shared libraries, microservices/functions, etc.) can be isolated via individual cryptographic keys. The cryptographic keys of the various software components of an application may be stored in a context table created during the instantiation of the application and accessed as each software component is invoked. Additionally, switching from one domain to another is very efficient as it simply involves switching the cryptographic keys.

Embodiments of a computing system as disclosed herein provides a mechanism for object granular data and code encryption in a multi-tenant application (or single tenant application). The computing system can achieve a zero touch, legacy compatible solution that inherently provides code and data separation (e.g., cryptographic isolation) among mutually untrusted domains while preserving performance and latency. To provide object granularity of memory encryption, a cryptographically encoded pointer can be used to tweak data encryption per object allocation (e.g., based on allocation size, location, type and/or version). This per object allocation encryption provides security at a finer granularity. To provide low overhead domain isolation, cryptographic keys are updated upon switching between domains, instead of expensive process context switching. Code and data are encrypted in cache and memory and are cryptographically bound to the corresponding object pointer. Thus, security is achieved in a much finer granularity such as per-object allocation.

Reference is now made to the drawings. FIG. 1 is a simplified block diagram of an example computing system configured to provide cryptographic computing isolation for multi-tenancy and secure software components according to at least one embodiment. In the example shown, computing system 100 includes hardware 110, a virtual machine manager (VMM) 120, an operating system (OS) 130, and shared libraries 140 that include a trusted loader 144. The hardware 110 can include one or more processors 102, memory 106, and cryptographic computing hardware 104. In one example, the processor 102 may be coupled to memory 106, which may include, but is not necessarily limited to, cache that is integrated with the processor, cache that is separate from the processor, and main memory that is separate from the processor. The cc hardware 104 may be integrated with the processor 102 or may be separate from the processor and communicatively coupled to the hardware.

Computing system 100 also illustrates an example scenario in which shared libraries include library A 142A and library B 142B, and two applications invoking those libraries are instantiated as processes running on computing system 100. A first application 150 running in user space 180 of computing system 100 includes data 152, code 154 of a main program in first application 150, library A 142A, and library B 142B. The second application 160 running in user space 180 of computing system 100 includes data 162, code 164 of a main program in second application 160, and library A 142A.

Libraries, such as library A 150 and library B 142B, can be individually integrity checked and encrypted. Thus, embodiments can use cryptographic key switching to enable sharing of the libraries across processes and within processes. This allows programs to be broken down and secured within a single process address space, down to the library and data object granularity using only cryptography for isolation. Instead of switching processes and coarse grain page tables, cryptographic keys can be efficiently switched between program components (or domains). Thus, cryptographic separation of a thread of a user application process having its own paging structures is obtained by changing cryptographic keys, even though the thread runs in the same address space as other threads of the user application process and thus shares the same page table structures. In addition to using domain-specific keys, code (e.g., main program code 154, 164, libraries 142A, 142B) may be encrypted using the offset from binary load address to deal with position-independent code of shared libraries. On a context switch from one process to another, cryptographic keys and other information can be loaded from a process control block and saved to cryptographic computing registers.

The main program code of an application (e.g., code 154 of first application 150, code 164 of second application 160) and shared libraries (e.g., library A 142A, library B 142B)

are encrypted while being loaded in-memory. Consequently, intra-domain isolation is established such that the libraries are cryptographically isolated from each other and from the data and code of a main program of the application. Similarly inter-domain isolation is enforced, where an application is cryptographically isolated from data, code, and software components (e.g., shared libraries) of another application.

A visual representation of example intra-domain isolation and example inter-domain isolation are provided in FIG. 1. Intra-domain isolation 172 is established within first application 150 where library A 142A and library B 142B, which are encrypted using different cryptographic keys and loaded in first application 150, are cryptographically isolated from each other and from data 152 and code 154 of the main program in first application 150. In addition, inter-domain isolation 174 is established across the processes of first application 150 and second application, as a first set of cryptographic keys are used to encrypt the first application 150 (e.g., data 152, code 154) and the libraries 142A and 142B loaded in the first application 150, and a second set of cryptographic keys is used to encrypt the second application 160 (e.g., data 162 and code 164) and the libraries 142A and 142B loaded in the second application 160. The first set of cryptographic keys are different than the second set of cryptographic keys and thus, the first application 150 is cryptographically isolated from the data 162 and code 164 of the main program of the second application 160 and the library 142A loaded in the second application, even though decrypting library 142A and library 142A results in equivalent library code (e.g., 142A).

Additionally, embodiments using cryptographic keys for applications and their software components, as disclosed herein, effectively remove the VMM and OS from the trusted computing base (TCB). Consequently, applications and their software components are cryptographically isolated from the VMM and OS, which are often untrusted. As shown in FIG. 1, for example, the second application 160 is cryptographically isolated from, and therefore cannot be directly accessed by, VMM 120 and OS 130 because VMM 120 and OS 130 are untrusted and not part of the TCB of computing system 100.

Referring in more detail to FIG. 1, computing system 100 may be embodied as any type of electronic device for performing the functions related to cryptographic computing isolation described herein. Computing system 100 can include, but is not limited to, a server, a desktop, a laptop, a workstation, a tablet, a mobile device, a smartphone, a mobile computing device, a vehicle telematics device, a distributed computing system, a multiprocessor system, a consumer electronic device, etc. (any of which may include physical hardware or a virtual implementation on physical hardware), or any other device, component, or element capable of performing the activities described herein. In some implementations, computing system 100 may be disaggregated into, for example, compute resources (e.g., processor 102, cryptographic computing hardware 104, etc.), memory resources (e.g., memory 106, storage, etc.), and/or network resources (e.g., network interface card (NIC), wireless network interface card (WNIC), etc.). In at least some scenarios, disaggregated resources used to provide cryptographic computing isolation for multi-tenancy and secure software components may be provided in a cloud computing platform.

The hardware 110 of computing system 100 includes processor 102 and memory 106. The memory 106 may be embodied as any type of volatile or non-volatile memory or data storage capable of performing the functions associated with cryptographic computing isolation described herein. In operation, memory 106 may store various data and code of software components (e.g., applications, programs, libraries, etc.) used during operation of the computing system 100, as well as operating systems, other system software, and drivers. Memory 106 may store data and/or code, which includes sequences of instructions that are executed by the processor 102. In some embodiments, the memory 106 may be located on one or more integrated circuit chips that are distinct from an integrated circuit chip comprising processor 102 or may be located on the same integrated circuit chip as the processor 102.

Memory 106 may comprise any suitable type of memory and is not limited to a particular speed or technology of memory in various embodiments. For example, memory 106 may comprise any suitable type of volatile memory such as random access memory (e.g., dynamic random access memory (DRAM), static random access memory (SRAM)), cache (e.g., level 1 (L1), level 2 (L2), etc.), and/or shared cache. Memory 106 may also comprise any suitable type of nonvolatile memory such as read only memory (ROM), optical discs, and/or computer storage devices (e.g., hard disk drive (HDD), solid state drive (SDD), floppy disk, magnetic tape, flash drive, etc.).

Processor 102 may be embodied as any type of processor capable of performing the functions related to cryptographic computing isolation described herein. For example, the processor 102 may be embodied as a single-core or multi-core central processing unit (CPU), a multiple-CPU processor or processing/controlling circuit, multiple diverse processing units or circuits (e.g., CPU, Graphics Processing Unit (GPU), Vision Processing Unit (VPU), etc.), a microprocessor, embedded processor, a digital signal processor (DSP), a system-on-a-chip (SoC), a co-processor, or any other processing device to execute code. The processor 102 has a number of registers 103, which include general purpose registers and special purpose registers (e.g., instruction pointer register (RIP) or program counter, stack register, status registers, etc.). The cryptographically encoded pointer 107 and the cryptographic key(s) 105 are stored in registers 103. Processor 102 may also include cache 109, which may be L1 and/or L2 cache for example, where data and/or code is stored when it is retrieved from memory 106 in anticipation of being fetched by processor 102.

Processor 102 may further include cryptographic computing (CC) hardware 104. CC hardware 104 can include any suitable hardware to perform some of the cryptographic functions related to cryptographic computing isolation described herein. For example, CC hardware 104 may include a tweakable block cipher to decrypt a portion of a cryptographically encoded pointer. Some possible examples of tweakable block ciphers include tweakable version of a cipher (e.g., 32-bit block size or other suitable block size) such as SIMON, SPECK, K-cipher, or other variable block size cipher, or for larger addresses, PRINCE, XTS-AES block cipher, LRW, AES-CTR mode, etc. may be used). CC hardware 104 may also include an AES-CTR mode block cipher, at any suitable size granularity, to encrypt code using the appropriate key generated for the code. CC registers (e.g., key register, context table address register, software component load address register) and hardware to load and update the registers may also be included in CC hardware 104.

Processor 102 is communicatively coupled to the memory 106, e.g., via an input/output (I/O) subsystem. The I/O subsystem may be embodied as circuitry and/or components to facilitate input/output operations with the processor 102, the memory 106, and other components of computing system 100. For example, the I/O subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem may form a portion of a system-on-a-chip (SoC) and be incorporated, along with the processor 102, the memory 106, and/or other components of the computing system 100, on a single integrated circuit chip.

The computing system 100 further includes one or more communication devices 108, which may be embodied as any communication circuit, device, or collection thereof, capable of enabling communications between the computing system 100 and other electronic devices. The communication devices 108 may be configured to use any one or more communication technologies (e.g., wireless or wired communications) and associated protocols (e.g., Ethernet, Bluetooth™, Wi-Fi™, WiMAX, 3G/LTE, etc.) to effect such communication. For example, the communication devices 108 may be embodied as a network adapter, network interface card (NIC), wireless network adapter, wireless NIC, smart NIC, etc.

The example computing system 100 also includes a number of software components, such as one or more user space applications (e.g., first application 150, second application 160) and libraries (e.g., library A 142A, library B 142B). The user space applications may be embodied as any computer applications (e.g., software, firmware, hardware, or a combination thereof) that interact directly or indirectly with an end user via, for example, the a display device or a UI subsystem. Some examples of user space applications include word processing programs, document viewers/readers, web browsers, electronic mail programs, messaging services, computer games, camera and video applications, etc.

The computing system 100 may also include privileged system components, at least portions of which may be embodied as virtual machine manager (VMM) 120 and/or operating system (OS) 130. Among other things, the privileged system components, such as VMM 120 and/or OS 130, facilitate the communication between the user space applications (e.g., first application 150, second application 160) and the hardware 110 of the computing system 100. In one example, operating system 130 may include any operating system capable of performing the functions described herein, such as a version of WINDOWS by Microsoft Corporation, ANDROID by Google, Inc., IOS by Apple, Inc., and/or others. In some, but not necessarily all implementations, the privileged system component may include a VMM (e.g., VMM 120), which may be embodied as any type of virtual machine manager capable of performing the functions described herein (e.g., a type I or type II hypervisor).

One or more embodiments include other privileged system components such as trusted loader 144 and key creation module 146. In some embodiments, trusted loader 144 and key creation module 146 may be embodied as part of VMM 120 and/or as part of OS 130. Furthermore, trusted loader 144 and key creation module 146 may be part of a trusted execution environment (TEE), a virtual machine, processor 102, a co-processor (not shown), or any other suitable hardware, firmware, or software in computing system 100 or securely connected to computing system 100. Trusted loader 144 and key creation module 146 may be capable of performing functions as described herein that enable the exclusion of VMM 120 and OS 130 from a trusted computing base (TCB) in computing system 100. In at least some scenarios, such as a multi-tenant environment where first application 150 and second application 160 represent different tenants, the VMM 120 and OS 130 may be untrusted. Thus, cryptographic computing isolation as described herein removes the VMM 120 and the OS 130 from the TCB such that any bugs or vulnerabilities in the VMM 120 and/or OS 130 cannot be leveraged to successfully attack the data and code of the tenants.

Trusted loader 144 can be configured to, during the instantiation of an application, perform various operations to cryptographically isolate software components (e.g., shared libraries) of the application. Trusted loader 144 can also be configured to, during the runtime of the application, appropriately handle the cryptographically isolated software components. For example, during instantiation of an application, trusted loader 144 can create a per-process context table for the process being instantiated from the application, generate or otherwise obtain per-domain cryptographic keys (also referred to herein as 'domain-specific keys') to encrypt the software components of the application (e.g., shared libraries, application code), store the per-domain keys and context information for the domain-specific keys in the context table, load the software components into memory, encrypt the software components using the respective domain-specific keys while loading the software components into memory, and populate appropriate registers to start the process (e.g., begin execution of the application).

During the runtime of an application, trusted loader 144 is invoked whenever a shared library (or other software component) is called but has not been unresolved. In this scenario, the trusted loader 144 resolves the symbol of the called library, encodes the return address (which may include encryption of at least a portion of the return address and possible metadata encoded in the return address), which was already pushed to stack, and update the cryptographic computing registers for the function being called. It should be noted that not all return addresses are to be encoded. A return address is encoded, for example, when a shared library is called. A return address may also be encoded when calling or invoking other software components that are shared by other tenants, accessible from third parties, or otherwise untrusted including, but not necessarily limited to a microservice, a function as a service (FaaS), or a browser component.

In some implementations, trusted loader 144 can also be configured to allocate portions of memory 106 to the various processes running on the computing system 100 (e.g., as ranges of virtual memory addresses). The trusted loader 144 may also release/deallocate portions of memory 106 that are allocated to the various processes running on the computing system 100. The trusted loader 144 may be embodied as, for example, a dynamic linker-loader, a loader, a linker-loader, a memory manager service, or a heap management service.

Key creation module 146 creates the cryptographic key(s) 105, which can be specific to software components of an application. Key creation module 146 and can generate or otherwise obtain cryptographic keys 105 and write the cryptographic keys to a register or registers to which the processor 102 has read access (e.g., a general purpose register or a special purpose register). To create a cryptographic key, the key creation module 146 may execute, for example, a random number generator, deterministic number generator, or another algorithm capable of generating a string of data that can be used by a cryptographic algorithm to encrypt or decrypt other data and/or code, as described herein. It should be noted that a myriad of approaches could be used to generate or obtain a cryptographic key for embodiments disclosed herein. For example, although the key creation module 146 is shown as being part of computing system 100, one or more cryptographic keys could be obtained from any suitable external source using any suitable authentication processes to securely communicate the key to computing system 100, which may include generating the key as part of those processes. Moreover, the cryptographic key may be "secret", which is intended to mean that its value is kept hidden, inaccessible, obfuscated, or otherwise secured from unauthorized actors (e.g., software, firmware, machines, extraneous hardware components, and humans).

Figure 2:
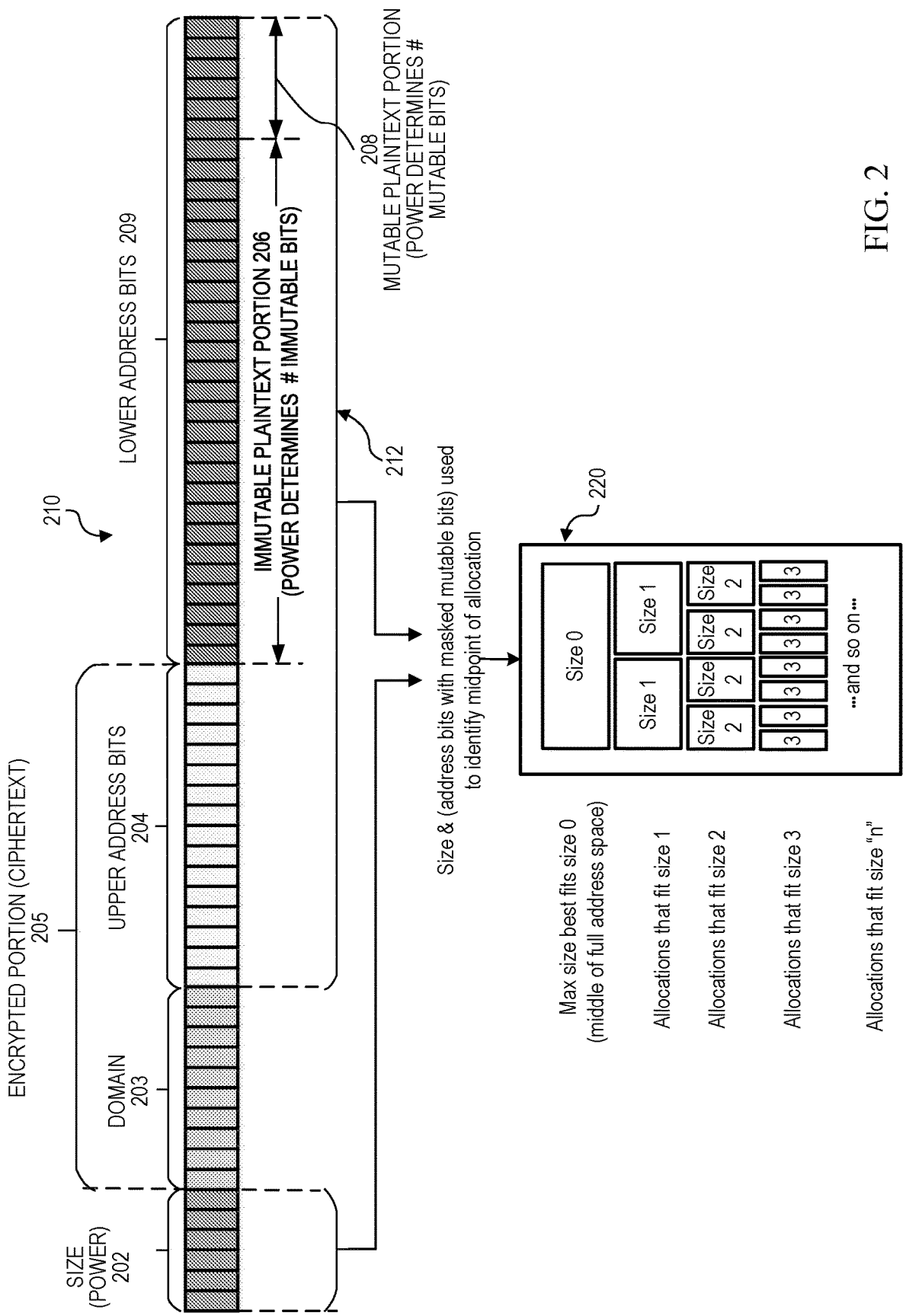
FIG. 2 is a diagram of an example cryptographically encoded pointer according to an embodiment.

FIG. 2 is a diagram of an example pointer illustrating the contents of an unencrypted encoded pointer (no encryption) and a cryptographically encoded pointer (with encryption) according to one or more embodiments of the present disclosure. The term 'encoded pointer' as used herein is applicable to both the unencrypted encoded pointer and the cryptographically encoded pointer. The cryptographically encoded pointer 210 includes an encrypted portion (ciphertext portion 205) and is one example configuration of cryptographically encoded pointer 107 of FIG. 1. The encoded pointer 210 may be any bit size, such as, for example, a 64-bit pointer (as shown in FIG. 2), or a 128-bit pointer, or a pointer that is larger than 128-bits. The pointer, in one embodiment, may include a x86 architecture pointer. The encoded pointer 210 may include a greater (e.g., 128-bits), or lesser (e.g., 16-bits, 32-bits) number of bits. FIG. 2 shows a 64-bit pointer (address) in its base format, using exponent (power) size metadata but not an offset.

The encoded pointer 210 is an example configuration that may be used in one or more embodiments and may be the output of special address encoding logic that is invoked when memory is allocated (e.g., by an operating system, in the heap or in the stack, in the text/code segment) and provided to executing programs in any of a number of different ways, including by using a function such as malloc, alloc, calloc, or new; or implicitly via the loader; or statically allocating memory by the compiler, etc. As a result, an indirect address (e.g., a linear address) that points to the allocated memory, is encoded with address metadata and, in at least some embodiments, is partially encrypted.

In the example shown, a linear address 212 in the pre-encrypted encoded pointer includes upper address bits 204 and lower address bits 209. Although in this example the upper address bits 204 include 16 bits, and the lower address bits 209 include 32 bits, it should be appreciated that the number of bits may vary for each portion based on particular needs, implementations, and architectures, especially when larger or smaller pointers are encoded (e.g., 32-bit pointer, 128-bit pointer, 256-bit pointer, etc.). The encoded pointer 210 includes a size metadata portion 202 indicating a size of a mutable plaintext portion 208 of the encoded pointer 210. A number of low order address bits that comprise the mutable plaintext portion (or offset) 208 of the encoded pointer 210 may be manipulated freely by software for pointer arithmetic. In some embodiments, the size metadata portion 202 may include power (exponent) metadata bits that indicate a size based on a power of two. Other embodiments may use a different power (exponent). For ease of illustration, encoded pointer 210 of FIG. 2 will be assumed to have a power of two (Po2) size metadata encoding. Another metadata portion can include domain metadata 203, such as a domain identifier or other information that uniquely identifies the domain (e.g., main program or software component of a user application) associated with the pointer. Some embodiments may include additional or alternative metadata in the encoded pointer 210, such as a tag, version, size of the domain, or any other suitable metadata.

The size metadata portion 202 may indicate the number of bits that compose the immutable plaintext portion 206 and the mutable plaintext portion 208. In certain embodiments, the total number of bits that make up the lower address bits 209 (e.g., the immutable plaintext portion 206 and the mutable plaintext portion 208) may be constant (e.g., 32 bits in encoded pointer 210), with the sizes of the respective portions being dictated by the Po2 size metadata portion 202. For example, if the Po2 size metadata value is 0 (bits: 000000), no mutable plaintext bits are defined and all of the lower address bits 209 form an immutable plaintext portion, which may be used in a tweak to generate ciphertext portion 205 from an address slice (i.e., a subset of the linear address bits such as upper address bits 204) and domain metadata 203. As further examples, if the power size metadata value is 1 (bits: 000001), then a 1-bit mutable plaintext portion and a 31-bit immutable plaintext portion are defined, if the power size metadata value is 2 (bits: 000010), then a 2-bit mutable plaintext portion and a 30-bit immutable plaintext portion are defined, and so on, up to a 32-bit mutable plaintext portion with no immutable plaintext bits.

In the example of FIG. 2, the Po2 size metadata equals 6 (bits: 000110), resulting in a 6-bit mutable plaintext portion 208 and a 26-bit immutable plaintext portion 206. The mutable plaintext portion 208 may be manipulated by software, e.g., for pointer arithmetic or other operations. The ciphertext portion 205 (e.g., 32 bits in the example shown) of the encoded pointer 210 may be generated by a small tweakable block cipher (e.g., a SIMON, SPECK, or tweakable K-cipher at a 32-bit block size, or other variable bit size tweakable block cipher). The remaining plaintext lower address bits 209 (e.g., 32 bits in the example shown) can be used as part of the tweak for the tweakable block cipher used to encrypt the domain metadata 203 and upper address bits 204 to generate the ciphertext portion 205. The immutable plaintext (non-encrypted) portion 206 of the address cannot be modified by software (e.g., pointer arithmetic) like the bits of mutable plaintext portion 208 without causing the ciphertext portion 205 to decrypt incorrectly. The base pointer format shown in FIG. 2 allows for cryptographically describing object sizes and their location in memory. In some cases, the Po2 size metadata portion 202 could be provided as a separate parameter in addition to the pointer; however, in some cases (e.g., as shown) the bits of the Po2 size metadata portion 202 may be integrated with the encoded pointer 210 to provide legacy compatibility in certain cases.

It should also be noted that in an alternative scenarios, the Po2 size metadata portion 202 may indicate the number of bits that compose the immutable plaintext portion 206, and thus dictate the number of bits remaining to make up the mutable plaintext portion 208. For example, if the Po2 size metadata value is 0 (bits: 000000), there are no immutable plaintext bits (in immutable plaintext portion 206) and all of the lower address bits 209 form a mutable plaintext portion and may be manipulated by software using pointer arithmetic. As further examples, if the Po2 size metadata value is 1 (bits: 000001), then there is a 1-bit immutable plaintext portion and a 31-bit mutable plaintext portion, if the Po2 size metadata value is 2 (bits: 000010), then there is a 2-bit immutable plaintext portion and a 30-bit mutable plaintext portion, and so on, up to a 32-bit immutable plaintext portion with no mutable plaintext bits where no bits can be manipulated by software.

Also, although encoded pointer 210 is illustrated and described based on using a 26-bit ciphertext portion 205, the pointer format is not intended to be so limited. The address slice to be encrypted may use any bit-size block encryption cipher. Thus, an encryption cipher using any other block size (e.g., 32, 16, variable, etc.), may be used instead. If the number of ciphertext bits is adjusted (upward or downward), the remaining address bits to be encoded (e.g., immutable and mutable portions) may be adjusted accordingly.

In yet further embodiments, the pointer may be encoded with metadata (e.g., domain metadata 203, etc.) as described herein, but may not be encrypted. In this embodiment, additional metadata may be encoded in the pointer, such as tag or version metadata that comprises temporal safety bits. In this embodiment, the tag/version portion may be unique for each encoded pointer of a container and may be randomly or deterministically generated.

When a processor is running in a cryptographic mode and accessing memory using an encoded pointer such as encoded pointer 210, to get an actual linear/virtual address, the processor takes the encoded address format and decrypts the ciphertext portion (e.g., 205 of FIG. 2). Any suitable cryptography may be used and may optionally include as input a tweak derived from the encoded pointer. In one example, a tweak may include the plaintext lower address bits (e.g., 209 in FIG. 2) and a secret key. In some instances, the size/power/exponent metadata and/or other metadata or context information may be included as part of the tweak to a cryptographic algorithm to generate the ciphertext portion 205 (also referred to herein as "address tweak"). In one or more embodiments, all of the plaintext lower address bits 209 may be used as part of tweak. If the address decrypts incorrectly, the processor may cause a general protection fault (#GP) or page fault due to the attempted memory access with corrupted linear/virtual address.

A graphical representation of a memory space 220 illustrates possible memory slots to which memory allocations for various encodings in the Pot size metadata portion 202 of encoded pointer 210 can be assigned. Each address space portion of memory, covered by a given value of the plaintext corresponding to the upper address bits 204, contains a certain number of allocation slots (e.g., one Size 0 slot, two Size 1 slots, four Size 2 slots, etc.) depending on the width of the Pot size metadata portion 202.

Referring still to FIG. 2, the size metadata portion 202, in combination with the information in the address fields (e.g., upper address bits 204 decrypted from ciphertext portion 205 and plaintext lower address bits 209 with masked mutable plaintext portion 208), can allow the processor to find the midpoint of a given slot defined in the memory space 220. For a power of two scheme, where the size field includes size exponent information, as the size exponent becomes larger (for larger slots, such as Size 0), fewer address bits are needed to identify a particular slot (since with larger slots, there will be fewer slots to identify). In such a case, more of the bits at the end of the pointer, in the bits of mutable plaintext portion 208 (e.g., where pointer arithmetic can be performed), can be used to range within a given slot. The latter leads to a shrinking of the address field and an expanding of the pointer arithmetic field.

In some embodiments, encoded pointers 210 may refer to data 152 and data 162. It may be beneficial for first application 150 to be permitted to generate encoded pointers 210 referencing data 152 and prevented from generating encoded pointers 210 referencing data 162, and it may be beneficial for second application 160 to be permitted to generate encoded pointers 210 referencing data 162 and prevented from generating encoded pointers 210 referencing data 152. Some embodiments may include a range register (e.g., registers 103) that specifies the boundaries of the data for the current application. For example, that range register may be set to the bounds of data 152 when first application 150 is active and it may be set to the bounds of data 162 when second application 160 is active. The range register contents may be saved and restored to and from memory in the context table (e.g., context table 710 shown in FIG. 7).

Encoded pointers may be generated using, for example, an EncryptGlobalPtr instruction, as the data regions 152 and 162 conventionally store global variables. EncryptGlobalPtr may accept as input operands the bounds of a global variable for which the application desires to generate an encoded pointer 210 referencing that global variable. EncryptGlobalPtr may check whether the input bounds are entirely contained within the bounds currently set in the range register. If not, an exception may be generated. If the input bounds are entirely contained within the bounds currently set in the range register, then EncryptGlobalPtr may generate an encoded pointer 210 referencing the power-of-two-aligned slot that best fits the input bounds. EncryptGlobalPtr may accept input operands in other formats, such as directly specifying a power-of-two-aligned slot that should be encoded into the pointer after checking that the midpoint of the specified slot is contained within the bounds currently set in the range register and otherwise generating an exception. EncryptGlobalPtr may also accept other input operands specifying context information such as tag/version to be encoded into the pointer. EncryptGlobalPtr may also use implicit input operands such as a register specifying the current domain ID so that those inputs can be incorporated into the encoded pointer as well. The encoded pointer for the data of the current application may be contained in the instruction pointer register (e.g., RIP on X86-64 architecture) so that position-independent data accesses and pointer computations relative to RIP use the correct encoding. Alternatively, the processor may automatically regenerate the encoded pointer for the data of the current application each time a RIP-relative access or pointer computation is requested. If RIP is formatted as an encoded pointer 210, any instruction that switches domains may initialize RIP to the correct encoded format by freshly generating it from an unencrypted code pointer, the destination domain ID, and other implicit or explicit input operands, or by loading a precomputed, encoded pointer value. Some embodiments may use the encoded pointer for the data region just for encrypting or decrypting data in that region, and they may use alternative approaches for encrypting and decrypting other data regions and code.

Some embodiments may include a second range register or set of range registers (e.g., registers 103) covering the heap region(s) that belong to the active application. An EncryptHeapPtrWithinRange instruction could be defined to perform analogous pointer encoding and range checking operations as EncryptGlobalPtr, except relative to the value (s) of the current heap range register(s). The heap range register(s) may be saved and restored to and from memory in the context table (e.g., context table 710 in FIG. 7).

Some embodiments may include an additional range register or set of range registers covering the stack region(s) that belong to the active application. An EncryptStackPtrWithinRange instruction could be defined to perform analogous pointer encoding and range checking operations as EncryptGlobalPtr, except relative to the value(s) of the current stack range register(s). The stack range register(s) may be saved and restored to and from memory in the context table 710. The value of the stack pointer register (e.g., RSP on X86-64 architecture) could be set in an encoded format that references the active stack region so that stack references automatically use the correct stack pointer encoding to access encrypted data on the stack.

Figure 3A:
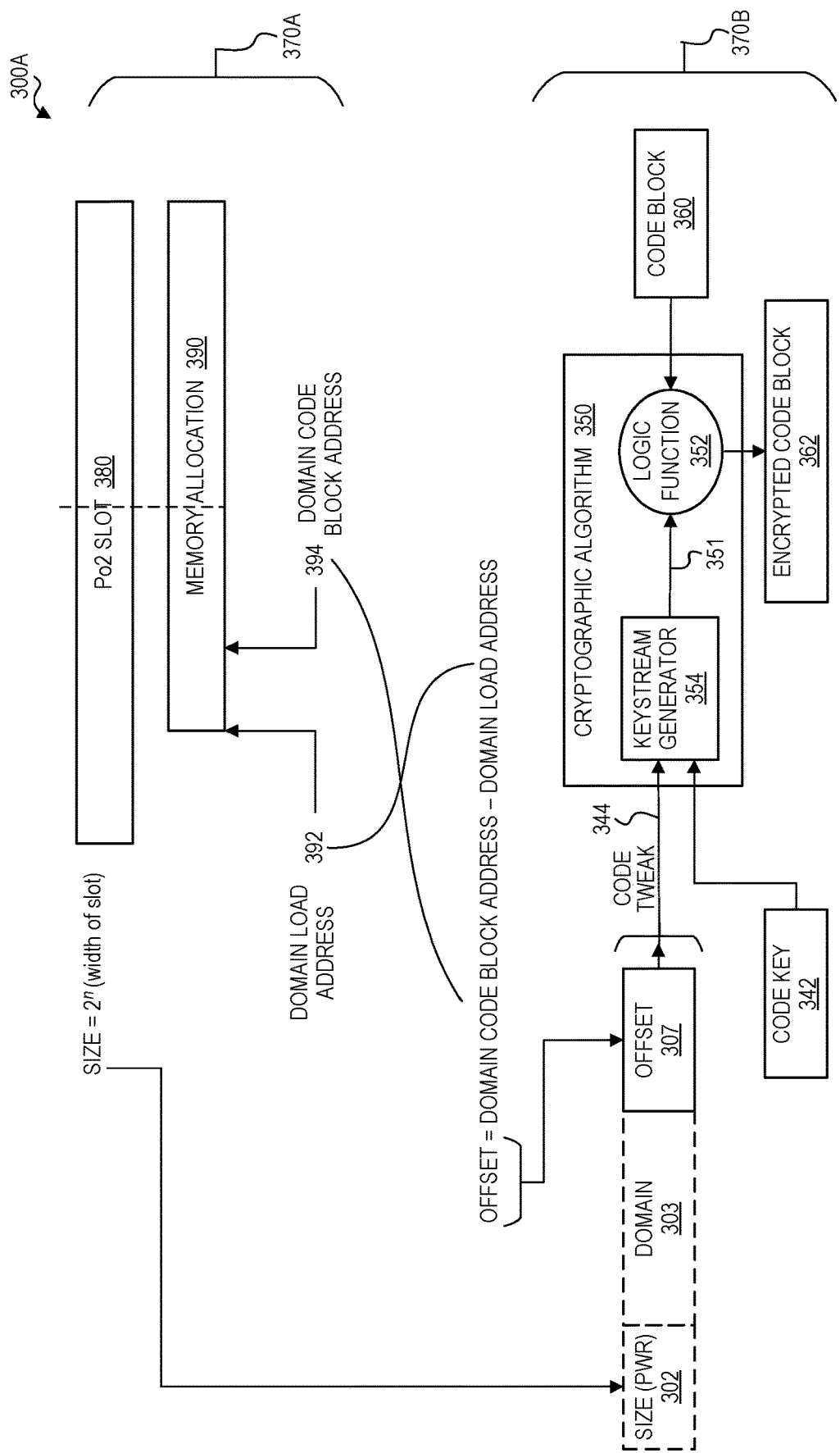
FIG. 3A is flow diagram illustrating an example process of binding encryption of code to a linear address of the code and to domain metadata according to at least one embodiment.

FIG. 3A is flow diagram illustrating an example process 300A of encrypting code of a software component or main program of a user application based, at least in part, on a relative position of the code being encrypted according to at least one embodiment. Examples of software components include, but are not necessarily limited to, functions (e.g., user-defined functions, shared library functions, static library functions, FaaS functions, etc.), microservices, and browser components (e.g., library, tab within a browser, etc.). In one or more embodiments, at least some portions of process 300A may be executed by a trusted loader (e.g., 144) during a load time to load a user application and its associated software components, or during a loading process to dynamically load a software component in the address space of a user application process in response to being invoked in runtime. In some implementations, the encryption portion of process 300A may be executed to encrypt a software component prior to the load time of a container (or application) that invokes the software component.

In at least one embodiment, process 300A may be performed by trusted loader 144 in software, thus enabling the cryptographic protection of software components as described herein without the need for recompiling or other changes if the computing system is configured with cryptographic computing. In other embodiments, the linking and/or loading process, or a portion thereof (e.g., cryptographic operations), may be performed in hardware and/or firmware, or in any suitable combination of hardware, firmware, and/or software.

When a user application is launched, during the instantiation of the process, trusted loader 144 may allocate memory needed for code of the main program of the application and for one or more software components of the application. Memory may also be allocated during runtime to dynamically load another software component when that other software component is called by the main program or a currently executing software component. In at least one embodiment, the loader can allocate memory as shown at 370A and encrypt code of a software component as shown at 370B. The encrypted code may be loaded in the allocated memory.

An example of a memory allocation for code of a software component (or a main program of an application) is graphically depicted at 370A. In this example, a memory allocation 390 for the code of a software component is sized to contain the loadable binary segments of the software component. In at least some embodiments, during a load process in which the software component is to be loaded in memory, a power of two (Po2) slot 380 that is aligned on a power of two boundary in virtual memory space, and in which the memory allocation 390 can fit, can be selected. The memory allocation 390 can be assigned to the selected Po2 aligned slot 380. Size metadata 302 that indicates the size of the selected memory slot may be generated.

Domain metadata 303, such as a domain identifier that uniquely identifies the software component (or a main program of an application), can also be determined. Domain metadata 303 uniquely identifies a software component invoked by a main program (or another software component). Domain metadata 303 may also uniquely identify the software component across a platform. A domain ID may be generated or otherwise obtained using any suitable approach. In one example, domain IDs may be generated dynamically (e.g., during the first encryption and load) and made shareable across the platform. This could be realized by generating a hash of the binary file itself as a domain ID, as will be further discussed below. In another example, domain IDs may be pre-determined and stored in memory or other storage that is accessible to the loader.

Once the domain metadata of the software component is determined and a power of two slot and linear address of the memory allocation for the software component are selected, encryption is performed on code blocks, such as code block 360, of the software component using a cryptographic algorithm 350. A code bock can include a particular size of code to be encrypted. In some scenarios, the size of a code block corresponds to the number of bytes fetched from memory (e.g., 64-byte cache line, etc.). In at least some embodiments, the code block corresponds to the granularity of the encryption mechanism (e.g., a keystream generator 354 producing a 4-byte keystream 351). Each code block may contain one or more instructions. Encryption can be performed using a domain-specific code key 342 and a code tweak 344. In at least one embodiment, the code tweak 344 may be generated based on an offset 307. In other embodiments, other metadata may be used in addition to or as an alternative to offset 307. For example, other metadata that may be used to generate code tweak 344 include, but is not necessarily limited to size (power) metadata 302, domain metadata 303, and/or memory allocation size metadata. In the example in FIG. 3A, size metadata 302 refers to Pot aligned memory slot 380 (also referred to as 'domain slot'), to which the memory allocation 390 is assigned. The memory allocation 390 contains the loadable binary segments of the software component (also referred to as 'domain'). The domain metadata 303 may include a domain identifier that uniquely identifies the domain relative to other domains (e.g., other software components and the main program of the user application) within the process instantiated from the user application. The domain identifier may also uniquely identify the domain relative to other domains running on the same platform or multiple platforms.

The offset 307 can be determined by calculating a distance (e.g., in bytes) between the domain load address 392 in-memory (for the code block to be encrypted) and the domain code block address 394 in-memory. For example, the offset 307 can be computed by subtracting a load address (e.g., 392) of the domain from the linear address (e.g., at 394) of the code block to be encrypted. The offset 307 can be used in the code tweak 344 instead of the absolute linear address in order to accommodate position-independent code.

Although the offset 307 may be calculated in the particular manner as described above to accommodate position independent code, alternative approaches may be used to determine the relative position of position independent code within a virtual address space. Generally, any approach may be used to determine a relative position (e.g., code byte offset) of a code block of position independent code within a given virtual address space of a given process instantiated on a computing system, if the alternative approach can be used to determine an equivalent relative position for the same code block being accessed via a different virtual address space of a different process instantiated on the same computing system.

In some embodiments, the code may be pre-encrypted, using a code key shared across domains and processes, while in storage so that it can be loaded more quickly without delays due to encrypting code at load-time. For example, a package manager may encrypt programs in storage, and it may record the domain ID that was used to encrypt each program, e.g., in the executable and linkable format (ELF) binary file, so that the loader can use that domain ID value to construct an encoded pointer to reference the code using the correct domain ID. Alternatively, the domain ID could be computed as a hash of the binary file itself, although that may result in collisions. If the domain ID space is not large enough to assign a unique domain ID to all of the software components managed simultaneously by the package manager, then the loader may re-encrypt software components with colliding domain IDs so that a new domain ID can be used. Another benefit of pre-encrypting software components in storage is that the existing OS support for sharing storage pages mapped multiple times, e.g., by different processes, can share the pre-encrypted software components (also referred to herein as 'pre-encrypted code'). The offset from the beginning of the code memory allocation to the beginning of the particular code block being encrypted should be the same everywhere that the pre-encrypted software component is loaded for it to be shared with identical encryption. If the code tweak also includes size metadata 302 corresponding to a power of two sized slot, then there could be a convention that each pre-encrypted software component is fitted into the smallest slot that is at least as large as the pre-encrypted software component. That may result in gaps in the linear/virtual address space between loaded pre-encrypted software components, but those gaps do not need to be mapped to physical memory. Thus, they do not result in wasted physical memory. Those gaps may also be reclaimed for use as heap or stack allocations or memory-mapped file-backed or anonymous regions. Even if pre-encrypted software components each start at a power-of-two-aligned base, it is still possible to pack smaller pre-encrypted software components into free space at the ends of slots partially filled by other dynamically encrypted or pre-encrypted software components, since they are encrypted differently due to their mismatched power values and possibly different domain IDs. It should be noted that any other suitable slot-size algorithm may be implemented to select a fixed slot size in which the pre-encrypted software component can fit. Thus, the selection of a minimum slot size is one possible approach, but alternative approaches may be used.

As shown in FIG. 3A, the code of the software component (or main program of a user application) can be encrypted by cryptographic algorithm 350, which can include a keystream generator 354 and a logic function 352. In at least one embodiment, keystream generator 354 can be implemented as an AES-CTR mode block cipher, at any suitable size of granularity. In this embodiment, the contents of code tweak 344 are used as the initialization vector (IV). The offset 307 (or alternative location information) in the code tweak will change with each new code block and therefore, can serve as a counter value (CTR). Optionally, other metadata may be included in the code tweak 344, such as size metadata 302 and/or domain metadata 303. Keystream generator 354 encrypts code tweak 344 based on a code key 342 to generate a keystream 351. The code key 342 is unique to the domain of the code being encrypted. Thus, multiple code keys can be used to encrypt the code of a user application with multiple software components.

In one or more implementations, the value of code tweak 344 may be adjusted to be congruent to 0 (modulo the block size of the keystream generator 354) prior to being used as an input to the keystream generator. The value of the code tweak 344 may have some suitable number of least significant bits set to 0 to satisfy this requirement and a prefix of the keystream 351 may be discarded to account for that adjustment. The number of bytes of the keystream 351 to discard may be computed by subtracting the adjusted value of the code tweak 344 from the unadjusted value of the code tweak 344. This adjustment may modify the values of immutable plaintext bits in cryptographically encoded pointers to code blocks assigned to slots (e.g., Po2 slot 380) that are smaller than the block size. If the memory to be encrypted and stored crosses one or more block-aligned boundaries, the keystream generator 354 may be re-invoked for the subsequent blocks with the code tweak 344 being increased by an amount equal to the block size each time that it is re-invoked. A suffix of the generated keystream 351 may be unneeded and thus discarded.

An XOR operation or other suitable logic function 352, or combination of logic functions, may be performed on keystream 351 and code block 360 (which may be a cache line in some implementations) of the software component. In one example, the granularity of the code block 360 matches the keystream 351 output from of the keystream generator 354, and the logic function 352 produces an encrypted code block 362. In other examples, the code block 360 may be divided into multiple portions that each match the keystream 351 output from the keystream generator 354. Each portion of the code block 360 may be encrypted based on the code key 342 and a respective offset 307. A respective offset may be calculated based on a respective linear address of the portion of the code block to be encrypted. The resulting encrypted code block 362 may be stored in the memory allocation 390. It should be noted that, instead of using an AES-CTR mode block cipher, other forms of encryption may be used to encrypt and decrypt code including, but not necessarily limited to various types of tweakable block ciphers.

Figure 3B:
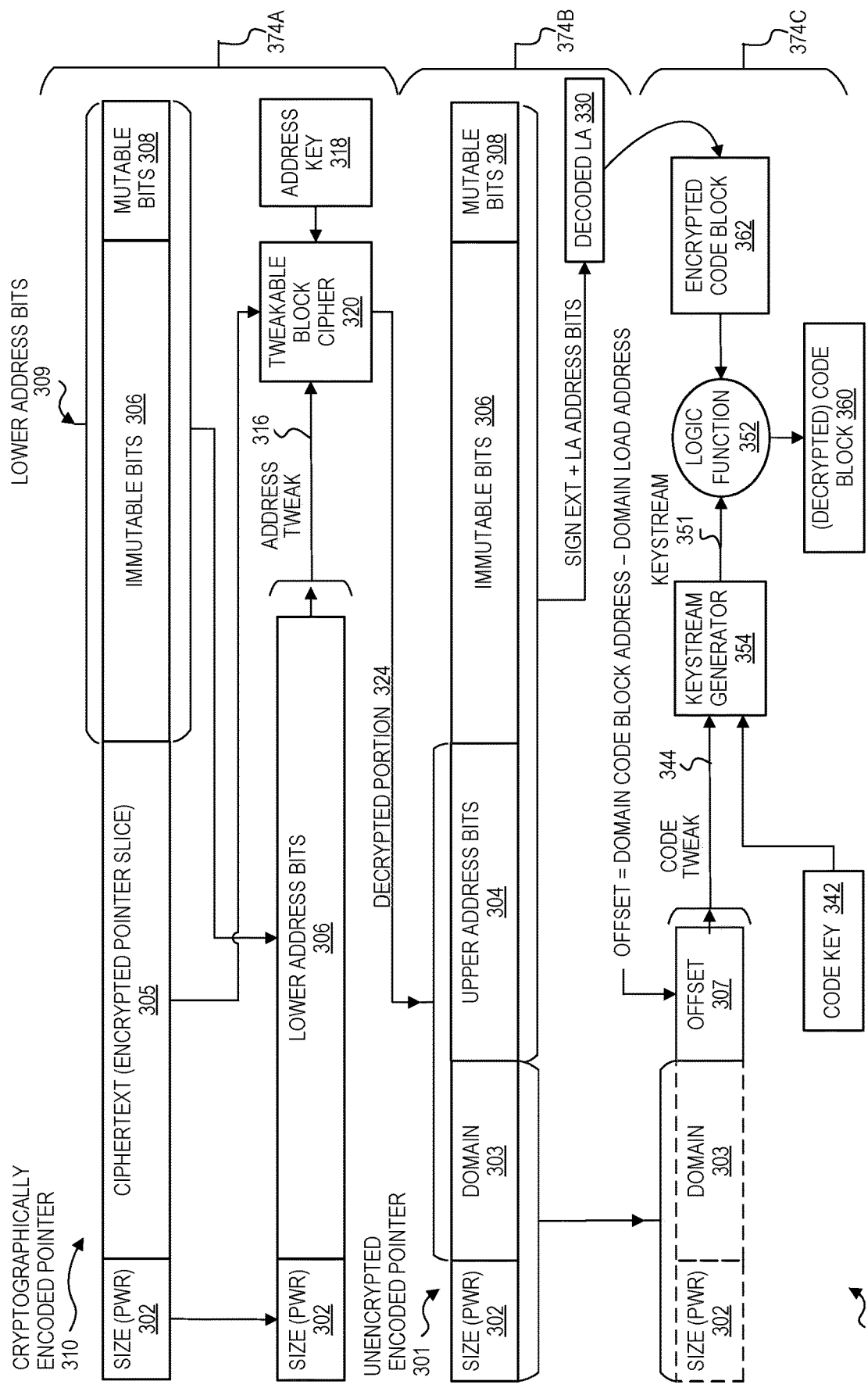
FIG. 3B is a flow diagram illustrating an example process of obtaining and decrypting encrypted code referenced by the cryptographically encoded pointer according to at least one embodiment.

FIG. 3B is a flow diagram illustrating an example process 300B of obtaining (e.g., reading, fetching) and decrypting the encrypted code block 362. In this example, the encrypted code block 362 is referenced by a cryptographically encoded pointer 310, where encryption of the code is bound to a relative position of code block 360 within the address space. The relative position of code block 360 may be an offset of the code block from the load address of the software component (or main program) that contains the code block 360. Pot size metadata and domain metadata may be encoded in the cryptographically encoded pointer 310, and optionally, may be used in addition to or as an alternative to the relative position of the code to be decrypted. In at least one embodiment, process 300C may be performed in hardware (e.g., cryptographic computing hardware 104). In other embodiments, process 300C (or a portion thereof) may be performed by firmware and/or software, or by any suitable combination of hardware, firmware, and/or software.

The operations of process 300C are identified in three phases: address decryption (Phase I 374A), address formation (Phase II 374B), and code decryption (Phase III 374C). In Phase I 374A, the linear address embedded in the cryptographically encoded pointer 310 is decrypted. The cryptographically encoded pointer 310 may have the same or similar configuration as described with reference to other cryptographically encoded pointers described herein (e.g., 210). In the decryption, ciphertext 305 of the encoded linear address is decrypted by a decryption algorithm such as a tweakable block cipher 320 using address key 318 and address tweak 316. The same address tweak 316 used during to encrypt the pointer slice (e.g., domain metadata 203 and upper address bits 204 as shown and described with reference to FIG. 2) is used to decrypt the ciphertext 305 resulting from the encryption. For example, size metadata 302 and lower address bits 309 can form address tweak 316. The block cipher 320 may be any suitable decryption algorithm (e.g., tweakable version of a 32-bit block size cipher such as SIMON, SPECK, K-cipher, or other variable block size cipher, or for larger addresses, PRINCE, XTS-AES block cipher, LRW, AES-CTR mode, etc. may be used) as previously noted herein. In some embodiments, the address key 318 may be the same as the code key 342 for a particular domain. In other embodiments, the address key 318 may be distinct from the code key 342. Decrypting the ciphertext 305 of the cryptographically encoded pointer 310 into a decrypted portion 324 by tweakable block cipher 320, results in an unencrypted encoded pointer 301. In Phase II 374B, a decoded linear address 330 that references encrypted code block 362 can be formed from the unencrypted encoded pointer 301. The lower address bits 309 (e.g., bits 0-31) and upper address bits 304 (e.g., 32-47) can be concatenated with the most significant bits (e.g., bits 48-63 in the bit places of domain metadata 303 and size metadata 302), which may be noncanonical/unused address bits in some architectures, to form the decoded linear address 330. In one scenario, the domain metadata 303 and size metadata 302 can be overwritten with sign extension bits in the decoded linear address 330. In another scenario, the most significant bits or a portion thereof, can be set to the same bit value (e.g., 0 or 1). In other scenarios, the most significant bits or a portion thereof may be obtained from a register or other memory where such bits have been stored for performing the decoding process of cryptographically encoded pointers.

In some embodiments, the processor may check whether the upper address bits 304 in decrypted portion 324, or a portion thereof, have an expected value as an indication of whether the decrypted portion 324 was decrypted incorrectly. For example, in some paging modes, some number of upper address bits are required to all have the same value (i.e. all 0's or all 1's). If the corresponding bits in the upper address bits 304 of the decrypted portion 324 have differing values, then that indicates that decrypted portion 324 was decrypted incorrectly. Some embodiments may generate a fault in that case. Some other embodiments may rely on existing canonicality checks to generate a fault in that case when the decoded linear address is used. Even if the upper address bits do all have the same value, that may not conclusively indicate that decrypted portion 324 was decrypted correctly. Some embodiments may perform checks for expected bit values for both the minimum and maximum addresses to be accessed in the current operation so that a fault will likely be generated if any portion of the access is out-of-bounds. Other embodiments may only require that a particular portion of the access, e.g., the first byte, be within the bounds of the pointer, and thus only perform such checks for expected bit values on the pointer for that portion of the access. Other embodiments may check both the minimum and maximum addresses for write operations but only check a single pointer value for reads, relying on code cryptography to likely prevent partially out-of-bounds accesses from returning correct plaintext. It should be understood that any number of other bounds checks and/or integrity checks may be implemented in the embodiments disclosed herein, and that the checks that are specifically described herein are merely examples of such possibilities. It should be understood that any number of other bounds checks and/or integrity checks may be implemented in the embodiments disclosed herein, and that the checks that are specifically described herein are merely examples of such possibilities.

The decoded linear address 330 is used to find the memory location of the first encrypted code block 362 to be decrypted in Phase III 374C. The encrypted code block 362 is decrypted by a cryptographic algorithm (e.g., 350) such as keystream generator 354 and logic function 352. In at least one embodiment, keystream generator 354 can be implemented as an AES-CTR mode block cipher, at any suitable size granularity. In this embodiment, the offset 307 is used as the initialization vector (IV) or code tweak 344. The offset 307 can be calculated based on the byte distance between the domain load address 392 in-memory and the domain code block address 394 in-memory for the code block to be decrypted. In other embodiments, other metadata may be used in addition to or as an alternative to offset 307. For example, other metadata that may be used to generate code tweak 344 include, but is not necessarily limited to size metadata 302, domain metadata 303, and/or memory allocation size metadata. Generation of keystream 351 may commence without waiting for encrypted code block 362 to be fetched. Keystream generator 354 encrypts code tweak 344 based on code key 342 to generate keystream 351.

For code decryption, a code tweak adjustment similar to the tweak adjustment performed for code encryption may be followed. The value of code tweak 344 may be adjusted to be congruent to 0 (modulo the block size of the keystream generator 354) prior to being used as an input to the keystream generator. The value of the code tweak 344 may have some suitable number of least significant bits set to 0 to satisfy this requirement and a prefix of the keystream 351 may be discarded to account for that adjustment. The number of bytes of the keystream 351 to discard may be computed by subtracting the adjusted value of the code tweak 344 from the unadjusted value of the code tweak 344. If the memory to be decrypted crosses one or more block-aligned boundaries, the keystream generator 354 may be re-invoked for the subsequent blocks with the code tweak 344 being increased by an amount equal to the block size each time that it is re-invoked.

A logic function 352 (e.g., XOR operation, etc.) is then performed on keystream 351 and an encrypted code block 362 (which may be a cache line in some implementations) selected from the memory location referenced by the decoded linear address 330. The granularity of the encrypted code block 362 matches the keystream 351 output from of the keystream generator 354, and the logic function 352 produces the decrypted code block 360. As previously noted, other forms of cryptographic algorithms may be used to encrypt and decrypt code including, but not necessarily limited to various types of tweakable block ciphers.

For some types of cryptography, the encrypted code block that is decrypted may include multiple instructions. For example, a 16-byte block (or other size) encrypted and decrypted in a block cipher mode, can include multiple instructions or fragments of instructions that extend into other encrypted code blocks. Nevertheless, all 16 bytes of an encrypted code block (e.g., 362) may be decrypted at a time and the decoder can identify the location of the relevant instruction within the decrypted code block 360. In at least one embodiment, the other decrypted instructions may not be written to the buffer and in this scenario, these instructions are decrypted again when fetched for execution. In some architectures, for example where instructions have fixed instruction widths, each individual instruction may be decrypted without necessarily decrypting other surrounding instructions.

It should be noted that some of the concepts presented herein are also applicable to data of a domain. Accordingly, the data associated with a particular domain may be encrypted and decrypted using the cryptographic computing concepts described herein, or a variation thereof. For example, cryptographically encoded pointers to data of a domain may be configured using the same or different metadata described with reference to cryptographically encoded pointers to code of the same domain. A portion of a cryptographically encoded pointer to data may be encrypted and decrypted using an address tweak (e.g., similar to address tweak 316) and an address key (e.g., similar to address key 318). In other embodiments, a variation of the address tweak may be used for cryptographically encoded data pointers. Also, data itself may be encrypted and decrypted using a code tweak (e.g., similar to code tweak 344) and a code key (e.g., similar to code key 342). In other embodiments, variations of the code tweak (e.g., different offset calculation, different combination of metadata, etc.).

Figure 4:
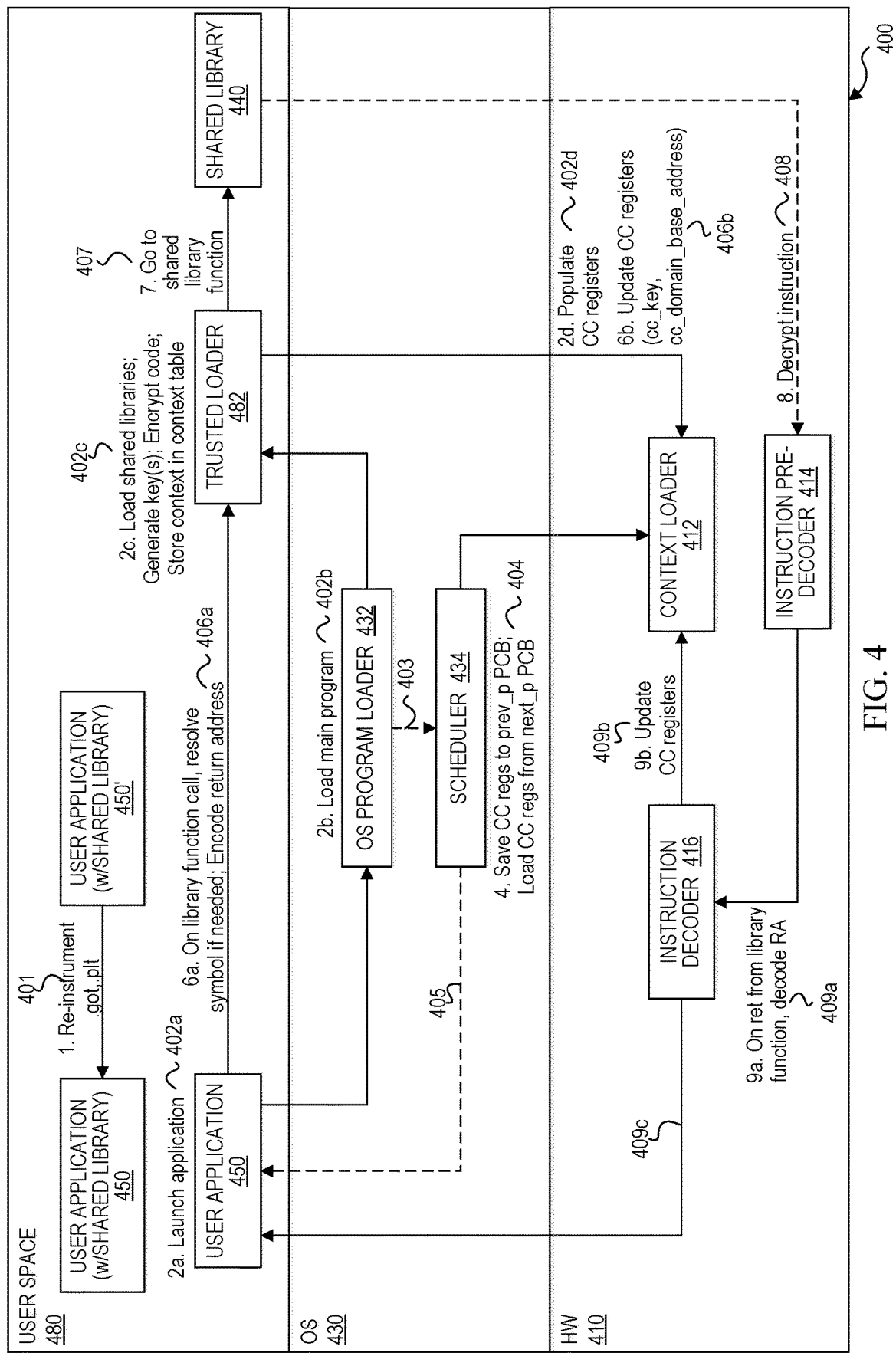
FIG. 4 is a block diagram illustrating an example execution flow for cryptographic computing isolation for multi-tenancy and secure software components according to at least one embodiment.

FIG. 4 is a block diagram illustrating an example execution flow 400 in a computing system implemented with cryptographic computing isolation for multi-tenancy and secure software components according to at least one embodiment. FIG. 4 illustrates portions of a computing system in which the execution flow 400 occurs, including hardware (HW) 410, an operating system (OS) 430, and a user space 480. The HW 410, OS 430, and user space 480 are examples of the HW 110, OS 130, and user space 180, respectively, in computing system 100 of FIG. 1, in which the execution flow 400 may occur. Hardware 410 includes a context loader 412, an instruction pre-decoder 414, and an instruction decoder 416. Operating system 430 includes an OS program loader 432 and a scheduler 434. User space 480 includes a user application 450, a trusted loader 482, and a shared library 440. In addition, user app/shared libraries 440 and 442 are shown in user space 480. In the example execution flow 400, operating system 430 may be an open source UNIX-like operating system using a variant of the Linux kernel. It should be appreciated, however, that any other operating system may be used in other implementations including, but not necessarily limited to, a proprietary operating system such as Microsoft® Windows® operating system from Microsoft Corporation or a proprietary UNIX-like operating system.

In operating system 430, for a user application to make a function call to a shared library (e.g., shared library 440), data structures are used to resolve the address of the loaded function during runtime since the function may be loaded at potentially different addresses to avoid conflicts if the shared library is called by more than one application. In the example of FIG. 4, the data structures that work together to resolve the address of a loaded function include two tables referred to as a global offset table (also referenced as 'GOT' and '.got') and a procedure linkage table (also referenced as 'PLT' and '.plt'). The GOT table is used to determine if an address of function in a shared library has been resolved and if not resolved, a runtime resolver function is called from the PLT entries, which updates the GOT table to the resolved function address. For example, when a shared library (e.g., shared library 440) is called, execution jumps to the PLT entry of the called function. The PLT entry may be embodied as a small code stub that reads the GOT table. If a GOT entry exists for the called function, then execution jumps to the address stored in the GOT entry, which can indicate the load address (e.g., via a symbol) of the called function in the shared library. If a GOT entry does not exist in the GOT table for the called function, then the PLT coordinates with the trusted loader 482 to obtain the load address (or symbol representing the load address) of the called function and stores the obtained address (or symbol) in the GOT table.

In embodiments of cryptographic computing isolation disclosed herein, however, each shared library is considered a different domain and different cryptographic keys are generated (or otherwise obtained) during the instantiation of an application. The different keys are used to encrypt the code and data of different domains. Thus, when a shared library is called, the appropriate cryptographic key for that domain (e.g., the code and data of the called function) is retrieved and used to decrypt the data and code of the function. In one or more embodiments, the PLT and GOT tables may be modified to ensure that shared library function calls always go to the trusted loader 482 to handle the key retrieval for each function call. In one example, the GOT and PLT sections of a compiled binary can be statically rewritten so that the GOT entries are reset to zero (0) and code stub may be added to the PLT entry to cause the execution flow to always go to the trusted loader 482 on shared library function calls, irrespective of whether the address of the loaded function is resolved or not.

Accordingly, at 401, a user application 450' with a shared library is re-instrumented to modify the GOT and PLT tables. In at least one embodiment, the binaries are searched for the GOT table and the entries containing the addresses of resolved functions are set to zeroes. Code is added to the PLT table to cause control to be passed to the dynamic linker loader 482 regardless of whether the address of the loaded function has been resolved or not. The re-instrumentation of the user application 450' to modify the GOT and PLT tables results in user application 450 with modified GOT and PLT tables. Because the GOT and PLT tables are statically modified, recompilation of the binaries is unnecessary.

At 402a, a user application 450 is launched. As part of the application launching, the OS program loader 432 receives a request to launch the user application 450 and loads the main program of the user application at 402b. The main program can be checked for dependencies on any shared libraries. For example, the main program can be searched or otherwise evaluated to determine whether any function calls to shared libraries are contained in the main program. For ease of explanation, execution flow 400 will be described based on the user application 450 having one shared library dependency (e.g., one shared library function call). It should be apparent, however, that user application 450 may contain any number of dependencies on shared libraries and, accordingly, the operations described herein may be applied to each of the shared libraries called by user application 450.

If a determination is made that the main program has one or more dependencies on a shared library, then control is passed to the trusted loader 482. The trusted loader 482 may be configured as a dynamic linker-loader in at least some embodiments. In other implementations, the trusted loader may be configured as a loader or any other suitable module that can perform operations as described herein. As indicated at 402c, a process context table is created to store domain-specific keys and associated context for each domain (e.g., software components such as a function called from a shared library and the main program) of the process instantiated based on the launched user application 450. The process context table may be stored in the address space of the process. The address space of the process may be an allocated range of virtual addresses that is mapped to physical memory.

The trusted loader 482 is configured to generate (or otherwise obtain) domain-specific keys and to store the key (or key handle) and associated context information for the key in the new process context table. In one example, the associated context information to be stored in the context table can include a domain identifier (also referred to herein as 'domain ID') that uniquely identifies the domain, the domain-specific key or key handle, and a load address of the domain. The domain ID may uniquely identify the domain (e.g., a software component such as the main program of an application or a shared library invoked by the application). A key handle can provide an indirect reference to a domain-specific key that can be used to encrypt the code of the software component. The indirect reference may be an address or pointer to the domain-specific key or to any suitable data structure containing the key. It should be further noted that in some embodiments, a domain-specific key may be used to encrypt both the code and the data of a particular software component. In other embodiments, a domain-specific code key may be used to encrypt the code of a particular software component, and a different data key (which may be domain-specific for some data) may be used to encrypt the data associated with the software component.

At 402c, once the domain-specific key is generated (or otherwise obtained) for the shared library invoked in the application, along with other metadata (if any) and the linear address of the shared library, the trusted loader 482 can encrypt the code of the shared library while loading the code into memory using the domain-specific key (or domain-specific code key) and possibly a tweak in the form of an offset from a binary load address. The encryption may be, for example, an AES-CTR mode block cipher (or any other suitable cryptographic algorithm), at any suitable size granularity. The encrypted shared library is indicated as the shared library 440 in FIG. 4. It should be noted that if multiple software components are loaded into the user application, then the trusted loader 482 encrypts the code of each software component with respective domain-specific keys (or respective domain-specific code keys) while loading the code of the software components into memory.

In an alternative embodiment, the cryptographic keys may be managed outside of trusted loader 482 to avoid the need to re-encrypt code each time the code is loaded. For example, a software component may be pre-encrypted by a package manager as the software component is being installed on disk. The cryptographic key used to pre-encrypt the code may be stored in a secure manner that is accessible to the trusted loader 482 for applications authorized to invoke the software component. For example, the cryptographic key itself may be encrypted, stored in a protected area of memory, stored in hardware, or any suitable combination thereof. When the previously encrypted software component is loaded into memory, the cryptographic key that was used to pre-encrypt the software component (or a key handle that references the cryptographic key) is obtained based on a secure manner in which the key is stored. A tweak may also be used to pre-encrypt the software component. The tweak could include a relative offset of each block of code (or 'code block') from the start of its software component. In at least some embodiments, other metadata may also be used in the tweak. For example, a power of two size metadata of potential memory slots to which the allocation may be assigned, a domain ID that uniquely identifies the software component, and/or the size of the software component. If a power of two size metadata is used in the pre-encryption, a rule may be followed that each pre-encrypted software component is fitted into the smallest slot that is at least as large as the pre-encrypted software component, and each encrypted software component could be aligned with the beginning of the slot or with the end of the slot or at some other offset within the slot. Accordingly, in addition to domain ID and software size, the power of two size metadata can be ascertained by hardware (e.g., instruction pre-decoder) during the runtime of different applications that invoke the software component. Thus, the encrypted code image of the software component can be identically decrypted wherever the encrypted code image is loaded and therefore, is shareable across the different applications.

In addition, new cryptographic computing (CC) registers, of any suitable size (e.g., 16-bit, 32-bit, 64-bit, 128-bit, etc.) may be provided in one or more embodiments to hold information for the currently executing software component. For example, a context table base address register (e.g., 64-bit cc_ctb register) may store the base address of the context table, a cc key register (e.g., 64-bit cc_key register) may store the domain-specific key associated with a currently executing software component, and cc domain base address register (e.g., 64-bit cc_domain_base register) may store the base address of the code of the currently executing software component. The base addresses of the context table and the software component may be linear addresses where the context table and software component are loaded, respectively, in memory.

The CC registers can be populated by the context loader 412 at 402d, during the instantiation of user application 450. The cc_ctb register can be populated with the address of the process context table since hardware subsequently accesses the context table. The cc-key register can be populated with the domain-specific key for the main program's code. The cc_domain_base register can be populated with the load address (also referred to herein as 'base address') of the main program. The load address of the main program is the main program entry. Once the CC registers are populated, the OS program loader 432 finishes, and at 403, the application is scheduled by scheduler 434.

In one or more embodiments, a process control block (PCB) structure can be updated to include three variables corresponding to the three CC registers to handle process context switching. In a process context switch, a central processing unit (CPU) follows a procedure to change from one process to another process. In one or more embodiments, during a process context switch, the operating system can save the CC register values for the process being switched out, and can load register values for the process being switched in. At 404, when a process context switch occurs, the CC registers holding information for the main program (or another executing software component) can be stored in the corresponding variables of the PCB structure (e.g., prev_p PCB). The CC registers can then be loaded with the corresponding variable values of the PCB structure of the process being switched in (e.g., next_p PCB of process corresponding to user application 450). At 405, the execution of the user application 450 begins.

During runtime of a user application, the modified PLT and GOT tables cause the shared library function calls to always invoke the trusted loader 482 to resolve the symbol of called functions (e.g., via a symbol resolver function), even if the symbol has previously been resolved. For example, during runtime of user application 450, when a function call for a shared library 440 is executed, control is passed to the dynamic linker loader 482 as shown at 406*a*. The modified PLT and GOT tables cause control to be passed to the dynamic linker-loader at 406*a*, regardless of whether the symbol for the shared library 440 has been resolved. If the symbol has not yet been resolved, then the trusted loader 482 resolves the invoked function symbol. Additionally, the trusted loader 482 encodes a return address to the next instruction to be executed in the calling software component. The return address may already have been pushed to stack before the return address is encoded. In this example, the return address may indicate the next instruction to be executed in the main program of the user application after the function call. In addition, an encoding indicator may be encoded in the return address to indicate inter-modular transfer and the source domain ID may be encoded in the return address for efficient key update on return.

Once the invoked function symbol has been resolved (or if the invoked function symbol was previously resolved) the dynamic linker loader 482 loads the cryptographic key for the target shared library at 406*b*. The CC key register (e.g., cc_key register) holds the cryptographic key for the currently executing domain. In this instance, the currently executing domain is the main program of the user application 450. However, the currently executing domain could be any software component in which the function call is executed (e.g., main program, library function, etc.). In this example, the cryptographic key assigned to the called shared library 440 is loaded in the CC key register and can overwrite the current key stored in the CC key register.

In addition, the CC domain base address register (e.g., cc_domain_base register) is loaded with the load address of the called software component. In this example, the CC domain base address register is loaded with the load address of the called shared library 440. The cryptographic key assigned to the called shared library 440 and the domain base address can be obtained from the context table entry corresponding to the appropriate domain. In the case, the appropriate domain is the shared library invoked by the main program.

Once the CC registers have been updated with the shared library's information (e.g., cryptographic key, load address), at 407, the shared library 440 may begin execution based on a register instruction pointer (RIP) that contains a cryptographically encoded pointer to the first code block containing one or more instructions of the shared library 440 (e.g., at the load address). In one or more embodiments, the cryptographically encoded pointer to the code block can be decoded and the linear address of the first instruction in the code block containing one or more instructions to be executed can be generated. In at least some embodiments, a portion of the cryptographically encoded pointer may be decrypted using a tweak (e.g., power size, type, version, and/or a slice of address bits, etc.) and a cryptographic address key. In some scenarios, the domain-specific key for the shared library 440 (which key or key handle has been loaded into the CC key register) may also be used as the cryptographic address key to encrypt/decrypt the encrypted portion of the pointer. The decrypted portion may contain at least some address bits that can be used with other unencrypted address bits to generate the linear address to be used to fetch a code block containing one or more instructions to be executed. The code block containing the one or more instructions to be executed can be fetched using the generated linear address.

At 408, the instruction pre-decoder 414 can decrypt the fetched code block. In one or more embodiments, the decryption may be performed using the cryptographic key and domain load address for the currently executing domain loaded in the CC key register (e.g., cc_key register) and CC domain base address register (e.g., cc_domain_base register), respectively. In this example, the currently executing domain is the shared library 440. As successive code blocks in the shared library 440 are fetched and decrypted, the decrypted instruction stream can be sent to the instruction decoder 416.

When control is returned from the called shared library 440 to the calling software component (e.g., main program of application, another function, etc.), a return address stored in stack can be popped from stack. At 409*a*, the retrieved return address can be checked to determine whether control is returning from a shared library or other software components (e.g., microservices, functions as a service, browser components, etc.) accessible to other applications. In one example, if the return address is encoded, then the return address will contain an indication of being encoded. In one example, this encoding indicator may be in the form of one or more bits (e.g., a 6-bit magic value). If the return address is encoded, then the return address is decoded to obtain the linear address of the next instruction to be executed in the software component to which control is being returned and the domain ID of that software component.

At 409*b*, CC registers are updated from a context table entry corresponding to the software component to which control is being returned. For example, the CC key register (e.g., cc_key) and CC domain base address register (e.g., cc_domain_base) are updated from the appropriate context table entry. In this example, control is being returned to the main program of user application 450. At 409*c*, control is returned to the main program of the user application 450.

Figure 5:
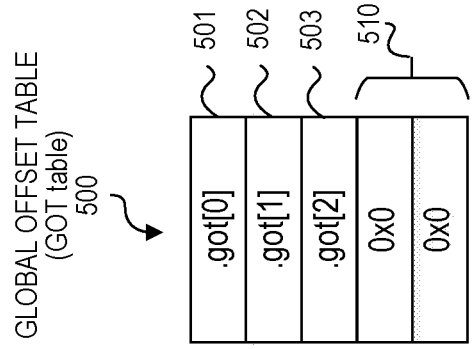
FIG. 5 illustrates an example modified global offset table according to at least one embodiment.

FIG. 5 illustrates an example modified global offset table (GOT) 500 of a user application binary according to at least one embodiment. The user application binary could be, for example, first application 150 or second application 160 in computing system 100 of FIG. 1, or user application 450 in FIG. 4. In this example, a first GOT entry 501 provides the address of the dynamic section. A second GOT entry 502 contains the address of a link map at the dynamic linker-loader. A third GOT entry 503 contains the address of a symbol resolver at the dynamic linker-loader. All of the unresolved GOT entries 510 can be reset to zeros when the GOT table 500 is statically modified (e.g., as shown at 401 of FIG. 4).

Figure 6:
FIG. 6 illustrates an example modified procedure linkage table according to at least one embodiment.

FIG. 6 illustrates a modified procedure linkage table (PLT) 600 of a user application binary according to at least one embodiment. The user application binary could be, for example, first application 150 or second application 160 in computing system 100 of FIG. 1, or user application 450 in FIG. 4. A code stub 610 may be added to the PLT table 600 to cause all shared library calls to be directed to the trusted loader (e.g., trusted loader 144, trusted loader 482) regardless of whether the address of the called function has been resolved. By directing execution flow to the dynamic linker-loader, one or more embodiments can retrieve the appropriate key assigned to the domain (e.g., code and data of the called function) and set CC registers so that the appropriate domain-specific key can be used to correctly decrypt the code and data of the called function.

FIG. 7A illustrates an example context table 710 according to at least one embodiment. A context table, such as context table 710, may be created for each process that is instantiated when an application comprising multiple software components (or domains) is launched. The context table 710 may be stored in the virtual address space of the process for which context table 710 was created.

In an embodiment, the context table 710 contains context table entries 702(1)-702(N). Each entry in the context table 710 stores context information associated with one software component (e.g., shared library, main program, etc.) of the application. For example, context table entry 702(1) may contain a domain ID 712(1), key data 713(1), a load address 714(1), a code start 715(1), a code end 716(1), data range registers 717(1), heap range registers 718(1), stack range registers 719(1), and a binary path 711(1) of a software component. Similarly, context table entry 702(N) may contain a domain ID 712(N), key data 713(N), a load address 714(N), a code start 715(N), a code end 716(N), data range registers 717(N), heap range registers 718(N), stack range registers 719(N), and a binary path 711(N). In this nonlimiting example, context table entry 702(1) may correspond to the main program of the user application, and context table entry 702(N) may correspond to a shared library called by the main program. As indicated in FIG. 7A, context table 710 may include any number of other context table entries that correspond to other software components (e.g., other shared libraries, microservices, functions as a service, browser components, etc.) loaded in the application.

A domain ID is a value that identifies a software component that corresponds to the particular context table entry. The domain ID may uniquely identify the software component relative to other software components in a user application and on the hardware platform where the software component is shared. Thus, each of the domain IDs 712(1)-712(N), which correspond to software components of a particular process, are different. For example, domain ID 712(1) may uniquely identify the main program of the user application, and domain ID 712(N) may uniquely identify the shared library called by the main program of the application. The domain IDs may also be unique across software components on the hardware platform or multiple hardware platforms.

Key data 713(1)-713(N) represents cryptographic keys used to encrypt/decrypt software components corresponding to the context table entries. In one embodiment, key data in a particular context table entry may be embodied as a key handle that indirectly references a key stored in another location (e.g., main memory, cache, a registers, etc.). The key stored in the other location is assigned to a software component corresponding to the context table entry and is to be used for encrypting the code and data of the software component. For example, key data 713(1) may be a key handle that indirectly references a first key assigned to the main program of the user application. The referenced first key is used to encrypt/decrypt the code and data associated with the main program. Key data 713(N) may be embodied as a key handle that indirectly references a second key assigned to a shared library called by the main program. The second key is used to encrypt/decrypt the code and data associated with the shared library. In another embodiment, key data in a particular context table entry may be embodied as a key value that is used to encrypt and decrypt the software component corresponding to the context table entry where the key value is stored. In some embodiments, where both code and data keys are assigned to a software component to encrypt/decrypt the code and data using the different keys, a key handle may indirectly reference a data structure holding both the code key and the data key for the software component.

A load address can indicate the virtual (or linear) address where the software component corresponding to the particular context table entry is loaded. For example, load address 714(1) can indicate the linear address where the main program is loaded, which can be the main program entry for execution. Load address 714(N) can indicate the linear address where the function called by the main program is loaded, which can be the function entry for execution. In some cases, the load address may be a cryptographically encoded pointer (e.g., 310) to a linear address, as previously described herein. It should be noted, however, that any suitable pointer configuration may be used, including pointers that are not encrypted (e.g., 301) and/or that do not contain metadata. Alternatively, the load address may be the decoded linear address (e.g., 330).

Other information stored in the context table include, code start 715(1)-715(N), code end 716(1)-716(N), data range registers 717(1)-717(N), heap range registers 718(1)-718(N), stack range registers 719(1)-719(N,) and binary path 711(1)-711(N). A code start (e.g., 715(1)-715(N)) of a given context table entry represents the start address where the encrypted software component corresponding to the given context table entry is loaded. A code end (e.g., 716(1)-716(N)) in the given context table entry indicates the end of the encrypted software component corresponding to the given context table entry in memory. For example, the code end may indicate the last address in memory storing the code. Data range registers (e.g., 717(1)-717(N)) of the given context table entry can represent value(s) of a register or set of registers that indicate the start and end addresses where certain data (e.g., global data) associated with the active application (e.g., first application 150 or second application 160) is stored. In one example, the memory region covered by the data range registers includes the data segment of memory (e.g., .bss section, .rodata section, .data section) for the active application including associated software components. Heap range registers (e.g., 718(1)-718(N)) of the given context table entry represent value(s) of a register or set of registers that indicate the start and end addresses where heap data (e.g., dynamically allocated data) associated with the active application is stored. In one example, the memory region covered by the heap range registers includes the heap segment of memory for the active application including associated software components. Stack range registers (e.g., 719(1)-719(N)) of the given context table entry represent value(s) of a register or set of registers that indicate the start and end addresses where stack data (e.g., temporary variables, function parameters) associated with the active application is stored. In one example, the memory region covered by the stack range registers includes the stack segment of memory for the active application including associated software components. In one example, if the context table 710 is specific to a process and therefore, specific to an application, the data range register values may include the same information across domain entries of the context table 710, the heap range register values may include the same information across domain entries of the context table 710, and the stack range register values may include the same information across domain entries of the context table. Other implementations may be used to store the range register values of an active application (or process). For example, the range register values may be stored in a single context table entry, in another memory location, or in any other suitable manner using any suitable technique. The addresses indicated in the context table may be linear addresses or pointers having any suitable encoding and configuration (e.g., cryptographically encoded, unencrypted encoded, etc.), or any other suitable memory addresses based on particular implementations and/or architecture.

FIG. 7B is a block diagram illustrating a processor including cryptographic computing (CC) registers according to at least one embodiment. The CC registers may be provided in one or more embodiments to hold information for the currently executing software component and may be of any suitable size (e.g., 16-bit, 32-bit, 64-bit, 128-bit, etc.) depending on particular implementations and needs. For example, a CC context table base address register 732 (e.g., 64-bit cc_ctb register) may store the load address of the context table, a CC key register 734 (e.g., 64-bit cc_key register) may store the domain-specific key associated with a currently executing software component, and CC domain base address register 736 (e.g., 64-bit cc_domain_base register) may store the load address of the code of the currently executing software component.

Other CC registers may be used to hold memory range information for data associated with a currently executing application, such as first application 150 or second application 160. For example, a cc data range register(s) 737 (e.g., one or more 64-bit registers) may store the memory range of global data associated with the currently executing application. A CC heap range register(s) 738 (e.g., one or more 64-bit registers) may store the memory range of heap data associated with the currently executing application. A CC stack range register(s) 739 (e.g., one or more 64-bit registers) may store the memory range of stack data associated with the currently executing application.

FIG. 7C is a block diagram illustrating a selected portion of an example processor control block (PCB) 740 for an instantiated process according to at least one embodiment. For ease of description, the instantiated process associated with PCB 740 is referred to as 'Process A'. Typically, a PCB is created for a process by an operating system. The PCB can be used to keep track of information about the process state, program counter, stack pointer, opened files, registers, and other information that an operating system needs to save when a process makes a transition from one state to another. In one or more embodiments disclosed herein, PCBs are configured to include three variables corresponding to the three CC registers (e.g., 732, 734, 736). As shown in FIG. 7C, variables 750 in the PCB 740 include a context table base variable 752, a domain base variable 754, and a key variable 756. In one example scenario, during a process context switch from Process A (e.g., instantiated from first application 150) to another process such as Process B (e.g., instantiated from second application 160), the operating system can save the CC register values for the process being switched out (e.g., Process A), and can load register values for the process being switched in (e.g., Process B). Thus, when the process context switch occurs, the contents of CC registers (e.g., 732, 734, 736) are holding information for Process A and can be stored in the corresponding variables 752, 754, and 756 of PCB 740, which may be stored in the process address space of Process A. The CC registers can then be loaded with the corresponding variable values of the PCB structure of Process B. The PCB structure created for Process B may be similar to PCB 640 created for Process A, but may be stored in the process address space of Process B.

FIG. 8 shows example pseudocode 800 of a runtime resolver function 801 in a trusted loader to enable cryptographic isolation of software components according to at least one embodiment. For example, the runtime resolver function 801 may be programmed in a trusted loader (e.g., trusted loader of FIG. 1, trusted loader 482 of FIG. 4), which may be a dynamic linker-loader in one or more embodiments. It should be apparent, however, that the runtime resolver function 801 may be programmed in or embodied as any suitable module to perform the runtime operations described herein. When a software component (e.g., shared library, microservice, function as a service, browser component, etc.) is called, the runtime resolver function 801 may be called from a PLT table (e.g., PLT table 600 of FIG. 6), whether the software component has been resolved or not. By way of example but not of limitation, the called function in pseudocode 800 is referenced as a shared library or more generally, as a targeted function. It should be apparent, however, that pseudocode 800 is applicable to any type of shared software components or other position independent code.

At 802, a GOT table is referenced to determine the address of a symbol corresponding to a targeted function of a shared library function call. Generally, symbols may be a primitive data type and can be used as identifiers of shared software components. At 804, if the symbol is unresolved (e.g., an address of the symbol has not been determined), then a lookup symbol function is called to determine the address of the symbol. The address of the symbol may be unresolved, for example, if the addresses for the symbols have been reset to zeros in the GOT table (e.g., as indicated at 401 of the execution flow 400 of FIG. 4).

At 807, a lookup domain function may be performed to determine the domain ID of the targeted function. At 808, the lookup domain function may be performed again to determine the domain ID of the calling software component (e.g., a main program of an application, shared library, microservice, function as a service, browser component, etc.).

At 810, a return address is encoded using the domain ID of the calling software component and a domain switch value to indicate that the return address is encoded and that a domain switch is required to return to the calling software component. In one example, the return address may be the linear address (e.g., lower 32 bits) of an instruction in the calling software component that follows the instruction that calls the shared library (e.g., function call, jump, etc.). In this example, the encoded return address is generated by concatenating the return address, the domain switch value, and the domain ID of the calling software component.

At 812, CC registers are updated. For example, a CC key register (e.g., 736) is updated with a key handle (e.g., 713(1)-(N)) from a context table entry (e.g., 710(1)-(N)) corresponding to the targeted function. A CC domain base register (e.g., 734) is updated with a load address (e.g., 714(1)-(N)) from the context table entry corresponding to the targeted function. The domain ID of the targeted function may be used as an index in the context table to locate the context table entry corresponding to the targeted function. At 814, after the return address is encoded and the CC registers are updated with information associated with the targeted function, control is passed to the targeted function. This can happen by updating the instruction pointer register with the pointer to the first address in the targeted function to be executed.

FIG. 9 is a block diagram illustrating an example encoded return address 910 according to at least one embodiment. In one example, the encoded return address 910 may be generated by runtime resolver function 801 at 810. A return address (RA) 908 may be a linear address (e.g., lower 48 bits) of the next instruction to be executed in the calling software component when control is returned to the calling software component. In one nonlimiting example, the encoded return address 900 can be embodied as a concatenation of the return address (or offset) 908, a domain ID 904 of the calling software component, and a domain switch value 902 to provide an indication that the data structure is an encoded return address and that a domain switch will be needed when control is returned to the calling software component. In some cases, the encoded return address 900 may also include one or more unused bits 906.

FIG. 10 shows example pseudocode 1000 of part of a return instruction 1001 for returning control from a first executing software component to a second software component that called the first software component. For example, the pseudocode of return instruction 1001 may represent a modified portion of a legacy return instruction to handle returns from a software component (e.g., shared library, microservice, function as a service, browser component, etc.) that can be invoked by different applications. By way of example but not of limitation, pseudocode 1000 is described with reference to a targeted function of a shared library that was called by a main program of a user application. It should be apparent however, that any other software component could call the targeted function, including, but not necessarily limited to, another shared library, a microservice, a function as a service, a browser component, etc. in addition to a library function that is not shared with other user applications.

At 1002 in return instruction 1001, the domain switch value field (e.g., corresponding to domain switch value 902 of encoded return address 900) of the return address from stack is evaluated. If the value in the domain switch value field of the return address does not indicate that the return address is encoded, then a legacy return instruction routine (not shown) may be performed. If the encoding indicator field of the return address indicates that the return address is encoded, however, then the return address is decoded. In one example, the domain ID of the main program is obtained from the encoded return address and used to index the context table to access the appropriate context table entry corresponding to the main program. At 1006, the base address of the context table is obtained from the CC context table base register (e.g., cc_ctb). At 1008, the domain ID of the main program is used as an index for the context table base address to access the appropriate context table entry and load the key for the main program in the CC key register (e.g., cc_key 736). At 1010, the domain ID of the main program is used as an index for the context table base address to access the appropriate context table entry and load the base address for the main program in the CC domain base address register (e.g., cc_domain_base 734). As control is passed to the main program, the updated CC registers can be used to decrypt instructions to be executed in the main program as described with reference to execution flow 400 of FIG. 4.

Figure 11A:
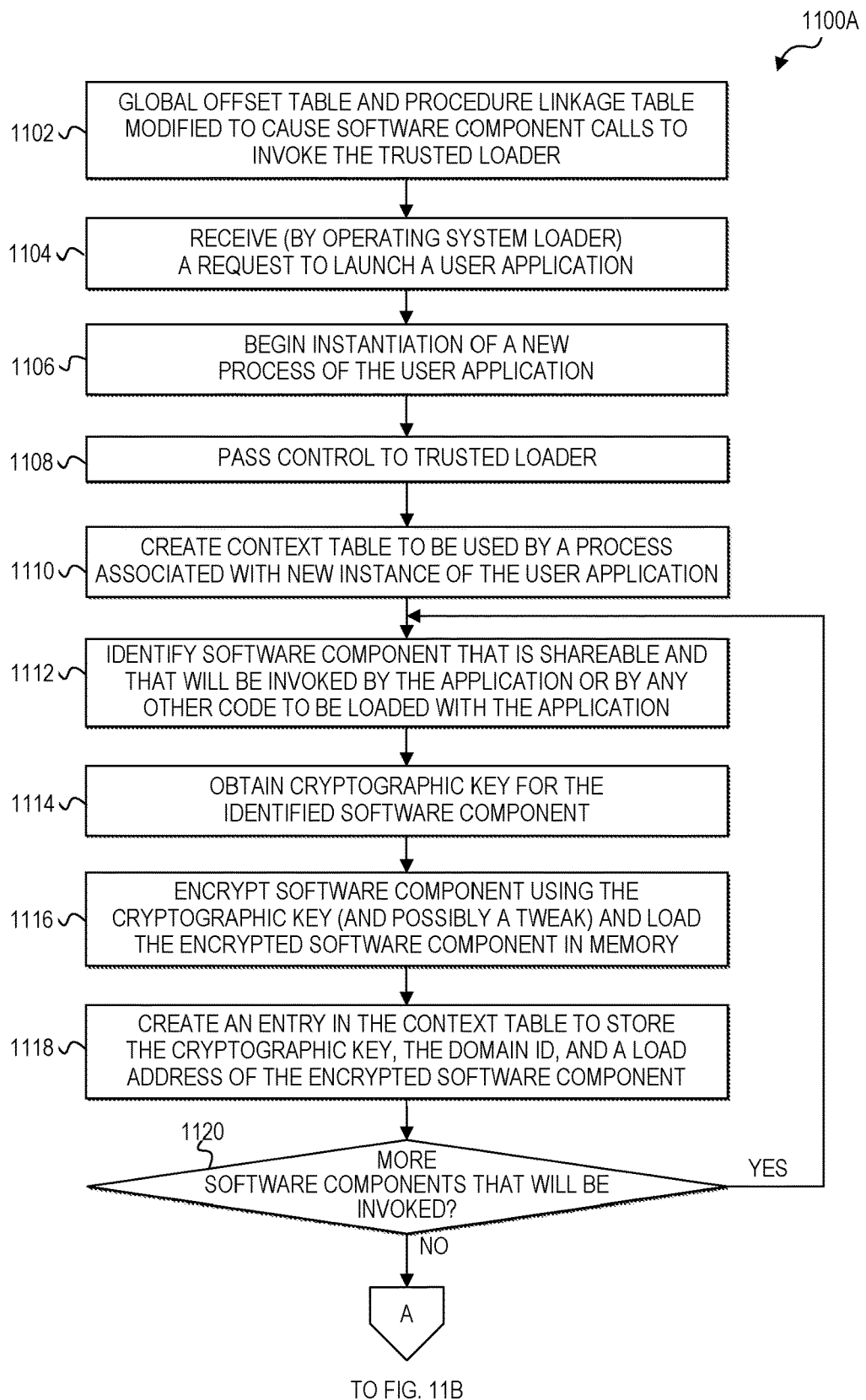
FIGS. 11A-11B are simplified flow diagrams of example operations on a computing system providing cryptographic computing isolation for multi-tenancy and secure software components according to at least one embodiment.
Figure 11B:
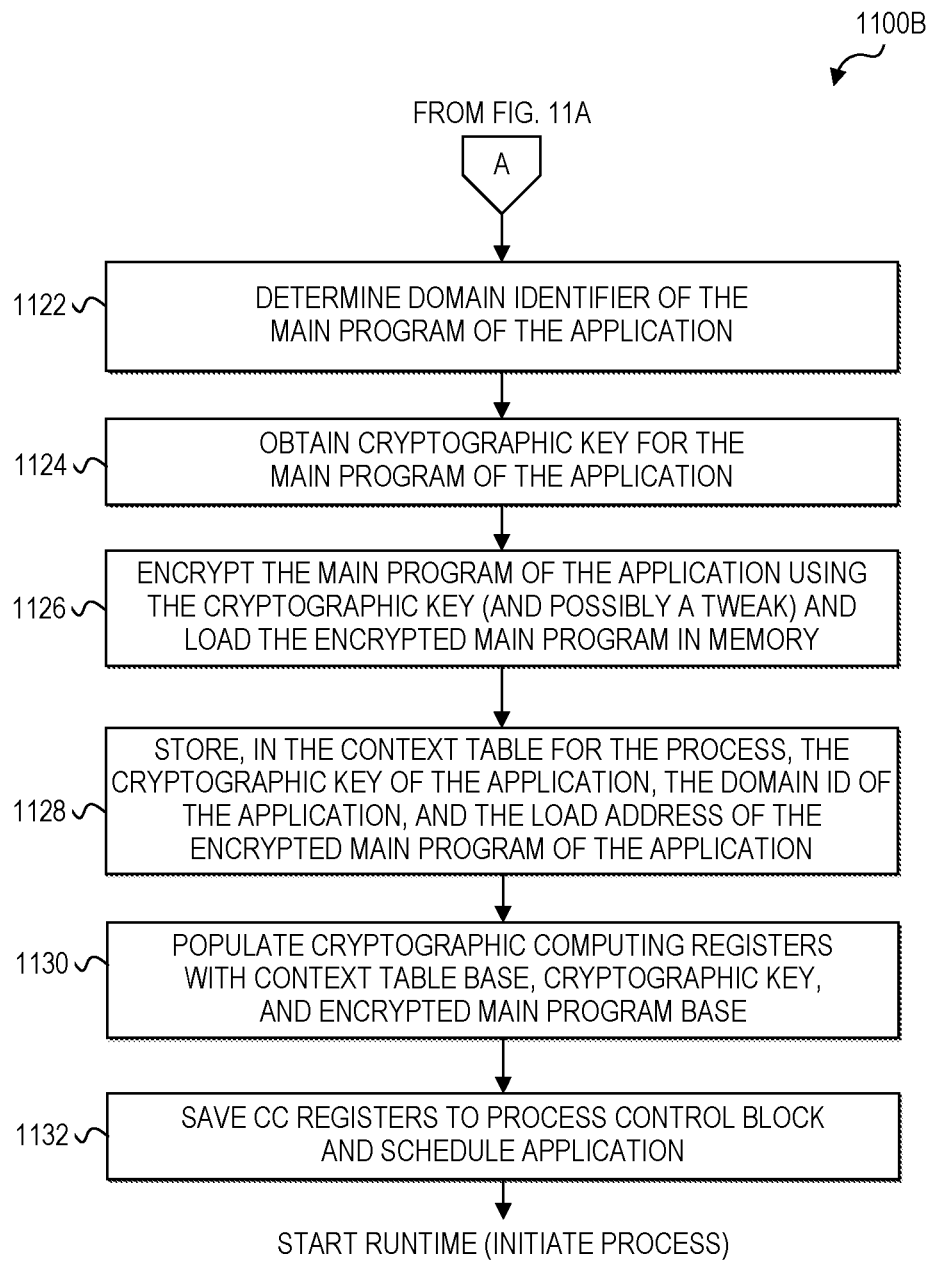

FIGS. 11A and 11B are simplified flow diagrams 1100A and 1100B, respectively, of example operations on a computing system providing cryptographic computing isolation for multi-tenancy and shared software components according to at least one embodiment. At least a portion of the example operations of flow diagrams 1100A-1100B may be performed on a computing system, such as computing system 100. Computing system 100 may comprise means such as hardware 110 with processor 102 and memory 106, for performing the operations. One or more operations of flow diagrams 1100A-1100B may be associated with a set of instructions. In at least one embodiment, one or more instructions in the set of instructions may be executed before runtime, during the instantiation of a user application. In one possible embodiment, a trusted loader (e.g., 144, 482), a context loader (e.g., 412), an operating system loader (e.g., 432), and/or a scheduler (e.g., 432) may cooperate to perform at least some of the operations of flow diagrams 1100A-1100B.

At 1102, a global offset table (GOT) and a procedure linkage table (PLT) for a user application are modified to cause calls to a shared software component (e.g., shared library, microservice, Function as a service, browser component, etc.) to invoke the trusted loader. At 1104, a request to launch the user application may be received, for example, by the operating system loader. To launch an application is to include instantiating a process from the application. At 1106, the operating system (OS) loader can begin an instantiation of a new process from the user application.

At 1108, control is passed to a trusted loader. At 1110, a context table is created for the process corresponding to the invoked user application. The context table may have the same or similar configuration as context table 710 of FIG. 7A.

At 1112, a software component that is shareable with other applications running on the same platform and that will be invoked by the application or by any other code loaded with the application, is identified and information that uniquely identifies the software component (e.g., domain ID) is determined. The identified software component could be, but is not necessarily limited to, a shared library, a microservice, a function as a service function, or a browser component of a browser.

At 1114 a cryptographic key for the identified software component is obtained by the trusted loader. For example, the trusted loader may generate a cryptographic key for the particular software component via a random key generator or deterministic key generator. In another implementation, the trusted loader may obtain the key for the software component from secure storage or a remote location/service. The cryptographic key may be generated or otherwise obtained in response to the identified software component being is shareable with other applications running on the same computing system.

At 1116, the identified software component is encrypted using the unique cryptographic key and the encrypted software component is loaded to memory. The encryption may also use a tweak for each block of code. In at least one embodiment, the tweak may include a domain ID and/or location information of the block of code in the address space of the process. For example, the location information could represent a relative position of the code block within the memory allocation for the encrypted software component. The relative position could be calculated as an offset based on a base address of the software component:

$$\text{offset} = \text{LA of code block} - \text{base address of software component}$$

In this embodiment, the offset is computed by subtracting the linear base address allocated for the software component from the linear address of the code block to be encrypted. In one example, the linear base address of the software component is the linear load address of the software component. The tweak to encrypt the code block may be embodied as the calculated offset, along with suitable padding if needed. In other embodiments, the offset may be combined with one or more other items of context information. Such context information may include, but is not necessarily limited to, the domain ID, a size of the software component, size (power) metadata, or any suitable combination thereof. In these other embodiments, if domain ID is included in the code tweak, then the same code key may be used in the encryption/decryption of the software components as each domain ID is unique to its associated software component.

At 1118, an entry in the context table is created for the process. The entry may be created in response to the identified software component being shareable with other applications running on the same computing system. The cryptographic key assigned to the software component and used to encrypt the software component, a domain ID uniquely identifying the software component, and a load address associated with the encrypted software component are stored in the entry of the context table for the process associated with the application in which the software component is loaded.

At 1120, a determination is made as to whether one or more other software components will be invoked either by the application (or by other code to be loaded with the application). If more software components will be invoked, then flow can return to 1112 where another software component that will be invoked by the application, or by other code to be loaded with the application, is identified. The flow continues to obtain another cryptographic key for the newly identified software component at 1114, to encrypt the newly identified software component at 1116, and to store a new context table entry in the context table for the newly identified software component. This flow may continue until all of the software components that will be invoked by the application or other code loaded with the application have been identified.

In addition to the software components to be invoked during the process, the main program of the application may also be encrypted. At 1122, information that uniquely identifies the main program (e.g., domain ID) is determined. At 1124 a cryptographic key for the main program is obtained by the trusted loader. For example, the trusted loader may generate a cryptographic key for the main program via a random key generator or deterministic key generator. In another implementation, the trusted loader may obtain the key for the main program from secure storage or a remote location/service.

At 1126, the main program of the application is encrypted using the unique cryptographic key and the encrypted main program is loaded to memory. The encryption may also use a tweak for each block of code in the form of location information of that block of code in the address space of the process. For example, the location information could represent a relative position of the code block within the memory allocation for the main program itself. The relative position could be calculated as an offset of the code block from the start of the code containing the code block:

offset=LA of code block−base address of main program

In this embodiment, the offset is computed by subtracting the linear base address allocated for the main program from the linear address of the code block to be encrypted. In one example, the linear base address of the main program is the linear load address of the main program. The tweak to encrypt the code block may be embodied as the calculated offset, along with suitable padding if needed. In other embodiments, the offset may be combined with one or more other items of context information. Such context information may include, but is not necessarily limited to, the domain ID, a size of the main program, size (power) metadata, or any suitable combination thereof. In these other embodiments, if domain ID is included in the code tweak for the main program and for the associated software components, then the same code key may be used in the encryption/decryption of the main program and the software components as each domain ID is unique to its associated application or software component. It should be noted that, since the application itself may not be position-independent, variations of the particular encryption/decryption tweaks and code keys may be used to encrypt/decrypt the main program code.

At 1128, the cryptographic key assigned to the main program and used to encrypt the main program, a domain ID uniquely identifying the main program, and a load address associated with the encrypted main program are stored in the context table for the process associated with the application.

At 1130, the cryptographic computing (CC) registers are populated with information corresponding to the main program. For example, the base address of the context table itself is stored in the CC context table register (e.g., cc_ctb), the cryptographic key generated for the main program of the application is stored in the CC key register (e.g., cc_key), and the base address of the main program of the application is stored in the CC domain base address register (e.g., cc_domain_base).

At 1124, the CC registers can be saved to a process control block for the process to be instantiated upon execution of the application, and the application can be scheduled for execution.

Figure 12A:
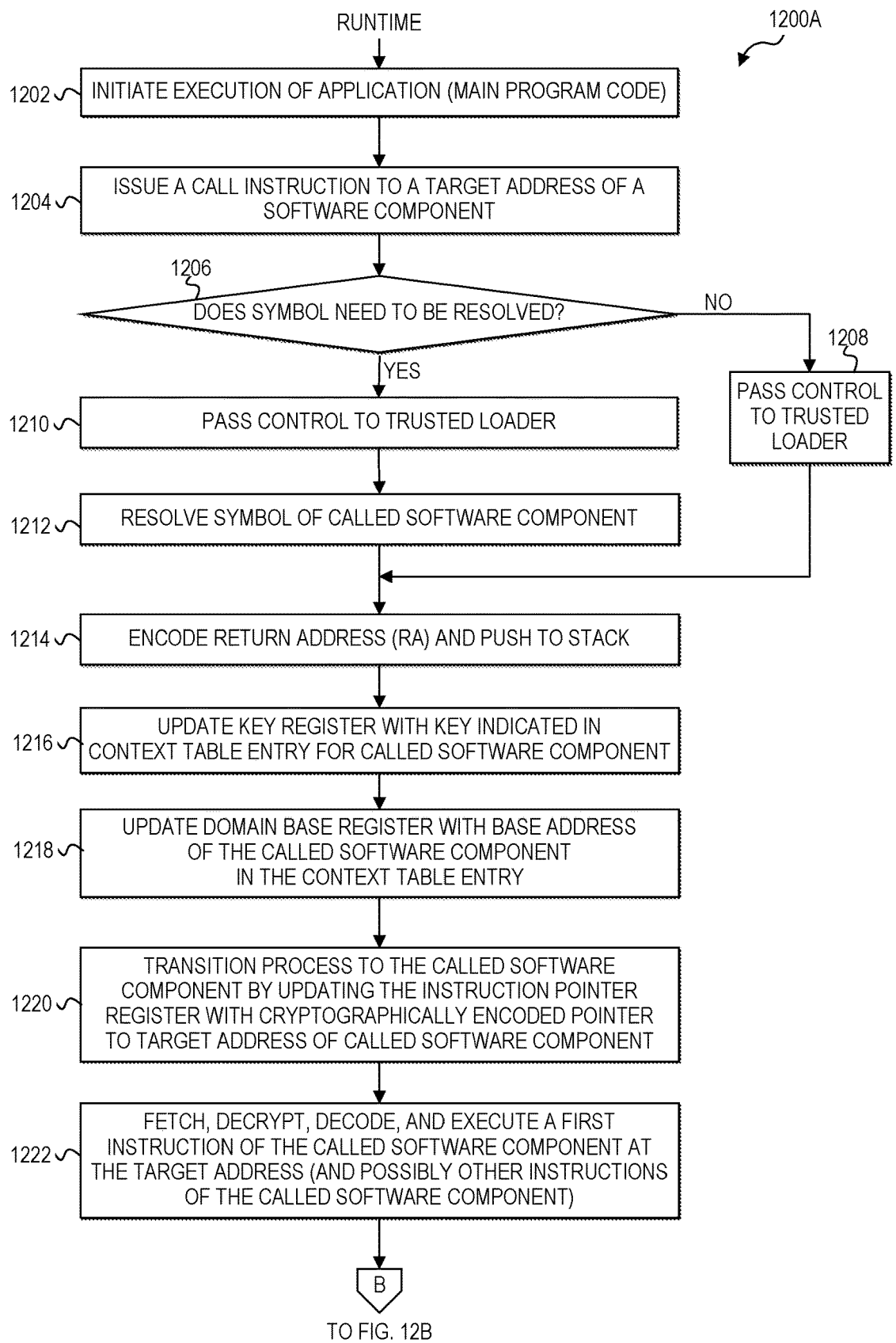
FIGS. 12A-12B is a simplified flow diagram of further example operations on a computing system providing cryptographic computing isolation for multi-tenancy and secure software components according to at least one embodiment.
Figure 12B:
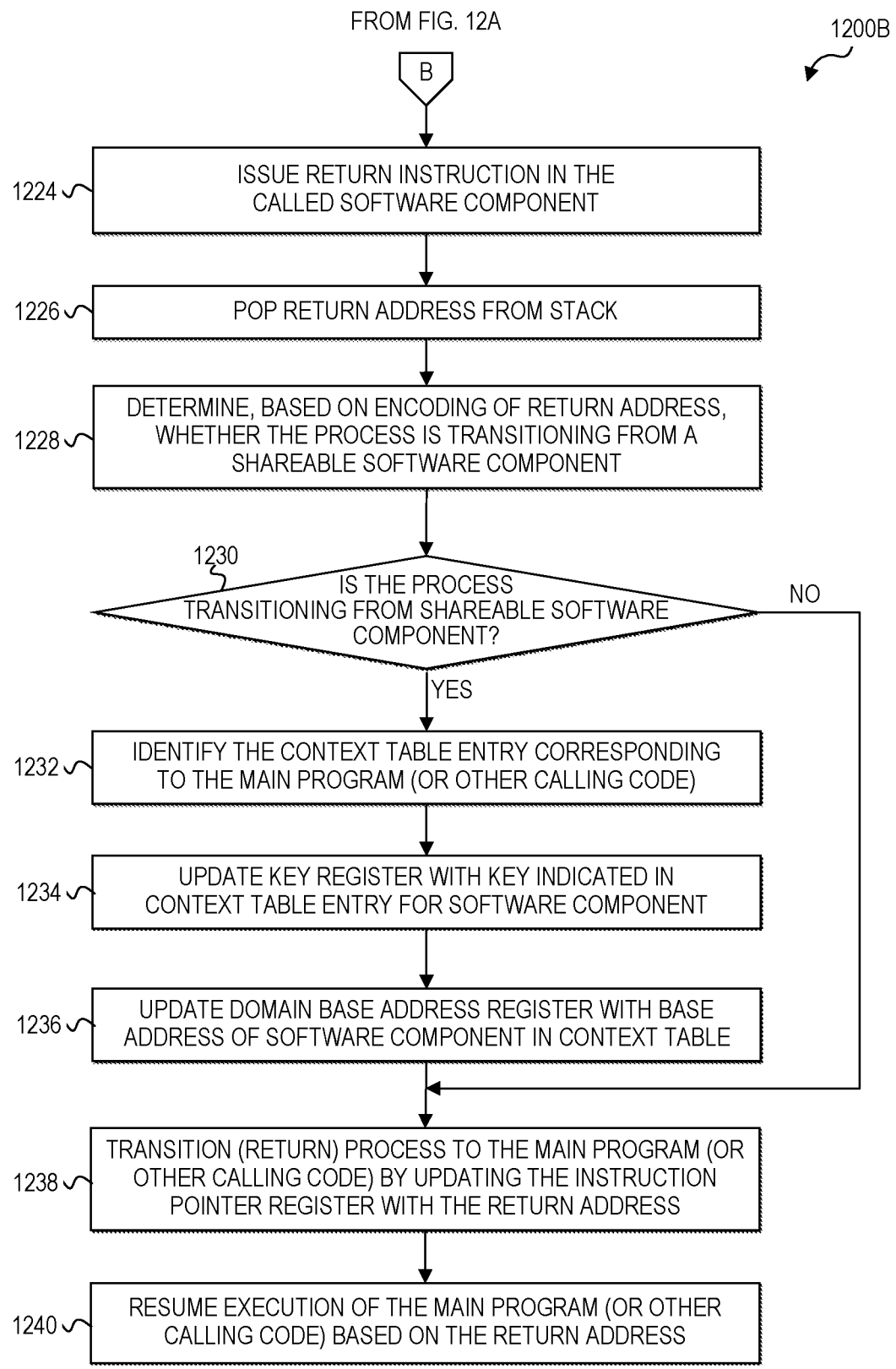

FIGS. 12A and 12B are simplified flow diagrams 1200A and 1200B, respectively, of example operations on a computing system providing cryptographic computing isolation for multi-tenancy and shared software components according to at least one embodiment. At least a portion of the example operations of flow diagrams 1200A-1200B may be performed on a computing system, such as computing system 100. Computing system 100 may comprise means such as hardware 110 with processor 102 and memory 106, for performing the operations. One or more operations of flow diagrams 1200A-1200B may be associated with a set of instructions. In at least one embodiment, one or more instructions in the set of instructions may be executed during runtime, which occurs once the instantiation of a process from a user application is completed. In one possible embodiment, a trusted loader (e.g., 144, 482), a context loader (e.g., 412), an instruction pre-decoder (e.g., 414), and an instruction decoder (e.g., 416), may cooperate to perform at least some of the operations of flow diagrams 1200A-1200B.

Once the application has been encrypted and loaded for execution (e.g., as shown in flow diagram 1100), at 1202, execution of the loaded, encrypted application can be initiated to complete the instantiation of a process. At 1204, a function call to a target address of an encrypted software component, which may be shared by other applications running on the processor, is issued. In some scenarios, the target address may be the load address of the encrypted software component. In other scenarios, the target address may be offset from the load address to a particular portion of the encrypted software component. At 1206, a determination is made as to whether a symbol for the encrypted software component needs to be resolved. In one embodiment, the global offset table (GOT) is modified before runtime to reset GOT entries to zero, indicating that the symbol for the encrypted software component has not been resolved. The PLT table is modified before runtime to ensure that the trusted loader is always called when a shared software component is the target in a function call.

If the symbol needs to be resolved, at 1210, control is passed to a trusted loader. At 1212, the symbol of the shared software component targeted in the function call is resolved. Thus, a load address of the encrypted software component can be determined. If the symbol does not need to be resolved, then at 1208, control is still passed to the trusted loader, but the resolver function does not need to be invoked.

Once the symbol is resolved (e.g., at 1212) or if the symbol was already resolved as determined at 1206, then at 1214, a return address can be encoded and pushed to stack. For example, the return address may be a linear address of the next instruction to be executed after the function call in the calling main program (or another calling software component) once the execution of the called software component ends or otherwise returns to the calling main program (or another calling software component). In at least one embodiment, the return address may be encoded with a domain switch value to indicate that the return address has been encoded and that a domain switch is needed upon returning to the main program (or other calling code), and a domain ID that identifies the main program (or another software component loaded with the user application).

At 1216 and 1218, the CC registers are updated based on context information from a context table entry associated with the encrypted called software component. The context table entry corresponding to the called software component can be identified by using a code range based module lookup for the target instruction address (or function address). The context table entry with a range <code start, code end> that contains the target instruction address is identified. The domain ID in the context table entry can be used to encode the return address. At 1216, once the correct context table entry is identified, the CC key register (e.g., cc_key) is updated with a cryptographic key of the called software component. The cryptographic key of the called software component may be obtained from context information such as key data (e.g., 713(1)-(N)) in the identified context table entry (e.g., 702(1)-(N)) that corresponds to the encrypted software component. If the key data in the identified context table entry contains a key handle, then the key handle may be used to obtain the cryptographic key (e.g., from memory or hardware) that is used to update the CC key register. If the key data in the identified context table entry contains the cryptographic key, then the key data itself may be used to update the CC key register.

At 1218, the CC domain base address register (e.g., cc_domain_base) is updated with a domain base address, which may be the load address of the called software component. Accordingly, the domain base register may be updated based on context information representing a load address (e.g., 714(1)-(N)) in the context table entry (e.g., 702(1)-(N)) corresponding to the called software component. The context information may be the load address itself, a pointer to the load address, or any other suitable information that represents the load address.

At 1220, the process may transition from execution of the main program (or other calling code) to execution of the called software component. This may be prompted by updating an instruction pointer register (RIP) with a cryptographically encoded pointer to a target address of the called software component.

At 1222, a code block at the target address of the called software component may be fetched. The code block may contain one or more instructions. The code block may be decrypted (e.g., by CC hardware 104) using a cryptographic key obtained from the CC key register, to generate a decrypted instruction of the called software component from the targeted address. In at least some embodiments, a tweak may also be used to perform the decryption of the code block. In one example, the tweak may include the load address of the software module, which can be obtained from the CC domain base register. In other examples, the tweak may also (or alternatively) include other context information or metadata such as the domain ID (e.g., obtained from the identified context table entry corresponding to the targeted encrypted software component), the size of the called software component, etc. Once the decrypted instruction of the called software component is generated, the decrypted instruction can be decoded and executed.

One or more additional encrypted instructions of the called software component may also be fetched, decrypted, decoded, and executed, until an instruction transitions (e.g., by returning via a return instruction) the execution flow to the main program (e.g., or other calling code such as another software component that called the executing software component). With reference to flow diagram 1200B of FIG. 12B, at 1224, a return instruction in the called software component is issued. At 1226, an encoded return address is popped from stack memory.

At 1228, the encoded return address can be decoded to determine whether a domain switch is needed for the process to transition from the called software component back to the main program (or other calling code such as another software component). This can be determined based on the domain switch value encoded in the return address. In one example, the domain switch value can indicate whether the process is transitioning from execution of a shareable software component or a non-shareable software component.

At 1230, if a determination is made that the process is transitioning from a shareable software component back to the main program (or other calling code such as another software component that called the currently executing software component), then the CC registers are updated. The CC registers may be updated based on context information from a context table entry corresponding to the domain to which the process is transitioning.

At 1232, the context table entry corresponding to the main program (or other calling code such as another software program) is identified. In one example, the domain ID encoded in the return address may be used to locate a context table entry corresponding to the main program (or other calling code). In another example, the correct context table entry can be identified by using the code range based module lookup for the return address. The context table entry with a range <code start, code end>that contains the return address is identified. Once the corresponding context table entry is identified, at 1234, the CC key register (e.g., cc_key) is updated with a cryptographic key assigned to the main program (or other calling code). The cryptographic key of the main program (or other calling code) may be obtained from context information such as key data (e.g., 713(1)-(N)) in the context table entry (e.g., 702(1)-(N)) that corresponds to the encrypted main program (or other calling code). If the key data in the corresponding context table entry contains a key handle, then the key handle may be used to obtain the cryptographic key (e.g., from memory or hardware) that is used to update the CC key register. If the key data in the corresponding context table entry contains the cryptographic key, then the key data itself may be used to update the CC key register.

At 1236, the CC domain base address register (e.g., cc_domain_base) is updated with a domain base address, which may be the load address of the encrypted main program (or other calling code). Accordingly, the domain base register may be updated based on a load address (e.g., 714(1)-(N)) in the context table entry (e.g., 702(1)-(N)) corresponding to the encrypted main program (or other calling code).

Once the CC registers have been updated at 1234 and 1236, or if it is determined at 1230 that the process is transitioning from a non-shareable software component, then the process may be transitioned. At 1238, the process may be transitioned from execution of the called software component to execution of the encrypted main program. This may be prompted by updating the instruction pointer register (RIP) with the return address that was popped from the stack at 1226. The return address references the next instruction to be executed in the main program (or other calling code) after the function call in the main program (or other calling code) to the called software component.

At 1240, the process may resume execution of the encrypted main program (or other calling code such as another encrypted software component). The execution of the encrypted main program may be resumed at an instruction indicated by the return address. For example, the code block containing the instruction may be fetched and decrypted to obtain a decrypted instruction. The decrypted instruction may be decoded and executed. Flow may continue to execute instructions and, each time a forward execution transition instruction (e.g., call, jump, etc.) is encountered, flow may return to 1204. Each time a backward transition instruction (e.g., return, etc.) is encountered, flow may return to 1224.

Figure 13:
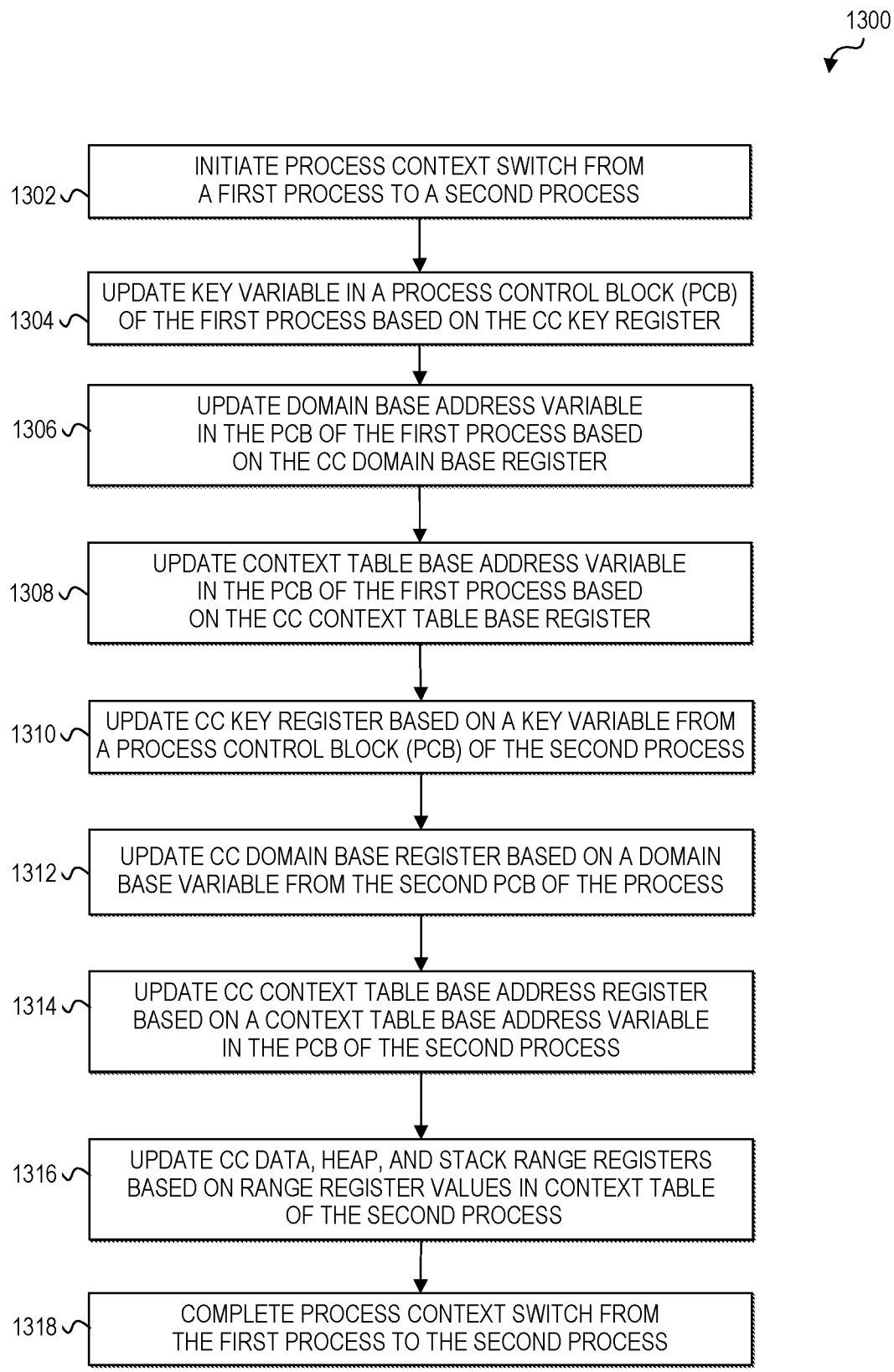
FIG. 13 is simplified flow diagram of example operations of a process context switch according to at least one embodiment.

FIG. 13 is simplified flow diagram 1300 of example operations on a computing system providing cryptographic computing isolation for multi-tenancy and shared software components according to at least one embodiment. At least a portion of the example operations of flow diagram 1300 may be performed on a computing system, such as computing system 100. Computing system 100 may comprise means such as hardware 110 with processor 102 and memory 106, for performing the operations. One or more operations of flow diagram 1300 may be associated with a set of instructions. In at least one embodiment, one or more instructions in the set of instructions may be executed during runtime when multiple processes have been instantiated from user applications. In one possible embodiment, a context loader (e.g., 412) may perform at least some of the operations of flow diagram 1300.

In the example flow diagram 1300, it is assumed that a first process has been instantiated from a first user application and a second process has been instantiated from a second user application. It is further assumed that a previous process context switch has occurred to transition from the second process to the first process. Accordingly, at the outset of operations shown in flow diagram 1300, the first process is currently executing and the second process is paused.

At 1302, a process context switch from the first process to the second process is initiated by the processor. Generally, the state of the first process is saved so that execution of the first process may be resumed at a later time. In one or more embodiments, a first process control block (PCB) of the first process is used to save the current values contained in the CC registers for the currently executing first process.

At 1304, a key variable (e.g., 756) in the first PCB (e.g., 740) of the first process is updated based on the CC key register (e.g., 736). In one example, the key assigned to the currently executing domain (e.g., software component or main program) of the first process is currently stored in the CC key register, and may be used to update the key variable of the first PCB of the first process.

At 1306, a domain base variable (e.g., 754) in the first PCB of the first process is updated based on the CC domain base address register (e.g., 734). In one example, the load address of the currently executing domain (e.g., software component or main program) of the first process is currently stored in the CC domain base address register, and may be used to update the domain base address variable of the first PCB of the first process.

At 1308, a context table base variable (e.g., 752) in the first PCB of the first process is updated based on the CC context table base address register (e.g., 732). In one example, the load address of the context table for the first process is currently stored in the CC context table base address register, and may be used to update the context table base address variable of the first PCB of the first process.

Once the CC variables of the first PCB are updated for the first process, which is being switched out, the CC registers can be updated with the CC variables of a second PCB of the second process, which is being switched in. At 1310, the CC key register (e.g., 736) is updated based on a key variable (e.g., 756) in the second PCB (e.g., PCB 740) of the second process. In this example, the key assigned to the domain (e.g., software component or main program) that was executing when the second process was previously switched out, was saved in the CC key variable in the second PCB of the second process. The saved key in the CC key variable of the second PCB may now be used to update the CC key register. Once the second process resumes execution, the key in the key register can be used for encryption and decryption of the domain (e.g., main program or software component) in which the execution flow resumes.

At 1312, the CC domain base address register (e.g., 734) is updated based on a domain base variable (e.g., 754) in the second PCB of the second process. In one example, the load address of the domain (e.g., software component or main program) that was executing when the second process was previously switched out, was saved in the CC domain base address variable in the second PCB of the second process. The saved load address in the CC domain base address variable of the second PCB may now be used to update the CC domain base address register.

At 1314, the CC context table base address register (e.g., 732) is updated based on a context table base variable (e.g., 752) in the second PCB of the second process. In one example, when the second process was previously switched out, the load address of the context table of the second process was saved in the CC context table base address variable in the second PCB of the second process. The saved load address in the CC context table base address variable of the second PCB may now be used to update the CC context table base address register.

At 1316, CC data range register(s) (e.g., 737) may be updated based on data range register values in the context table of the second process. CC heap range register(s) (e.g., 738) may be updated based on heap range register values in the context table of the second process. CC stack range register(s) (e.g., 739) may be updated based on a stack range register values in the context table of the second process.

At 1318, the process context switch from the first process to the second process may be completed. The first process may be switched out (e.g., paused) and the second process may be switched in (e.g., activated or resumed).

Exemplary Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 14:
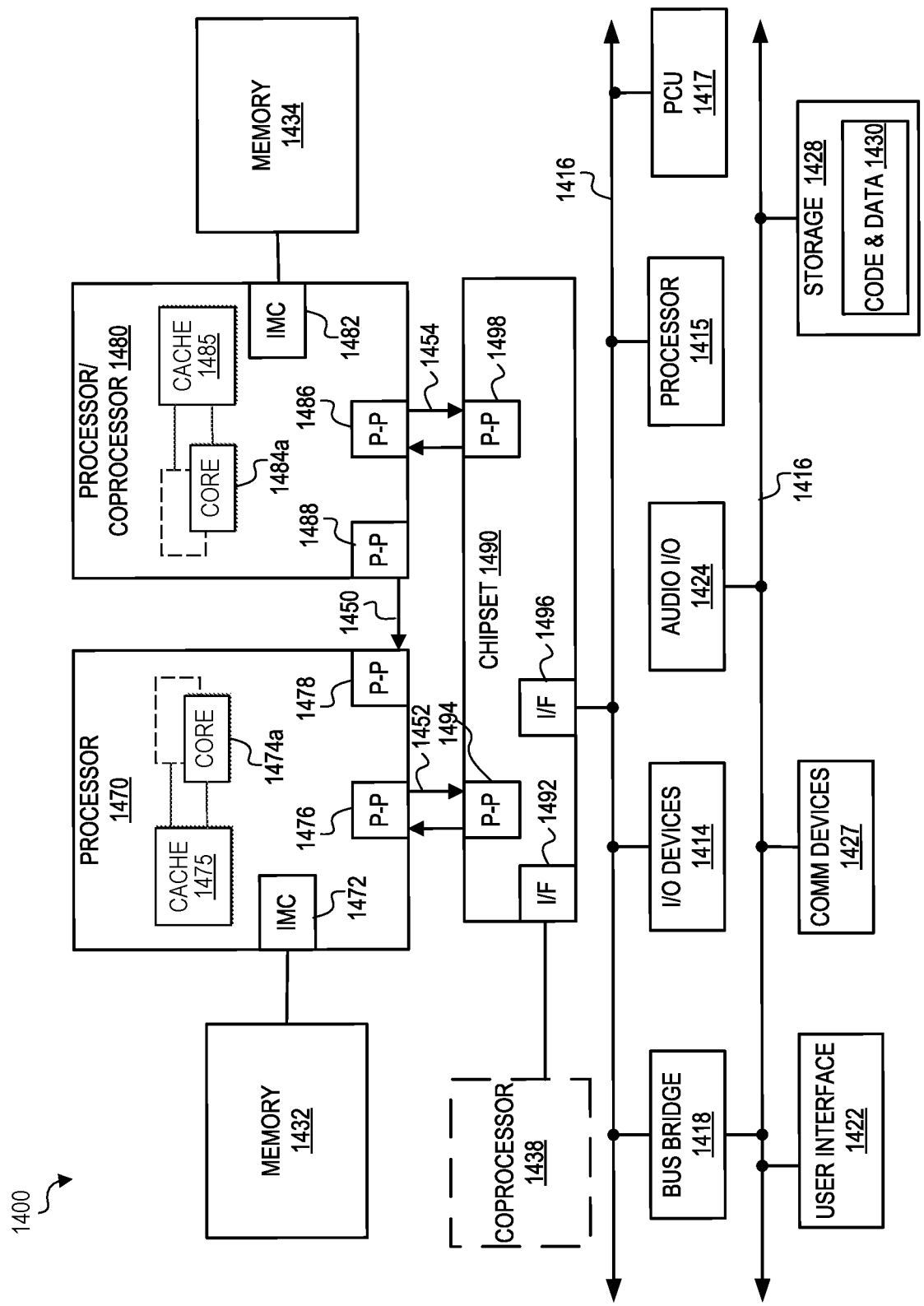
FIG. 14 illustrates an example system.

FIG. 14 illustrates an exemplary system. Multiprocessor system 1400 is a point-to-point interconnect system and includes a plurality of processors including a first processor 1470 and a second processor 1480 coupled via a point-to-point interconnect 1450. In some examples, the first processor 1470 and the second processor 1480 are homogeneous. In some examples, first processor 1470 and the second processor 1480 are heterogenous. Though the exemplary system 1400 is shown to have two processors, the system may have three or more processors, or may be a single processor system.

Processors 1470 and 1480 are shown including integrated memory controller (IMC) circuitry 1472 and 1482, respectively. Processor 1470 also includes as part of its interconnect controller point-to-point (P-P) interfaces 1476 and 1478; similarly, second processor 1480 includes P-P interfaces 1486 and 1488. Processors 1470, 1480 may exchange information via the point-to-point (P-P) interconnect 1450 using P-P interface circuits 1478, 1488. IMCs 1472 and 1482 couple the processors 1470, 1480 to respective memories, namely a memory 1432 and a memory 1434, which may be portions of main memory locally attached to the respective processors.

Processors 1470, 1480 may each exchange information with a chipset 1490 via individual P-P interconnects 1452, 1454 using point to point interface circuits 1476, 1494, 1486, 1498. Chipset 1490 may optionally exchange information with a coprocessor 1438 via an interface 1492. In some examples, the coprocessor 1438 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1470, 1480 or outside of both processors, yet connected with the processors via P-P interconnect, such that either or both processors' local cache information may be stored in the shared cache if a processor is placed into a low power mode.

Chipset 1490 may be coupled to a first interconnect 1416 via an interface 1496. In some examples, first interconnect 1416 may be a Peripheral Component Interconnect (PCI) interconnect, or an interconnect such as a PCI Express interconnect or another I/O interconnect. In some examples, one of the interconnects couples to a power control unit (PCU) 1417, which may include circuitry, software, and/or firmware to perform power management operations with regard to the processors 1470, 1480 and/or co-processor 1438. PCU 1417 provides control information to a voltage regulator (not shown) to cause the voltage regulator to generate the appropriate regulated voltage. PCU 1417 also provides control information to control the operating voltage generated. In various examples, PCU 1417 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1417 is illustrated as being present as logic separate from the processor 1470 and/or processor 1480. In other cases, PCU 1417 may execute on a given one or more of cores (not shown) of processor 1470 or 1480. In some cases, PCU 1417 may be implemented as a microcontroller (dedicated or general-purpose) or other control logic configured to execute its own dedicated power management code, sometimes referred to as P-code. In yet other examples, power management operations to be performed by PCU 1417 may be implemented externally to a processor, such as by way of a separate power management integrated circuit (PMIC) or another component external to the processor. In yet other examples, power management operations to be performed by PCU 1417 may be implemented within BIOS or other system software.

Various I/O devices 1414 may be coupled to first interconnect 1416, along with a bus bridge 1418 which couples first interconnect 1416 to a second interconnect 1420. In some examples, one or more additional processor(s) 1415, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 1416. In some examples, second interconnect 1420 may be a low pin count (LPC) interconnect. Various devices may be coupled to second interconnect 1420 including, for example, a keyboard and/or mouse 1422, communication devices 1427 and a storage circuitry 1428. Storage circuitry 1428 may be one or more non-transitory machine-readable storage media as described below, such as a disk drive or other mass storage device which may include instructions/code and data 1430 and may implement the storage 'ISAB03 in some examples. Further, an audio I/O 1424 may be coupled to second interconnect 1420. Note that other architectures than the point-to-point architecture described above are possible. For example, instead of the point-to-point architecture, a system such as multiprocessor system 1400 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 15:
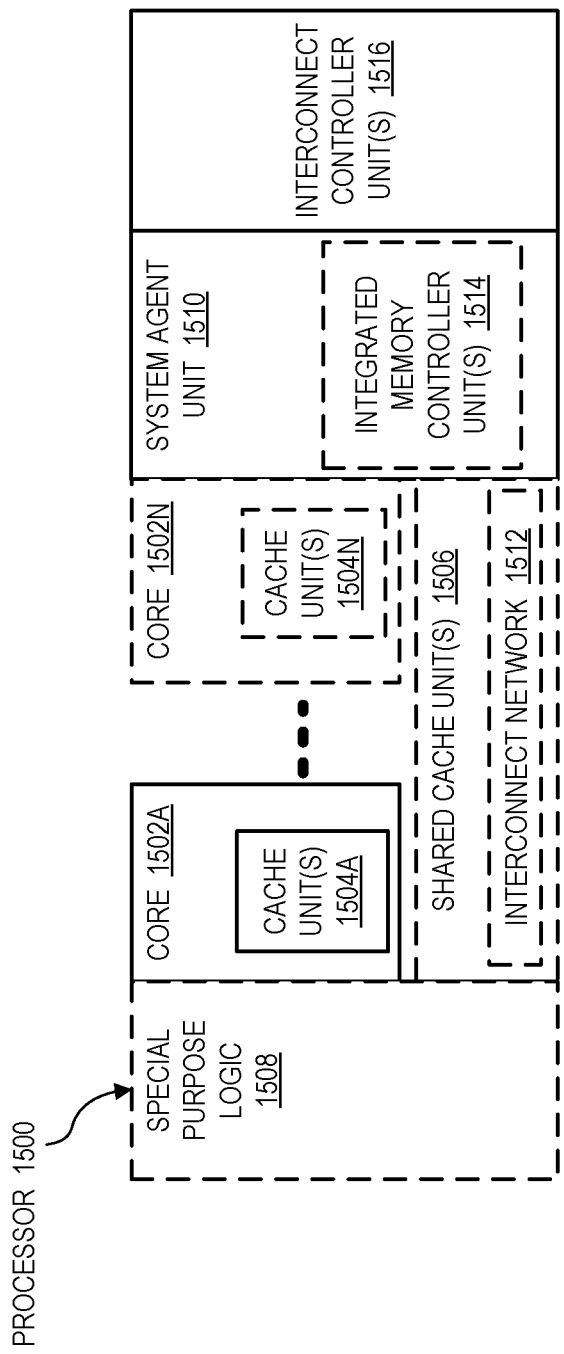
FIG. 15 illustrates a block diagram of an example processor that may have more than one core and an integrated memory controller.

FIG. 15 illustrates a block diagram of an example processor 1500 that may have more than one core and an integrated memory controller. The solid lined boxes illustrate a processor 1500 with a single core 1502A, a system agent unit circuitry 1510, a set of one or more interconnect controller unit(s) circuitry 1516, while the optional addition of the dashed lined boxes illustrates an alternative processor 1500 with multiple cores 1502(A)-(N), a set of one or more integrated memory controller unit(s) circuitry 1514 in the system agent unit circuitry 1510, and special purpose logic 1508, as well as a set of one or more interconnect controller units circuitry 1516. Note that the processor 1500 may be one of the processors 1470 or 1480, or co-processor 1438 or 1415 of FIG. 14.

Thus, different implementations of the processor 1500 may include: 1) a CPU with the special purpose logic 1508 being integrated graphics and/or scientific (throughput) logic (which may include one or more cores, not shown), and the cores 1502(A)-(N) being one or more general purpose cores (e.g., general purpose in-order cores, general purpose out-of-order cores, or a combination of the two); 2) a coprocessor with the cores 1502(A)-(N) being a large number of special purpose cores intended primarily for graphics and/or scientific (throughput); and 3) a coprocessor with the cores 1502(A)-(N) being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1504(A)-(N) within the cores 1502(A)-(N), a set of one or more shared cache unit(s) circuitry 1506, and external memory (not shown) coupled to the set of integrated memory controller unit(s) circuitry 1514. The set of one or more shared cache unit(s) circuitry 1506 may include one or more mid-level caches, such as level 2 (L2), level 3 (L3), level 4 (L4), or other levels of cache, such as a last level cache (LLC), and/or combinations thereof. While in some examples ring-based interconnect network circuitry 1512 interconnects the special purpose logic 1508 (e.g., integrated graphics logic), the set of shared cache unit(s) circuitry 1506, and the system agent unit circuitry 1510, alternative examples use any number of well-known techniques for interconnecting such units. In some examples, coherency is maintained between one or more of the shared cache unit(s) circuitry 1506 and cores 1502(A)-(N).

In some examples, one or more of the cores 1502(A)-(N) are capable of multi-threading. The system agent unit circuitry 1510 includes those components coordinating and operating cores 1502(A)-(N). The system agent unit circuitry 1510 may include, for example, power control unit (PCU) circuitry and/or display unit circuitry (not shown). The PCU may be or may include logic and components needed for regulating the power state of the cores 1502(A)-(N) and/or the special purpose logic 1508 (e.g., integrated graphics logic). The display unit circuitry is for driving one or more externally connected displays.

The cores 1502(A)-(N) may be homogenous in terms of instruction set architecture (ISA). Alternatively, the cores 1502(A)-(N) may be heterogeneous in terms of ISA; that is, a subset of the cores 1502(A)-(N) may be capable of executing an ISA, while other cores may be capable of executing only a subset of that ISA or another ISA.

Exemplary Core Architectures—In-Order and Out-of-Order Core Block Diagram.

Figure 16A:
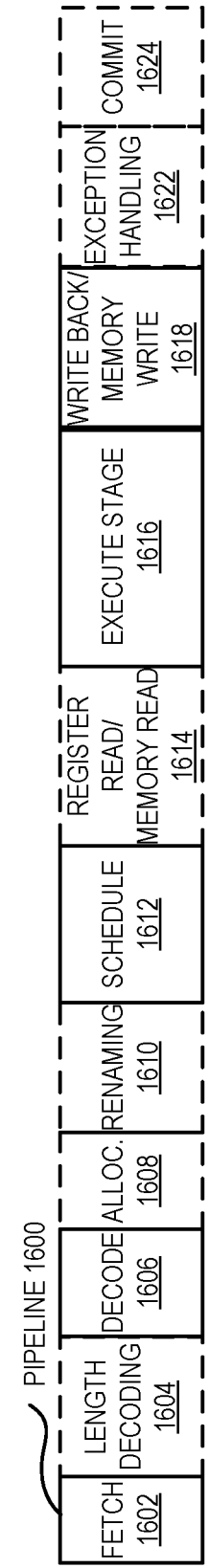
FIG. 16A is a block diagram illustrating both an exemplary in-order pipeline and an exemplary register renaming, out-of-order issue/execution pipeline according to examples.
Figure 16B:
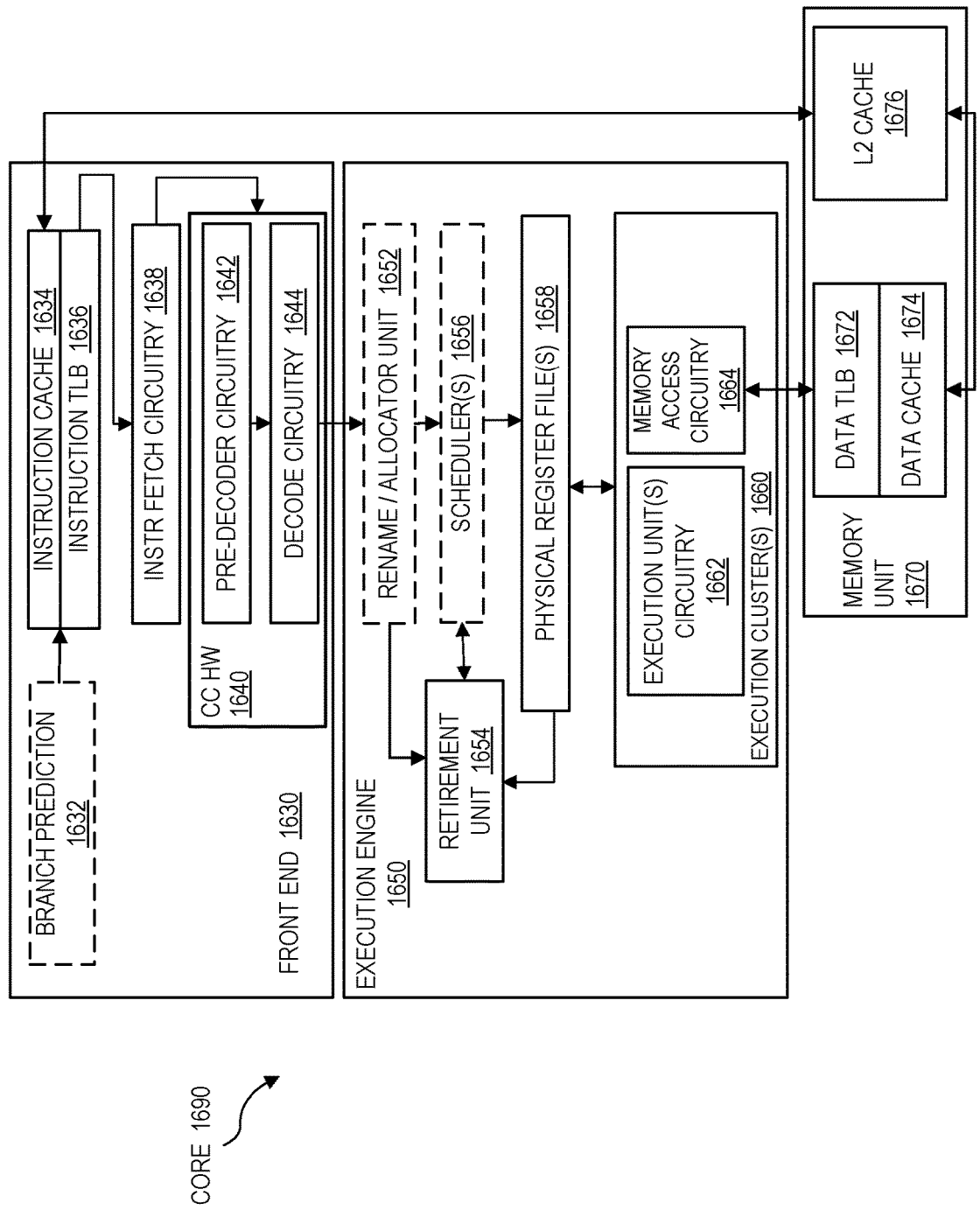
FIG. 16B is a block diagram illustrating both an exemplary example of an in-order architecture core and an exemplary register renaming, out-of-order issue/execution architecture core to be included in a processor according to examples.

FIG. 16(A) is a block diagram illustrating both an exemplary in-order pipeline and an exemplary register renaming, out-of-order issue/execution pipeline according to examples. FIG. 16(B) is a block diagram illustrating both an exemplary example of an in-order architecture core and an exemplary register renaming, out-of-order issue/execution architecture core to be included in a processor according to examples. The solid lined boxes in FIGS. 16(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16(A), a processor pipeline 1600 includes a fetch stage 1602, an optional length decoding stage 1604, a decode stage 1606, an optional allocation (Alloc) stage 1608, an optional renaming stage 1610, a schedule (also known as a dispatch or issue) stage 1612, an optional register read/memory read stage 1614, an execute stage 1616, a write back/memory write stage 1618, an optional exception handling stage 1622, and an optional commit stage 1624. One or more operations can be performed in each of these processor pipeline stages. For example, during the fetch stage 1602, one or more instructions are fetched from instruction memory, and during the decode stage 1606, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1606 and the register read/memory read stage 1614 may be combined into one pipeline stage. In one example, during the execute stage 1616, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 16(B) may implement the pipeline 1600 as follows: 1) instruction fetch circuitry 1638 performs the fetch and length decoding stages 1602 and 1604; 2) pre-decoder circuitry 1642 and decode circuitry 1644 performs the decode stage 1606; 3) rename/allocator unit circuitry 1652 performs the allocation stage 1608 and renaming stage 1610; 4) scheduler(s) circuitry 1656 performs the schedule stage 1612; 5) physical register file(s) circuitry 1658 and memory unit circuitry 1670 perform the register read/memory read stage 1614; the execution cluster(s) 1660 perform the execute stage 1616; 6) the memory unit circuitry 1670 and the physical register file(s) circuitry 1658 perform the write back/memory write stage 1618; 7) various circuitry may be involved in the exception handling stage 1622; and 8) retirement unit circuitry 1654 and the physical register file(s) circuitry 1658 perform the commit stage 1624.

In at least one implementation, cryptographic computing (cc) hardware 1640 also performs decryption of a cryptographically encoded pointer and decryption of the fetched, encrypted code that is referenced by the pointer. This cc hardware 1640 may be implemented to decrypt instruction bytes prior to decoding. It should be noted that cc hardware 1640 represents one example implementation of cc hardware in one or more embodiments described herein including cc hardware 104 of FIG. 1 and hardware 410 of FIG. 4. Furthermore, pre-decoder circuitry 1642 and decode circuitry 1644 represent one example implementation of instruction pre-decoder 414 and instruction decoder 416, respectively, of FIG. 4. Thus, it should be apparent that other implementations of cc hardware are possible to provide the cryptographic operations disclosed herein and are considered to be implementation details that are within the scope of this disclosure.

FIG. 16(B) shows a processor core 1690 including front-end unit circuitry 1630 coupled to an execution engine unit circuitry 1650, and both are coupled to a memory unit circuitry 1670. The core 1690 may be a reduced instruction set architecture computing (RISC) core, a complex instruction set architecture computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit circuitry 1630 may include branch prediction circuitry 1632 coupled to an instruction cache circuitry 1634, which is coupled to an instruction translation lookaside buffer (TLB) 1636, which is coupled to instruction fetch circuitry 1638, which is coupled to pre-decode circuitry 1639. In one example, the instruction cache circuitry 1634 is included in the memory unit circuitry 1670 rather than the front-end circuitry 1630. The decode circuitry 1644 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1644 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1644 may be implemented using various different mechanisms. Examples of suitable mechanisms include, but are not limited to, look-up tables, hardware implementations, programmable logic arrays (PLAs), microcode read only memories (ROMs), etc. In one example, the core 1690 includes a microcode ROM (not shown) or other medium that stores microcode for certain macroinstructions (e.g., in decode circuitry 1644 or otherwise within the front end circuitry 1630). In one example, the decode circuitry 1644 includes a micro-operation (micro-op) or operation cache (not shown) to hold/cache decoded operations, micro-tags, or micro-operations generated during the decode or other stages of the processor pipeline 1600. The decode circuitry 1644 may be coupled to rename/allocator unit circuitry 1652 in the execution engine circuitry 1650.

The execution engine circuitry 1650 includes the rename/allocator unit circuitry 1652 coupled to a retirement unit circuitry 1654 and a set of one or more scheduler(s) circuitry 1656. The scheduler(s) circuitry 1656 represents any number of different schedulers, including reservations stations, central instruction window, etc. In some examples, the scheduler(s) circuitry 1656 can include arithmetic logic unit (ALU) scheduler/scheduling circuitry, ALU queues, arithmetic generation unit (AGU) scheduler/scheduling circuitry, AGU queues, etc. The scheduler(s) circuitry 1656 is coupled to the physical register file(s) circuitry 1658. Each of the physical register file(s) circuitry 1658 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1658 includes vector registers unit circuitry, writemask registers unit circuitry, and scalar register unit circuitry. These register units may provide architectural vector registers, vector mask registers, general-purpose registers, etc. The physical register file(s) circuitry 1658 is coupled to the retirement unit circuitry 1654 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1654 and the physical register file(s) circuitry 1658 are coupled to the execution cluster(s) 1660. The execution cluster(s) 1660 includes a set of one or more execution unit(s) circuitry 1662 and a set of one or more memory access circuitry 1664. The execution unit(s) circuitry 1662 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1656, physical register file(s) circuitry 1658, and execution cluster(s) 1660 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1664). It should also be understood that where separate pipelines are used, one or more of these pipelines may be out-of-order issue/execution and the rest in-order.

In some examples, the execution engine unit circuitry 1650 may perform load store unit (LSU) address/data pipelining to an Advanced Microcontroller Bus (AMB) interface (not shown), and address phase and writeback, data phase load, store, and branches.

The set of memory access circuitry 1664 is coupled to the memory unit circuitry 1670, which includes data TLB circuitry 1672 coupled to a data cache circuitry 1674 coupled to a level 2 (L2) cache circuitry 1676. In one exemplary example, the memory access circuitry 1664 may include a load unit circuitry, a store address unit circuit, and a store data unit circuitry, each of which is coupled to the data TLB circuitry 1672 in the memory unit circuitry 1670. The instruction cache circuitry 1634 is further coupled to the level 2 (L2) cache circuitry 1676 in the memory unit circuitry 1670. In one example, the instruction cache 1634 and the data cache 1674 are combined into a single instruction and data cache (not shown) in L2 cache circuitry 1676, a level 3 (L3) cache circuitry (not shown), and/or main memory. The L2 cache circuitry 1676 is coupled to one or more other levels of cache and eventually to a main memory.

The core 1690 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1690 includes logic to support a packed data instruction set architecture extension (e.g., AVX1, AVX2), thereby allowing the operations used by many multimedia applications to be performed using packed data.

Exemplary Execution Unit(s) Circuitry.

Figure 17:
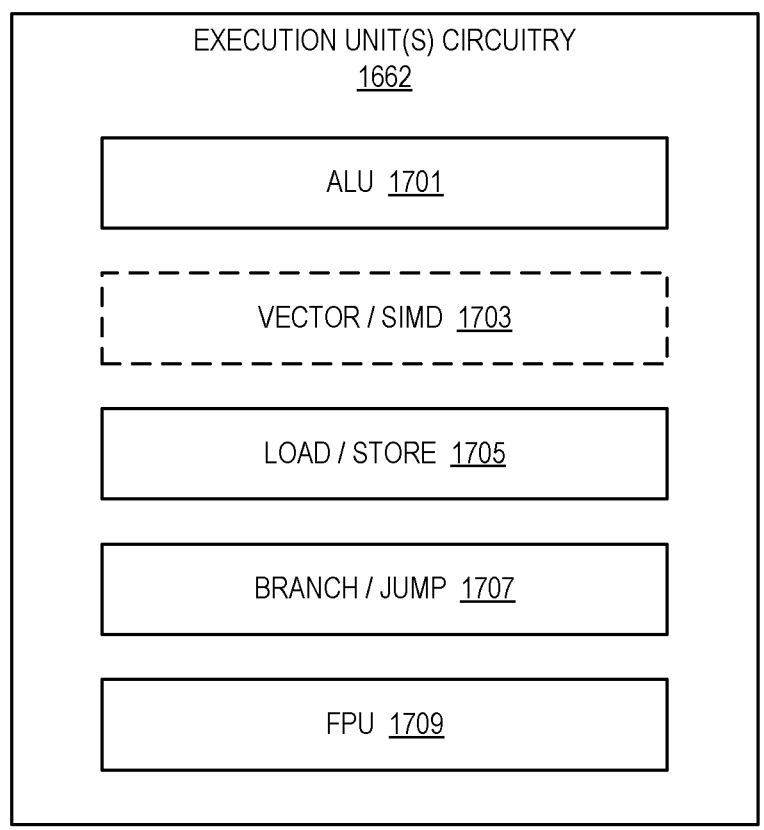
FIG. 17 illustrates examples of execution unit(s) circuitry.

FIG. 17 illustrates examples of execution unit(s) circuitry, such as execution unit(s) circuitry 1662 of FIG. 16(B). As illustrated, execution unit(s) circuitry 1662 may include one or more ALU circuits 1701, optional vector/single instruction multiple data (SIMD) circuits 1703, load/store circuits 1705, branch/jump circuits 1707, and/or Floating-point unit (FPU) circuits 1709. ALU circuits 1701 perform integer arithmetic and/or Boolean operations. Vector/SIMD circuits 1703 perform vector/SIMD operations on packed data (such as SIMD/vector registers). Load/store circuits 1705 execute load and store instructions to load data from memory into registers or store from registers to memory. Load/store circuits 1705 may also generate addresses. Branch/jump circuits 1707 cause a branch or jump to a memory address depending on the instruction. FPU circuits 1709 perform floating-point arithmetic. The width of the execution unit(s) circuitry 1662 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

With regard to this specification generally, unless expressly stated otherwise, disjunctive language such as the phrases 'at least one of X, Y, or Z' and 'X, Y, and/or Z' is intended to be understood to mean any combination of the identified items, elements, conditions, activities, messages, entries, paging structures, devices, etc. For example, 'at least one of X, Y, or Z' and 'X, Y, and/or Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular items (e.g., element, condition, module, activity, operation, claim element, messages, protocols, interfaces, devices etc.) they modify, but are not intended to indicate any type of order, rank, importance, temporal sequence, or hierarchy. For example, 'first X' and 'second X' are intended to designate two separate X elements that are not necessarily limited by any order, rank, importance, temporal sequence, or hierarchy of the two elements, unless specifically stated to the contrary.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of "embodiment" and other exemplarily language does not necessarily refer to the same embodiment or the same example, but may refer to different and distinct embodiments, as well as potentially the same embodiment.

Embodiments of the mechanisms disclosed herein may be implemented in hardware, software, firmware, or a combination of such implementation approaches. Embodiments of this disclosure may be implemented, at least partially, as computer programs or program code executing on programmable systems comprising at least one processor, a storage system (including volatile and non-volatile memory and/or storage elements), at least one input device, and at least one output device.

The architectures presented herein are provided by way of example only and are intended to be non-exclusive and non-limiting. Furthermore, the various parts disclosed are intended to be logical divisions only and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

It is also important to note that the operations in the preceding flowcharts and diagrams illustrating interactions, illustrate only some of the possible activities that may be executed by, or within, computing system 100 using the approaches disclosed herein for providing cryptographic computing isolation for multi-tenancy and secure software components.

Some of these operations may be deleted or removed where appropriate, or these operations may be modified or changed considerably without departing from the scope of the present disclosure. In addition, the timing of these operations may be altered considerably. For example, the timing and/or sequence of certain operations may be changed relative to other operations to be performed before, after, or in parallel to the other operations, or based on any suitable combination thereof. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Other Notes and Examples

The following examples pertain to embodiments in accordance with this specification. The system, apparatus, method, and machine readable storage medium embodiments can include one or a combination of the following examples.

The following examples pertain to embodiments in accordance with this specification. Example P1 provides a processor including circuitry to be coupled to memory configured to store one or more instructions, the circuitry to execute the one or more instructions to instantiate a first process based on an application, and to instantiate the first process is to: create a context table to be used by the first process, identify a software component to be invoked during the first process, encrypt the software component using a first cryptographic key, and store, in a first entry in the context table first context information identifying the encrypted software component and second context information representing the first cryptographic key.

Example P2 comprises the subject matter of Example P1, and to instantiate the first process is further to store, in the first entry of the context table, third context information representing a first load address of the encrypted software component.

Example P3 comprises the subject matter of any one of Examples P1-P2, and to instantiate the first process is further to create the first entry in the context table in response to determining that the encrypted software component is shareable with other applications running on the processor.

Example P4 comprises the subject matter of any one of Examples P1-P3, and the second context information is to include either the first cryptographic key or a key handle that references the first cryptographic key.

Example P5 comprises the subject matter of any one of Examples P1-P4, and to instantiate the first process is further to populate a first register with a base address of the context table.

Example P6 comprises the subject matter of any one of Examples P1-P5, and the circuitry is further to encrypt a main program of the application using a second cryptographic key, and store, in a second entry in the context table, fourth context information identifying the encrypted main program of the application and fifth context information representing the second cryptographic key.

Example P7 comprises the subject matter of Example P6, and the circuitry is to, subsequent to instantiating the first process, fetch an encrypted first code block of the encrypted main program from memory, and the encrypted first code block includes an encrypted first instruction, decrypt the encrypted first code block of the encrypted main program to generate an unencrypted first instruction from the encrypted first instruction, and execute the unencrypted first instruction to transition from executing the encrypted main program to executing the encrypted software component.

Example P8 comprises the subject matter of Example P7, and to instantiate the first process is further to populate a second register with the second cryptographic key, and populate a third register with a second load address of the encrypted main program.

Example P9 comprises the subject matter of Example P8, and the encrypted first code block of the encrypted main program is to be decrypted based at least in part on the second cryptographic key in the second register.

Example P10 comprises the subject matter of any one of Examples P8-P9, and the circuitry is further to execute a trusted loader to, prior to executing the encrypted software component, encode a return address to an encrypted second instruction in the encrypted main program, and the return address is to be encoded with the fourth context information identifying the encrypted main program and a domain switch value to trigger updates to the second register and the third register when the return address is used to return execution to the encrypted main program.

Example P11 comprises the subject matter of any one of Examples P8-P10, and the circuitry is further to execute a trusted loader to, prior to executing the encrypted software component, update the second register with the first cryptographic key based on the second context information in the first entry of the context table, and update the third register with a first load address of the encrypted software component based on third context information in the first entry of the context table.

Example P12 comprises the subject matter of Example P11, and the circuitry is further to, subsequent to updating the second register and the third register, fetch an encrypted second code block of the encrypted software component, and decrypt the encrypted second code block based at least in part on the first cryptographic key in the second register to generate an unencrypted third instruction of the software component.

Example P13 comprises the subject matter of Example P12, and the encrypted second code block of the encrypted software component is to be decrypted based in part on a second tweak including location information indicating a position of the encrypted second code block relative to the first load address of the encrypted software component.

Example P14 comprises the subject matter of any one of Examples P1-P13, and the circuitry is further to, during execution of the encrypted software component in the first process, initiate a process context switch to pause the first process and activate a second process, and the process context switch is to include: storing a first load address of the encrypted software component in a first variable of a process control block of the first process, storing a base address of the context table in a second variable of the process control block of the first process; and storing the first cryptographic key in a third variable of the process control block of the first process..

Example P15 comprises the subject matter of any one of Examples P1-P14, and the encrypted software component is position independent code (PIC).

The following examples pertain to embodiments in accordance with this specification. Example C1 provides a machine readable medium including instructions that when executed by a processor, cause the processor to perform operations that include receiving a request to instantiate a first process from an application, creating a context table for the first process, loading an encrypted shared library into memory for the first process, and the encrypted shared library is encrypted based at least in part on a first cryptographic key, creating a first entry in the context table, and storing, in the first entry, first context information identifying the encrypted shared library and second context information representing the first cryptographic key.

Example C2 comprises the subject matter of Example C1, and the instructions, when executed by the processor, cause the processor to perform further operations that include storing, in the first entry of the context table, third context information representing a first load address of the encrypted shared library.

Example C3 comprises the subject matter of any one of Examples C1-C2, and the second context information is to include either the first cryptographic key or a key handle that references the first cryptographic key.

Example C4 comprises the subject matter of any one of Examples C1-C3, and the instructions, when executed by the processor, cause the processor to perform further operations that include populating a first register with a base address of the context table.

Example C5 comprises the subject matter of any one of Examples C1-C4, and the instructions, when executed by the processor, cause the processor to perform further operations that include encrypting a main program of the application using a second cryptographic key, and creating a second entry in the context table, and the second entry is to include fourth context information identifying the encrypted main program of the application and fifth context information representing the second cryptographic key.

Example C6 comprises the subject matter of Example C5, and the instructions, when executed by the processor, cause the processor to perform further operations that include, subsequent to instantiating the first process, fetching an encrypted first code block of the encrypted main program from memory, decrypting the encrypted first code block of the encrypted main program to generate an unencrypted first instruction from the encrypted first instruction, and executing the unencrypted first instruction to transition from executing the encrypted main program to executing the encrypted shared library.

Example C7 comprises the subject matter of Example C6, and the instructions, when executed by the processor, cause the processor to perform further operations that include populating a second register with the second cryptographic key, and populating a third register with a second load address of the encrypted main program.

Example C8 comprises the subject matter of Example C7, and the encrypted first code block of the encrypted main program is to be decrypted based at least in part on the second cryptographic key in the second register.

Example C9 comprises the subject matter of any one of Examples C7-C8, and the instructions, when executed by the processor, cause the processor to perform further operations that include prior to executing the encrypted shared library, encoding a return address to an encrypted second instruction in the encrypted main program, and the return address is to be encoded with the fourth context information identifying the encrypted main program and a domain switch value to trigger updates to the second register and the third register based on the return address being used to return execution to the encrypted main program.

Example C10 comprises the subject matter of any one of Examples C7-C9, and the instructions, when executed by the processor, cause the processor to perform further operations that include, prior to executing the encrypted shared library, updating the second register with the first cryptographic key based on the second context information in the first entry of the context table, and updating the third register with a first load address of the encrypted shared library based on third context information in the first entry of the context table.

Example C11 comprises, and the subject matter of Example C10 and the first load address of the encrypted shared library is stored in the third register as a linear address or an encoded pointer to the linear address.

Example C12 comprises the subject matter of any one of Examples C10-C11, and the instructions, when executed by the processor, cause the processor to perform further operations that include subsequent to the updating of the second register and the third register, fetching an encrypted second code block of the encrypted shared library, and decrypting the encrypted second code block based at least in part on the first cryptographic key in the second register to generate an unencrypted third instruction of the encrypted shared library.

Example C13 comprises the subject matter of Example C12, and the encrypted second code block of the encrypted shared library is to be decrypted based in part a second tweak including location information indicating a position of the encrypted second code block relative to the first load address of the encrypted shared library.

Example C14 comprises the subject matter of any one of Examples C1-C13, and the instructions, when executed by the processor, cause the processor to perform further operations that include, subsequent to instantiating the first process: initiating a process context switch to pause the first process and activate a second process, and the process context switch is to include storing a first load address of the encrypted shared library in a first variable of a process control block of the first process, storing a base address of the context table in a second variable of the process control block of the first process, and storing the first cryptographic key in a third variable of the process control block of the first process.

Example C15 comprises the subject matter of any one of Examples C1-C14, and the encrypted shared library is position independent code (PIC).

The following examples pertain to embodiments in accordance with this specification. Example S1 provides a system including system, including memory for storing a plurality of software components and a user application and a processor coupled to the memory. The processor includes circuitry to receive a request to instantiate a first process from the user application, to encrypt a main program of the user application based at least in part on a first cryptographic key, to identify a software component to be invoked during the first process, to encrypt the software component based at least in part on a second cryptographic key, to store, in a first entry in a context table of the process, first context information identifying the encrypted main program and second context information representing the first cryptographic key, and to store, in a second entry in the context table of the process, third context information identifying the software component and fourth context information representing the second cryptographic key.

Example S2 comprises the subject matter of Example S1, and to instantiate the first process is further to store, in the first entry of the context table, fifth context information representing a first load address of the encrypted main program, and store, in the second entry of the context table, sixth context information representing a second load address of the encrypted software component.

Example S3 comprises the subject matter of any one of Examples S1-52, and to instantiate the first process is further to create the second entry in the context table in response to determining that the encrypted software component is shareable with other applications running on the processor.

Example S4 comprises the subject matter of any one of Examples S1-53, and the second context information is to include either the first cryptographic key or a first key handle that references the first cryptographic key, and the fourth context information is to include either the second cryptographic key or a second key handle that references the second cryptographic key.

Example S5 comprises the subject matter of any one of Examples S1-54, and to instantiate the first process is further to populate a first register with a base address of the context table.

Example S6 comprises the subject matter of Example S5, and the circuitry is further to populate a second register with the first cryptographic key, and populate a third register with a first load address of the encrypted main program.

Example S7 comprises the subject matter of Example S6, and further including instruction pre-decoder circuitry to generate an unencrypted first instruction from a first encrypted code block of the encrypted main program based, at least in part, on the first cryptographic key in the second register.

Example S8 comprises the subject matter of Example S7, and the circuitry is further to execute the unencrypted first instruction to transition from executing the encrypted main program to executing the encrypted software component.

Example S9 comprises the subject matter of Example S8, and the circuitry is further to execute one or more other instructions to, prior to executing the encrypted software component, encode a return address to an encrypted second instruction in the encrypted main program, and the return address is to be encoded with the first context information identifying the encrypted main program and a domain switch value to trigger updates to the second register and the third register based on the return address being used to return execution to the encrypted main program.

Example S10 comprises the subject matter of any one of Examples S8-S9, and the circuitry is further to execute one or more other instructions to, prior to executing the encrypted software component, update the second register with the second cryptographic key based on the fourth context information in the second entry of the context table, and update the third register with a second load address of the encrypted software component based on sixth context information in the first entry in the context table.

Example S11 comprises the subject matter of Example S10, and the circuitry is further to, subsequent to updating the second register and the third register, fetch an encrypted second code block of the encrypted software component, and the instruction pre-decoder circuitry is further to decrypt the encrypted second code block based at least in part on the second cryptographic key in the second register to generate an unencrypted third instruction of the encrypted software component.

Example S12 comprises the subject matter of Example S11, and the encrypted second code block of the encrypted software component is to be decrypted based in part on a second tweak including location information of the encrypted second code block.

Example S13 comprises the subject matter of Example S12, and the location information indicates a position of the encrypted second code block relative to the second load address of the encrypted software component.

Example S14 comprises the subject matter of any one of Examples S1-S13, and the circuitry is further to, during an execution of the encrypted software component in the first process, initiate a process context switch to pause the first process and activate a second process, and the process context switch is to include storing a first load address of the encrypted software component in a first variable of a process control block of the first process, storing a base address of the context table in a second variable of the process control block of the first process, and storing the first cryptographic key in a third variable of the process control block of the first process.

Example S15 comprises the subject matter of any one of Examples S1-S14, and the encrypted software component is position independent code (PIC).

The following examples pertain to embodiments in accordance with this specification. Example M1 provides a method including: receiving, by a processor, a request to instantiate a first process from an application, loading an encrypted main program of the application to memory, and the encrypted main program is encrypted based at least in part on a first cryptographic key, loading an encrypted software component to the memory, and the encrypted software component is encrypted based at least in part on a second cryptographic key, storing, in a first entry of a context table of the process, first context information identifying the encrypted main program and second context information representing the first cryptographic key, and storing, in a second entry of the context table of the process, third context information identifying the encrypted software component and fourth context information representing the second cryptographic key.

Example M2 comprises the subject matter of Example M1, and instantiating the first process includes storing, in the first entry of the context table, fifth context information representing a first load address of the encrypted main program, and storing, in the second entry of the context table, sixth context information representing a second load address of the encrypted software component.

Example M3 comprises the subject matter of any one of Examples M1-M2, and instantiating the first process includes creating the second entry in the context table in response to determining that the encrypted software component is shareable with other applications running on the processor.

Example M4 comprises the subject matter of any one of Examples M1-M3, and the second context information includes either the first cryptographic key or a first key handle that references the first cryptographic key, and the fourth context information includes either the second cryptographic key or a second key handle that references the second cryptographic key.

Example M5 comprises the subject matter of any one of Examples M1-M4, and instantiating the first process includes populating a first register with a base address of the context table.

Example M6 comprises the subject matter of Example M5, and further including populating a second register with the first cryptographic key, and populating a third register with a first load address of the encrypted main program.

Example M7 comprises the subject matter of Example M6, and further including generating an unencrypted first instruction from a first encrypted code block of the encrypted main program based, at least in part, on the first cryptographic key in the second register.

Example M8 comprises the subject matter of Example M7, and further including executing the unencrypted first instruction to transition from executing the encrypted main program to executing the encrypted software component.

Example M9 comprises the subject matter of Example M8, and further including prior to executing the encrypted software component, encoding a return address to an encrypted second instruction in the encrypted main program, and the return address is encoded with the first context information identifying the encrypted main program and a domain switch value that triggers updating of the second register and the third register based on the return address being used to return execution to the encrypted main program.

Example M10 comprises the subject matter of any one of Examples M8-M9, and further including, prior to executing the encrypted software component, updating the second register with the second cryptographic key based on the fourth context information in the second entry of the context table, and updating the third register with a second load address of the encrypted software component based on sixth context information in the first entry in the context table.

Example M11 comprises the subject matter of Example M10, and further including, subsequent to updating the second register and the third register, fetching an encrypted second code block of the encrypted software component, and decrypting the encrypted second code block based at least in part on the second cryptographic key in the second register to generate an unencrypted third instruction of the encrypted software component.

Example M12 comprises the subject matter of Example M11, and the encrypted second code block of the encrypted software component is to be decrypted based in part on a second tweak including location information of the encrypted second code block.

Example M13 comprises the subject matter of Example M12, and the location information indicates a position of the encrypted second code block relative to the second load address of the encrypted software component.

Example M14 comprises the subject matter of any one of Examples M1-M13, and further including, during an execution of the encrypted software component in the first process, initiate a process context switch to pause the first process and activate a second process, and the process context switch includes storing a first load address of the encrypted software component in a first variable of a process control block of the first process, storing a base address of the context table in a second variable of the process control block of the first process, and storing the first cryptographic key in a third variable of the process control block of the first process.

Example M15 comprises the subject matter of any one of Examples M1-M14, and the encrypted software component is position independent code (PIC).

Example X1 provides an apparatus comprising means for performing the method of any one of Examples M1-M15.

Example X2 comprises the subject matter of Example X1 can optionally include that the means for performing the method comprises at least one processor and at least one memory element.

Example X3 comprises the subject matter of Example X2 can optionally include that the at least one memory element comprises machine readable instructions that when executed, cause the apparatus to perform the method of any one of Examples M1-M15.

Example X4 comprises the subject matter of any one of Examples X1-X3 can optionally include that the apparatus is one of a computing system, a processing element, or a system-on-a-chip.

Example X5 provides at least one machine readable storage medium comprising instructions for secure reporting of platform state information, where the instructions when executed realize a processor, realize a system, or implement a method as in any one of the Examples P1-P15, S1-S15, or M1-M15.

The invention claimed is:

1. A processor comprising:
    circuitry to be coupled to memory configured to store one or more instructions, the circuitry to:
        execute the one or more instructions to instantiate a first process based on a request to launch an application associated with two or more software components to be invoked during the first process, wherein to instantiate the first process is to:
            create a context table to be used by the first process;
            encrypt a first software component of the two or more software components using a first cryptographic key;
            encrypt a second software component of the two or more software components using a second cryptographic key, wherein the encrypted second software component includes an encrypted main program of the application;
            store, in a first entry in the context table, first context information identifying the encrypted first software component and second context information representing the first cryptographic key; and
            store, in a second entry in the context table, fourth context information identifying the encrypted second software component of the application and fifth context information representing the second cryptographic key, wherein subsequent to instantiating the first process, the circuitry is further to:
                fetch an encrypted first code block of the encrypted main program from the memory;
                decrypt the encrypted first code block of the encrypted main program to generate an unencrypted first instruction; and
                execute the unencrypted first instruction to transition from executing the encrypted main program to executing the encrypted first software component.

2. The processor of claim 1, wherein to instantiate the first process is further to:
    store, in the first entry of the context table, third context information representing a first load address of the encrypted first software component.

3. The processor of claim 1, wherein to instantiate the first process is further to:
    create the first entry in the context table in response to determining that the encrypted first software component is shareable with other applications running on the processor.

4. The processor of claim 1, wherein the second context information is to include either the first cryptographic key or a key handle that references the first cryptographic key.

5. The processor of claim 1, wherein to instantiate the first process is further to:
    populate a first register with a base address of the context table.

6. The processor of claim 1, wherein to instantiate the first process is further to:
    populate a second register with the second cryptographic key; and
    populate a third register with a third load address of the encrypted main program.

7. The processor of claim 6, wherein the encrypted first code block of the encrypted main program is to be decrypted based at least in part on the second cryptographic key in the second register.

8. The processor of claim 6, wherein the circuitry is further to execute a trusted loader to:
prior to executing the encrypted first software component, encode a return address to an encrypted second instruction in the encrypted main program, wherein the return address is to be encoded with the fourth context information identifying the encrypted main program and a domain switch value to trigger updates to the second register and the third register based on the return address being used to return execution to the encrypted main program.

9. The processor of claim 6, wherein the circuitry is further to execute a trusted loader to:
prior to executing the encrypted first software component, update the second register with the first cryptographic key based on the second context information in the first entry of the context table; and
update the third register with a first load address of the encrypted first software component based on third context information in the first entry in the context table.

10. The processor of claim 9, wherein the circuitry is further to:
subsequent to updating the second register and the third register, fetch an encrypted second code block of the encrypted first software component; and
decrypt the encrypted second code block based at least in part on the first cryptographic key in the second register to generate an unencrypted third instruction of the first software component.

11. The processor of claim 10, wherein the encrypted second code block of the encrypted first software component is to be decrypted based in part on a second tweak including location information indicating a position of the encrypted second code block relative to the first load address of the encrypted first software component.

12. The processor of claim 1, wherein the circuitry is further to, during execution of the encrypted first software component in the first process:
initiate a process context switch to pause the first process and activate a second process, wherein the process context switch is to include:
storing a first load address of the encrypted first software component in a first variable of a process control block of the first process;
storing a base address of the context table in a second variable of the process control block of the first process; and
storing the first cryptographic key in a third variable of the process control block of the first process.

13. The processor of claim 1, wherein the encrypted first software component is position independent code (PIC).

14. The processor of claim 1, wherein the first software component includes a shared library, a microservice, a function as a service, or a browser component of a browser.

15. The processor of claim 1, wherein the second first software component includes a shared library, a microservice, a function as a service, or a browser component of a browser.

16. A non-transitory machine readable medium comprising instructions that when executed by a processor, cause the processor to perform operations comprising:
receiving a request to instantiate a first process based on a request to launch an application;
creating a context table for the first process;
loading an encrypted shared library into memory for the first process, wherein the encrypted shared library is encrypted based at least in part on a first cryptographic key;
creating a first entry in the context table;
storing, in the first entry, first context information identifying the encrypted shared library and second context information representing the first cryptographic key;
creating a second entry in the context table, the second entry to include fourth context information identifying an encrypted main program of the application and fifth context information representing a second cryptographic key, wherein the encrypted main program is encrypted based, at least in part, on the second cryptographic key;
populating a first register with a base address of the context table;
populating a second register with the second cryptographic key; and
populating a third register with a load address of the encrypted main program.

17. The non-transitory machine readable medium of claim 16, wherein the instructions, when executed by the processor, cause the processor to perform further operations comprising:
storing, in the first entry of the context table, third context information representing a first load address of the encrypted shared library.

18. The non-transitory machine readable medium of claim 16, wherein the instructions, when executed by the processor, cause the processor to perform further operations comprising:
in response to execution of an instruction in the encrypted main program to call the encrypted shared library:
update the second register with the first cryptographic key based on the second context information in the first entry of the context table; and
update the third register with a first load address of the encrypted shared library based on third context information in the first entry of the context table.

19. A system, comprising:
memory for storing a plurality of software components and a main program of a user application; and
a processor coupled to the memory, the processor comprising circuitry to:
instantiate a process based on a request to launch the user application associated with a software component to be invoked during the process, wherein to instantiate the process is to include:
encrypting the main program of the user application based at least in part on a first cryptographic key;
encrypting the software component based at least in part on a second cryptographic key;
storing, in a first entry in a context table of the process, first context information identifying the encrypted main program and second context information representing the first cryptographic key;
storing, in a second entry in the context table of the process, third context information identifying the encrypted software component and fourth context information representing the second cryptographic key,
subsequent to instantiating the process, fetch an encrypted first code block of the encrypted main program from the memory;

decrypt the encrypted first code block of the encrypted main program to generate an unencrypted first instruction; and execute the unencrypted first instruction to transition from executing the encrypted main program to executing the encrypted first software component.

20. The system of claim 19, wherein to encrypt the software component is to include:

encrypting an unencrypted second code block of the software component based on the second cryptographic key and a code tweak, wherein the code tweak is to include an offset of the code block relative to a start of the software component.

21. The system of claim 19, wherein the encrypted software component is position independent code (PIC).

22. A method comprising:

instantiating a first process based on a request to launch an application, wherein the application is associated with a software component to be invoked during the first process, wherein instantiating the first process includes:

encrypting a main program of the application based at least in part on a first cryptographic key;

using at least a second cryptographic key for encrypting the software component to be invoked during the first process;

creating a first entry in a context table of the first process, the first entry to include first context information identifying the main program and second context information representing the first cryptographic key;

creating a second entry in the context table, the second entry to include third context information identifying the software component and fourth context information representing the second cryptographic key;

subsequent to instantiating the first process, fetching an encrypted first code block of the encrypted main program from a memory;

decrypting the encrypted first code block of the encrypted main program to generate an unencrypted first instruction; and executing the unencrypted first instruction to transition from executing the encrypted main program to executing the encrypted software component.

23. The method of claim 22, further comprising:

during execution of the encrypted software component in the first process initiate a process context switch to pause the first process and activate a second process, wherein the process context switch includes:

storing a first load address of the encrypted software component in a first variable of a process control block of the first process;

storing a base address of the context table in a second variable of the process control block of the first process; and storing the second cryptographic key in a third variable of the process control block of the first process.

* * * * *